(12) United States Patent
Hiratsuka

(10) Patent No.: US 11,928,189 B2
(45) Date of Patent: Mar. 12, 2024

(54) INFORMATION PROCESSING APPARATUS, INFORMATION PROCESSING METHOD, AND ELECTRONIC DEVICE

(71) Applicant: SONY CORPORATION, Tokyo (JP)

(72) Inventor: Yosuke Hiratsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 794 days.

(21) Appl. No.: 16/967,255

(22) PCT Filed: Jan. 30, 2019

(86) PCT No.: PCT/JP2019/003056
§ 371 (c)(1),
(2) Date: Aug. 4, 2020

(87) PCT Pub. No.: WO2019/159690
PCT Pub. Date: Aug. 22, 2019

(65) Prior Publication Data
US 2021/0056179 A1 Feb. 25, 2021

(30) Foreign Application Priority Data
Feb. 13, 2018 (JP) .................. 2018-022805

(51) Int. Cl.
*G06F 21/10* (2013.01)
*G06Q 10/107* (2023.01)
(Continued)

(52) U.S. Cl.
CPC .......... *G06F 21/105* (2013.01); *H04L 9/0866* (2013.01); *H04L 9/14* (2013.01);
(Continued)

(58) Field of Classification Search
CPC .......... G06F 21/105; G06F 2221/0755; G06F 21/44; G06F 21/10; H04L 9/0866;
(Continued)

(56) References Cited

U.S. PATENT DOCUMENTS

2008/0281625 A1   11/2008   Shiki
2010/0057703 A1   3/2010   Brandt et al.
(Continued)

FOREIGN PATENT DOCUMENTS

CN      101107613 A      1/2008
JP      2002-297542 A    10/2002
(Continued)

OTHER PUBLICATIONS

Extended European Search Report of EP Application No. 19755167.4 dated Feb. 4, 2021, 13 pages.

(Continued)

*Primary Examiner* — Abiy Getachew
(74) *Attorney, Agent, or Firm* — CHIP LAW GROUP

(57) ABSTRACT

Provided are an information processing apparatus, an information processing method, and an electronic device capable of appropriately perform update of a license provided by an information processing apparatus and used in an electronic device. The electronic device includes a key generation unit that generates a device unique key that is a key unique to every device, and a license management unit that updates a license in a case where an extension code generated by a predetermined method on the basis of the device unique key, first data different for every installation of the license provided by an information processing apparatus, and second data different depending on the number of times of update of the license coincides with an input extension code.

33 Claims, 37 Drawing Sheets

(51) Int. Cl.
  *G06Q 20/12* (2012.01)
  *G06Q 30/018* (2023.01)
  *H04L 9/08* (2006.01)
  *H04L 9/14* (2006.01)
  *H04L 9/32* (2006.01)

(52) U.S. Cl.
  CPC .............. *H04L 9/32* (2013.01); *G06F 21/107* (2023.08); *G06Q 10/107* (2013.01); *G06Q 20/1235* (2013.01); *G06Q 20/127* (2013.01); *G06Q 30/0185* (2013.01); *G06Q 2220/18* (2013.01)

(58) Field of Classification Search
  CPC . H04L 9/14; H04L 9/32; H04L 9/0643; H04L 9/0891; G06Q 10/107; G06Q 20/1235; G06Q 20/127; G06Q 30/0185; G06Q 2220/18
  See application file for complete search history.

(56) References Cited

U.S. PATENT DOCUMENTS

| | | | | |
|---|---|---|---|---|
| 2014/0047506 | A1* | 2/2014 | Yabe | G06F 21/105 726/3 |
| 2015/0319148 | A1* | 11/2015 | Lemelev | G06F 21/128 726/30 |
| 2015/0332026 | A1* | 11/2015 | Cooper | G06F 21/629 726/29 |
| 2018/0053271 | A1* | 2/2018 | Mahindru | G06Q 50/184 |

FOREIGN PATENT DOCUMENTS

| | | |
|---|---|---|
| JP | 2003-108252 A | 4/2003 |
| JP | 2007-193579 A | 8/2007 |
| JP | 2009-042925 A | 2/2009 |
| JP | 2011-087794 A | 5/2011 |
| JP | 2013042554 A | 2/2013 |
| JP | 2017068490 A | 4/2017 |
| KR | 10-2008-0014885 A | 2/2008 |
| KR | 10-2010-0015928 A | 2/2010 |
| WO | 2007/083499 A1 | 7/2007 |

OTHER PUBLICATIONS

International Search Report and Written Opinion of PCT Application No. PCT/JP2019/003056, dated May 7, 2019, 10 pages of ISRWO.

* cited by examiner

FIG. 9

```
┌─────────────────────────────────┐
│                                 │
│   DEVICE INFORMATION FILE       │
│   HAS BEEN WRITTEN OUT          │
│                                 │
│           ( OK )                │
│                                 │
└─────────────────────────────────┘
```

```
┌─────────────────────────────────┐
│                                 │
│   PLEASE UPLOAD DEVICE          │
│   INFORMATION FILE              │
│   ACQUIRED FROM CAMERA          │
│                                 │
│         ( UPLOAD )              │
│                                 │
└─────────────────────────────────┘
```

CAMERA : XXX-XXX-XXXXXX
DO YOU WANT TO INSTALL
LICENSE IN THIS DEVICE?

INSTALL

PLEASE DOWNLOAD LICENSE
COMMUNICATION FILE, STORE LICENSE
COMMUNICATION FILE IN MEDIUM,
AND INSERT MEDIUM INTO CAMERA

DOWNLOAD

| FUNCTION ID | SYSTEM UNIQUE INFORMATION | DEVICE UNIQUE ID | | EXPIRATION TIME | EFFECTIVE TERM | |

CANCEL INSTALLATION AND PERFORM
RE-ISSUANCE OF INSTALLATION KEY
XXXXXXX-4K-SUBSCRIPTION

RE-ISSUE

INSTALLATION HAS BEEN CANCELED.
PLEASE INSTALL LICENSE AGAIN.

OK

FIG. 25
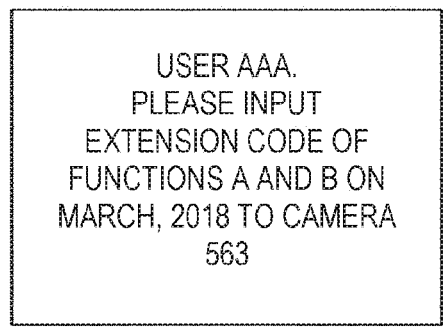
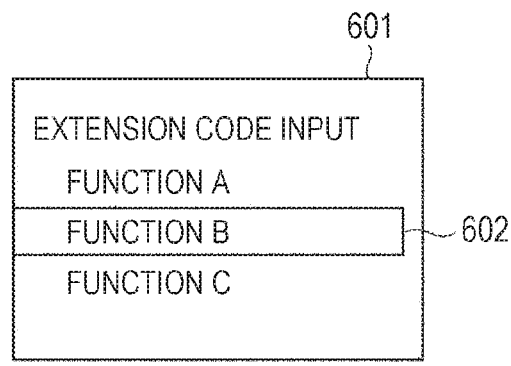
FIG. 26A
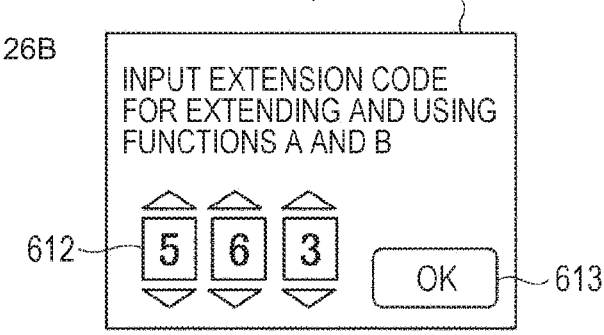
FIG. 26B

FIG. 27
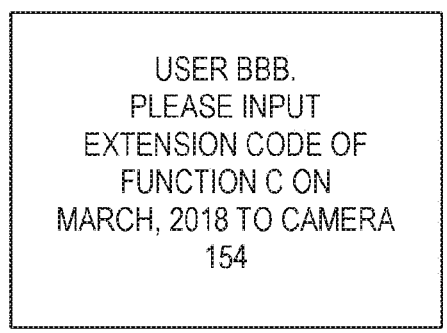
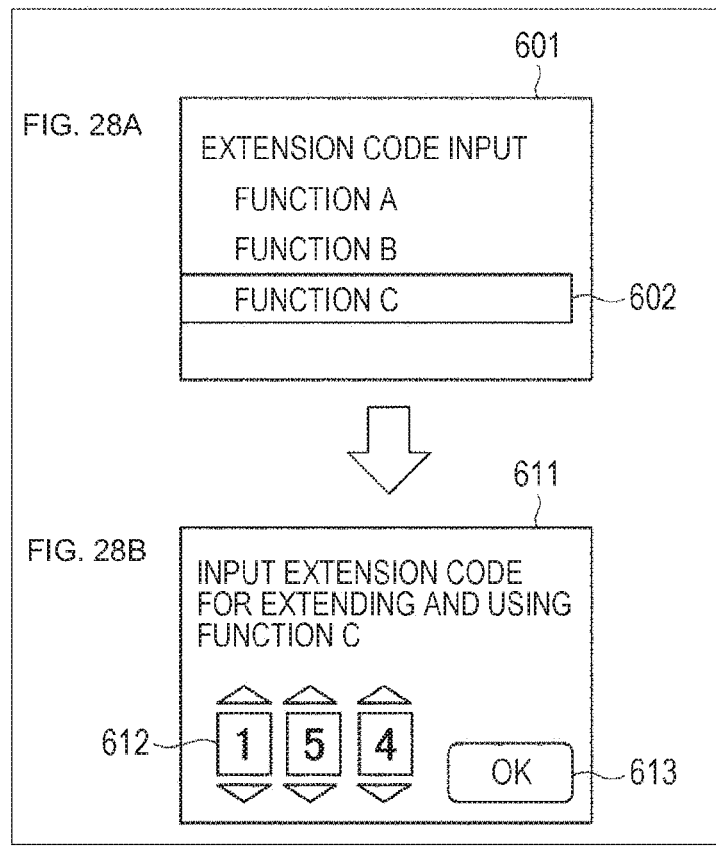

FIG. 42

| FUNCTION ID | SYSTEM UNIQUE INFORMATION | DEVICE UNIQUE ID | |
|---|---|---|---|

# INFORMATION PROCESSING APPARATUS, INFORMATION PROCESSING METHOD, AND ELECTRONIC DEVICE

CROSS REFERENCE TO RELATED APPLICATIONS

This application is a U.S. National Phase of International Patent Application No. PCT/JP2019/003056 filed on Jan. 30, 2019, which claims priority benefit of Japanese Patent Application No. JP 2018-022805 filed in the Japan Patent Office on Feb. 13, 2018. Each of the above-referenced applications is hereby incorporated herein by reference in its entirety.

TECHNICAL FIELD

The present technology relates to an information processing apparatus, an information processing method, a program, and an electronic device, and more particularly, to an information processing apparatus, an information processing method, a program, and an electronic device that are suitable for being used in a case where update of a license provided by an information processing apparatus and used by an electronic device is performed.

BACKGROUND ART

Conventionally, it has been proposed to manage an expiration time of encapsulated software (hereinafter, referred to as a capsule) provided from a server, using an integrated chip (IC) card (see, for example, Patent Document 1).

Specifically, a personal computer (PC) transmits expiration time authentication data including an expiration time start time and an expiration time end time to the IC card at the time of start-up of the capsule. In a case where an IC card time is before the expiration time start time, the IC card rewrites the IC card time to the expiration time start time. Furthermore, the IC card permits the use of the capsule in a case where the IC card time is before the expiration time end time, and does not permit the use of the capsule in a case where the IC card time is after the expiration time end time. Therefore, period management of the capsule can be performed offline without connecting the PC to the server.

CITATION LIST

Patent Document

Patent Document 1: Japanese Patent Application Laid-Open No. 2011-87794

SUMMARY OF THE INVENTION

Problems to be Solved by the Invention

However, the invention described in Patent Document 1 does not consider update of a license.

The present technology has been made in view of such a situation, and is to make it possible to appropriately perform update of a license provided by an information processing apparatus such as a server or the like and used in an electronic device.

Solutions to Problems

An electronic device according to a first aspect of the present technology includes: a key generation unit that generates a device unique key that is a key unique to every device; and a license management unit that updates a license in a case where an extension code generated by a predetermined method on the basis of the device unique key, first data different for every installation of the license provided by an information processing apparatus, and second data different depending on the number of times of update of the license coincides with an input extension code.

An information processing method according to a first aspect of the present technology includes: generating, by an electronic device, a device unique key that is a key unique to the electronic device; and updating, by the electronic device, a license in a case where an extension code generated by a predetermined method on the basis of the device unique key, first data different for every installation of the license provided by an information processing apparatus, and second data different depending on the number of times of update of the license coincides with an input extension code.

A program according to a first aspect of the present technology causes a computer of an electronic device to execute processing for: generating a device unique key that is a key unique to the electronic device; and updating a license in a case where an extension code generated by a predetermined method on the basis of the device unique key, first data different for every installation of the license provided by an information processing apparatus, and second data different depending on the number of times of update of the license coincides with an input extension code.

An information processing apparatus according to a second aspect of the present technology includes: a license management unit that generates an extension code for updating a license by the same method as that of an electronic device, on the basis of a device unique key that is a key unique to the electronic device, first data different for every installation of the license in the electronic device, and second data different depending on the number of times of update of the license in the electronic device; and a communication control unit that controls transmission of the extension code.

An information processing method according to a second aspect of the present technology includes: generating, by an information processing apparatus, an extension code for updating a license by the same method as that of an electronic device, on the basis of a device unique key that is a key unique to the electronic device, first data different for every installation of the license in the electronic device, and second data different depending on the number of times of update of the license in the electronic device; and controlling, by the information processing apparatus, transmission of the extension code.

A program according to a second aspect of the present technology causes a computer to execute processing for: generating an extension code for updating a license by the same method as that of an electronic device, on the basis of a device unique key that is a key unique to the electronic device, first data different for every installation of the license in the electronic device, and second data different depending on the number of times of update of the license in the electronic device; and controlling transmission of the extension code.

An electronic device according to a third aspect of the present technology includes: a hardware clock; and a license management unit that stops use of a license until a confirmation code generated by the same method as that of an information processing apparatus on the basis of a confirmation date and time and used for confirming continuation of the license is input in a case where a predetermined term has elapsed since notification of the confirmation date and time has been provided to the information processing apparatus, the confirmation date and time being a date and time based on the hardware clock, and the information processing apparatus managing a period of the license.

An information processing method according to a third aspect of the present technology includes: stopping, by an electronic device including a hardware clock, use of a license until a confirmation code generated by the same method as that of an information processing apparatus on the basis of a confirmation date and time and used for confirming continuation of the license is input in a case where a predetermined term has elapsed since notification of the confirmation date and time has been provided to the information processing apparatus, the confirmation date and time being a date and time based on the hardware clock, and the information processing apparatus managing a period of the license.

A program according to a third aspect of the present technology causes a computer of an electronic device having a hardware clock to execute processing for: stopping use of a license until a confirmation code generated by the same method as that of an information processing apparatus on the basis of a confirmation date and time and used for confirming continuation of the license is input in a case where a predetermined term has elapsed since notification of the confirmation date and time has been provided to the information processing apparatus, the confirmation date and time being a date and time based on the hardware clock, and the information processing apparatus managing a period of the license.

An information processing apparatus according to a fourth aspect of the present technology includes: a license management unit that generates a confirmation code by the same method as that of an electronic device on the basis of a confirmation date and time in a case where a predetermined term has elapsed since notification of the confirmation date and time has been provided, the confirmation date and time being a date and time based on a hardware clock of the electronic device, and the confirmation code being a code for confirming continuation of a license used by the electronic device in the electronic device; and a communication control unit that controls transmission of the confirmation code.

An information processing method according to a fourth aspect of the present technology includes: generating, by an information processing apparatus, a confirmation code by the same method as that of an electronic device on the basis of a confirmation date and time in a case where a predetermined term has elapsed since notification of the confirmation date and time has been provided, the confirmation date and time being a date and time based on a hardware clock of the electronic device, and the confirmation code being a code for confirming continuation of a license used by the electronic device in the electronic device; and controlling, by the information processing apparatus, transmission of the confirmation code.

A program according to a fourth aspect of the present technology causes a computer to execute processing for: generating a confirmation code by the same method as that of an electronic device on the basis of a confirmation date and time in a case where a predetermined term has elapsed since notification of the confirmation date and time has been provided, the confirmation date and time being a date and time based on a hardware clock of the electronic device, and the confirmation code being a code for confirming continuation of a license used by the electronic device in the electronic device; and controlling transmission of the confirmation code.

In the first aspect of the present technology, the device unique key that is the key unique to the electronic device is generated, and the license is updated in a case where the extension code generated by a predetermined method on the basis of the device unique key, the first data different for every installation of the license provided by the information processing apparatus, and the second data different depending on the number of times of the update of the license coincides with the input extension code.

In the second aspect of the present technology, the extension code for updating the license is generated by the same method as that of the electronic device on the basis of the device unique key that is the key unique to the electronic device, the first data different for every installation of the license in the electronic device, and the second data different depending on the number of times of the update of the license in the electronic device, and the transmission of the extension code is controlled.

In the third aspect of the present technology, the use of the license is stopped until the confirmation code generated by the same method as that of the information processing apparatus on the basis of a confirmation date and time and used for confirming continuation of the license is input in a case where the predetermined term has elapsed since notification of the confirmation date and time has been provided to the information processing apparatus, the confirmation date and time being the date and time based on the hardware clock, and the information processing apparatus managing the period of the license.

In the fourth aspect of the present technology, the confirmation code is generated by the same method as that of the electronic device on the basis of the confirmation date and time in a case where the predetermined term has elapsed since notification of the confirmation date and time has been provided, the confirmation date and time being the date and time based on the hardware clock of the electronic device, and the confirmation code being the code for confirming the continuation of the license used by the electronic device in the electronic device; and the transmission of the confirmation code is controlled.

Effects of the Invention

According to the first to fourth aspects of the present technology, the license provided by the information processing apparatus can be used in the electronic device. Furthermore, according to the first to fourth aspects of the present technology, it is possible to appropriately perform the update of the license provided by the information processing apparatus and used in the electronic device.

Note that an effect described here is not necessarily limited, and may be any effect described in the present disclosure.

BRIEF DESCRIPTION OF DRAWINGS

FIG. 9 is a diagram illustrating an example of a screen of an electronic device.

FIG. 10 is a diagram illustrating an example of a screen of the PC.

FIG. 11 is a diagram illustrating an example of a screen of the PC.

FIG. 12 is a diagram illustrating an example of a screen of the PC.

FIG. 14 is a diagram illustrating a format example of an installation key.

FIG. 25 is a diagram illustrating a first example of an email notifying a user of an extension code.

FIGS. 26A and 26B are diagrams for describing an input method of the extension code.

FIG. 27 is a diagram illustrating a second example of an email notifying a user of an extension code.

FIGS. 28A and 28B are diagrams for describing an input method of the extension code.

FIG. 42 is a diagram illustrating a format example of an installation key.

MODE FOR CARRYING OUT THE INVENTION

Hereinafter, an embodiment for carrying out the present technology will be described. A description will be given in the following order.

1. Embodiment
2. Modification
3. Others

1. Embodiment

First, an embodiment of the present technology will be described with reference to FIGS. 1, 2, 3, 4, 5, 6, 7, 8, 9, 10, 11, 12, 13, 14, 15, 16, 17, 18, 19, 20, 21, 22, 23, 24, 25, 26A, 26B, 27, 28A, 28B, 29, 30, 31, 32, 33, 34, 35, 36, 37, 38, 39, 40, 41, 42, 43, 44, 45, 46, 47, and 48.

<Configuration Example of Information Processing System 10>

Figure 1:
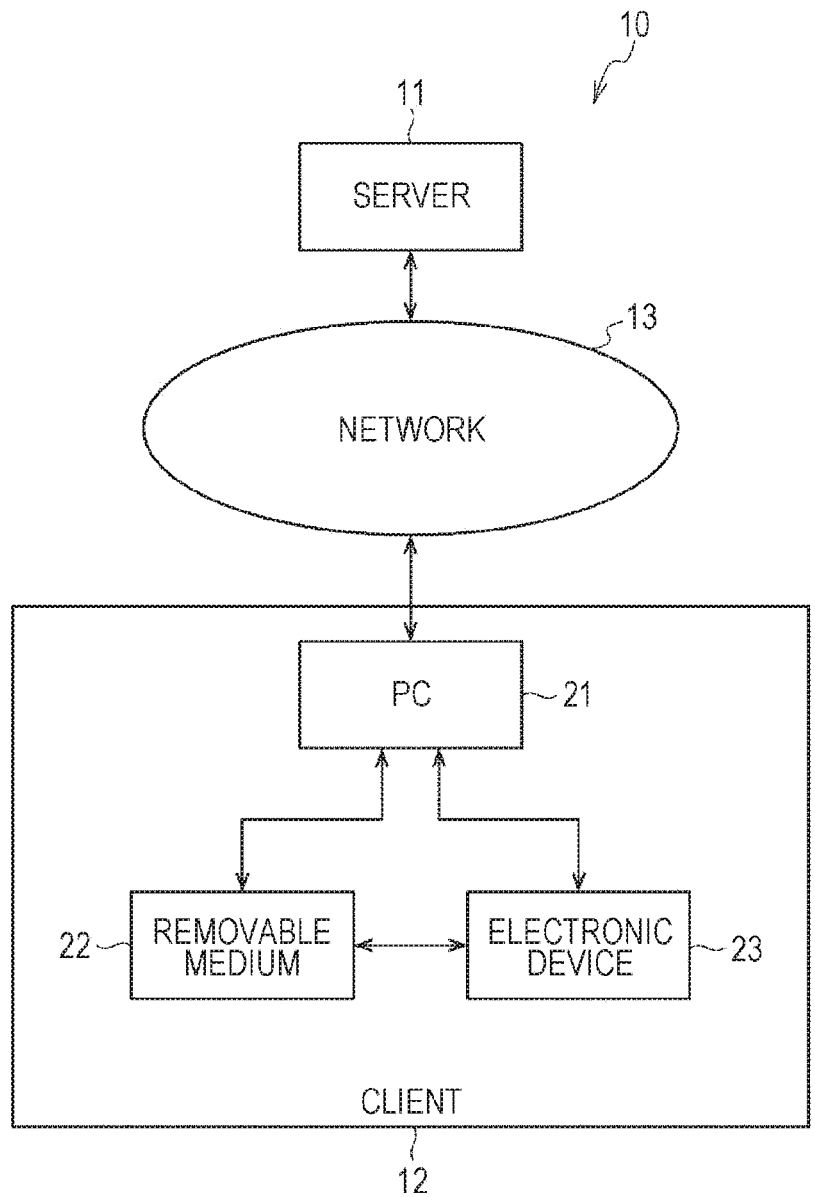
FIG. 1 is a block diagram illustrating an embodiment of an information processing system to which the present technology is applied.

FIG. 1 illustrates a configuration example of an information processing system 10 to which the present technology is applied.

The information processing system 10 includes a server 11, a client 12, and a network 13. The client 12 includes a personal computer (PC) 21, a removable medium 22, and an electronic device 23.

The server 11 and the PC 21 are connected to each other and communicate with each other, via the network 13.

The server 11 performs provision and management of a license of a function used in the electronic device 23, provision of software for realizing the function of the electronic device 23, and the like.

The PC 21 exchanges various data with the server 11 by communicating with the server 11 via the network 13. For example, the PC 21 receives data regarding the license of the function used in the electronic device 23 and various data such as software and the like used in the electronic device 23, from the server 11. Furthermore, the PC 21 transmits various data such as data and the like regarding the electronic device 23 to the server 11.

The removable medium 22 includes a magnetic disk, an optical disk, a magneto-optical disk, a semiconductor memory, or the like, and is used to exchange various data between the PC 21 and the electronic device 23.

Note that the removable medium 22 will hereinafter be simply referred to as a medium 22.

The electronic device 23 can be connected to the PC 21 via a cable and the like and can be connected to the network 13 via the PC 21 to communicate with the server 11. Furthermore, the electronic device 23 can use a function corresponding to the installed license by installing the license provided from the server 11 via the PC 21 or the medium 22. Moreover, the electronic device 23 returns the license provided from the server 11 to the server 11 via the PC 21 or the medium 22, if necessary.

Note that a type of the electronic device 23 is not particularly limited. Hereinafter, a case where the electronic device 23 is a camera will be mainly described by way of example.

Furthermore, a type of a function that becomes a target of the license provided by the server 11 is not particularly limited. For example, the function may not be necessarily a function using software, and may be a function realized only by hardware.

Moreover, the server 11 may also provide software for realizing the function that becomes the target of the license. In this case, the license of the function is also a license of the software for realizing the function.

Furthermore, only one client 12 has been illustrated in FIG. 1 for making it easy to understand the drawing and the description, but a plurality of clients 12 is actually provided. Moreover, only one server 11 has also been illustrated, but a plurality of servers 11 may be provided. Furthermore, the number of at least one of the PC 21, the medium 22, or the electronic device 23 included in one client 12 may be plural.

<Configuration Example of Server 11>

Figure 2:
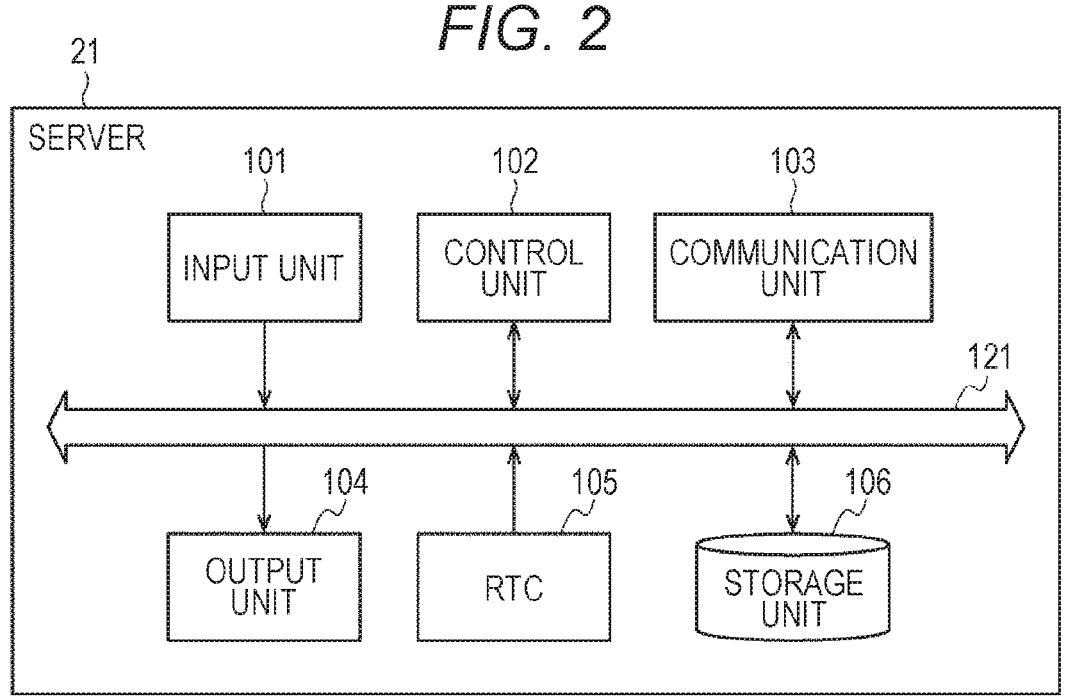
FIG. 2 is a block diagram illustrating a configuration example of a server.

FIG. 2 illustrates a configuration example of the server 11.

The server 11 includes an input unit 101, a control unit 102, a communication unit 103, an output unit 104, a real time clock (RTC) 105, and a storage unit 106. The input unit 101, the control unit 102, the communication unit 103, the output unit 104, the RTC 105, and the storage unit 106 are connected to each other via a bus 121.

The input unit 101 includes, for example, input devices such as a switch, a button, a key, a microphone, an imaging element, and the like, and is used to input various data. The input unit 101 supplies the input data to each unit of the server 11 via the bus 121.

The control unit 102 includes, for example, a processor such as a central processing unit (CPU) and the like, and controls processing of each unit of the server 11.

The communication unit 103 includes, for example, a communication device and the like, and communicates with the PC 21 via the network 13. Note that a communication manner of the communication unit 103 is not particularly limited, and may be any one of a wired communication manner or a wireless communication manner. Furthermore, for example, the communication unit 103 may correspond to a plurality of communication manners.

The output unit 104 includes, for example, output devices such as a display, a speaker, a lighting device, a vibrator, and the like, and outputs various data by an image, a sound, light, vibrations, and the like.

The RTC 105 is a hardware clock that continues to operate by a backup battery (not illustrated) and the like even though a power supply of the server 11 is turned off. The RTC 105 is managed so that a user cannot change the date and time (a date and a time).

The storage unit 106 includes at least a non-volatile storage medium, and stores various data or software necessary for processing of the server 11.

Note that, hereinafter, in a case where the respective units of the server 11 exchange data and the like with each other via the bus 121, a description of the bus 121 will be appropriately omitted. For example, in a case where the control unit 102 and the communication unit 103 exchange data with each other via the bus 121, it is simply said that the control unit 102 and the communication unit 103 exchange data with each other.

<Configuration Example of Function of Control Unit 102>

Figure 3:
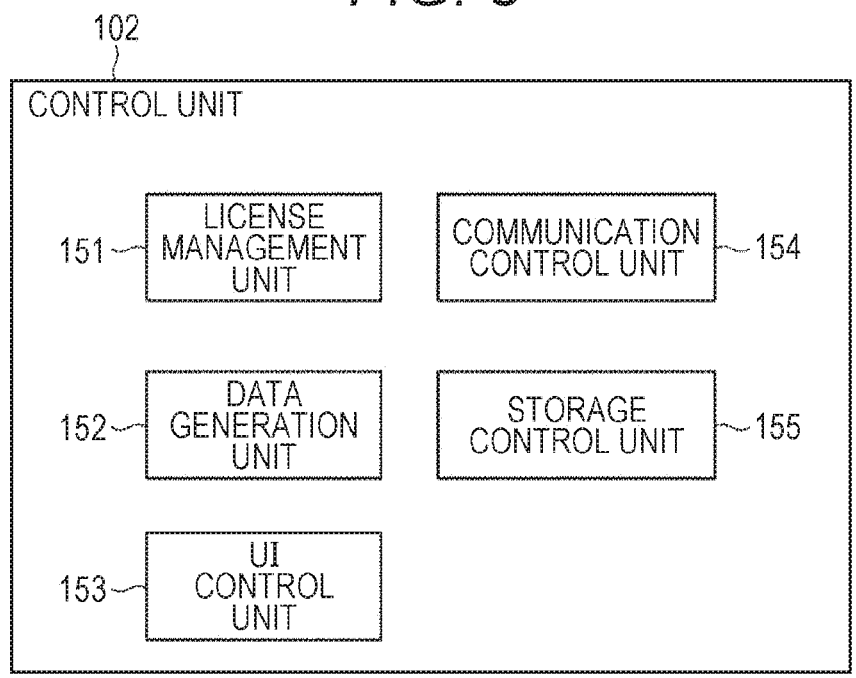
FIG. 3 is a block diagram illustrating a configuration example of a function of a control unit of the server.

FIG. 3 illustrates a configuration example of a function of the control unit 102 of the server 11. The control unit 102 realizes a function including a license management unit 151, a data generation unit 152, a user interface (UI) control unit 153, a communication control unit 154, and a storage control unit 155 by executing, for example, a control program.

The license management unit 151 manages a license of a function used in the electronic device 23.

The data generation unit 152 generates various data to be transmitted to the PC 21.

The UI control unit 153 controls user interfaces in the PC 21 and the electronic device 23. For example, the UI control unit 153 controls a user interface in the PC 21 by generating a display control file for displaying various information on a screen of the PC 21 and transmitting the display control file to the PC 21.

The communication control unit 154 controls communication processing by the communication unit 103. Furthermore, the communication control unit 154 also acquires data to be transmitted to the PC 21 from each unit of the server 11 or supplies data received from the PC 21 to each unit of the server 11.

The storage control unit 155 controls the storage unit 106 to store data and the like regarding the license of the function used in the electronic device 23.

<Configuration Example of Electronic Device 23>

Figure 4:
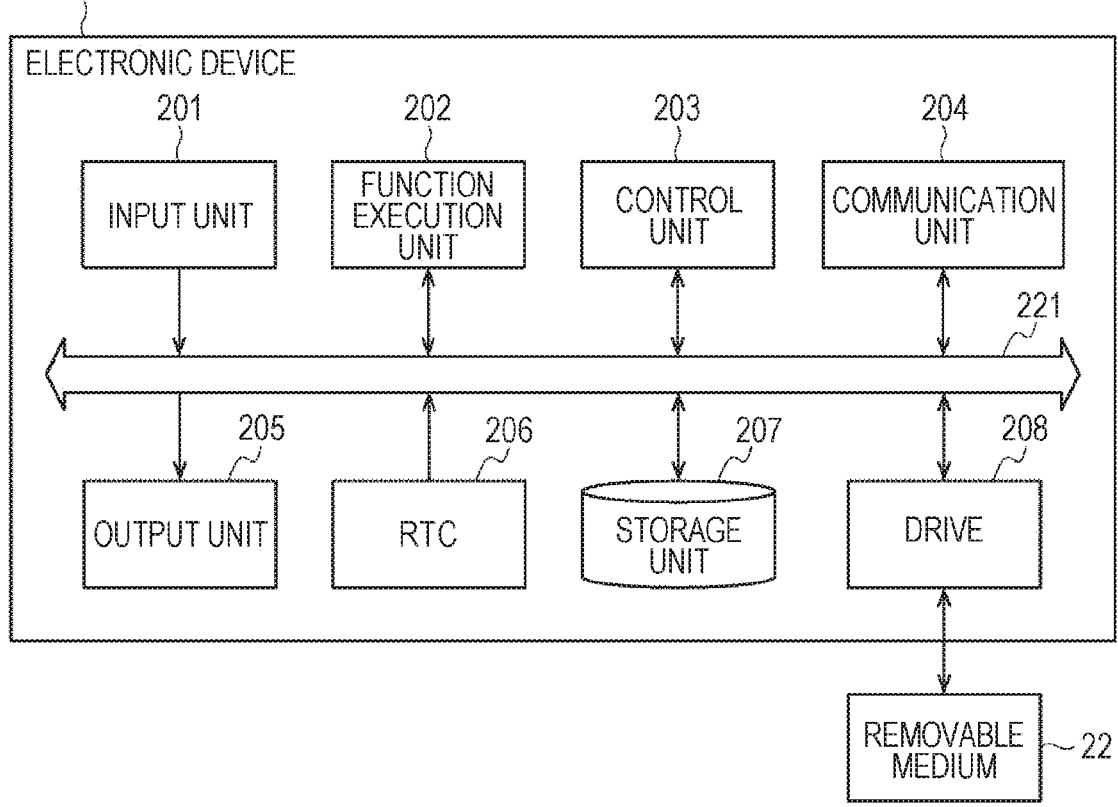
FIG. 4 is a block diagram illustrating a configuration example of an electronic device.

FIG. 4 illustrates a configuration example of the electronic device 23.

The electronic device 23 includes an input unit 201, a function execution unit 202, a control unit 203, a communication unit 204, an output unit 205, an RTC 206, a storage unit 207, and a drive 208. The input unit 201, the function execution unit 202, the control unit 203, the communication unit 204, the output unit 205, the RTC 206, the storage unit 207, and the drive 208 are connected to each other via a bus 221.

The input unit 201 includes, for example, input devices such as a switch, a button, a key, a microphone, an imaging element, and the like, and is used to input various data. The input unit 201 supplies the input data to each unit of the electronic device 23 via the bus 221.

The function execution unit 202 includes various hardware and software for executing the function of the electronic device 23. For example, in a case where the electronic device 23 is a camera, the function execution unit 202 includes a lens, an imaging element, and the like.

The control unit 203 includes, for example, a processor such as a CPU and the like, and controls processing of each unit of the electronic device 23.

The communication unit 204 includes, for example, a communication device and the like, and communicates with the PC 21 or another electronic device (not illustrated) (for example, a smartphone or the like). Note that a communication manner of the communication unit 204 is not particularly limited, and may be any one of a wired communication manner or a wireless communication manner. Furthermore, for example, the communication unit 204 may correspond to a plurality of communication manners.

The output unit 205 includes, for example, output devices such as a display, a speaker, a lighting device, a vibrator, and the like, and outputs various data by an image, a sound, light, vibrations, and the like.

The RTC 206 is a hardware clock that continues to operate by a backup battery and the like even though a power supply of the electronic device 23 is turned off. The RTC 206 is managed so that the user cannot change the date and time (a date and a time).

The storage unit 207 includes at least a non-volatile storage medium, and stores various data or software necessary for processing of the electronic device 23.

The drive 208 can attach and detach the medium 22, and drives the connected medium 22.

Note that, hereinafter, in a case where the respective units of the electronic device 23 exchange data and the like with each other via the bus 221, a description of the bus 221 will be appropriately omitted. For example, in a case where the control unit 203 and the communication unit 204 exchange data with each other via the bus 221, it is simply said that the control unit 203 and the communication unit 204 exchange data with each other.

<Configuration Example of Function of Control Unit 203>

Figure 5:
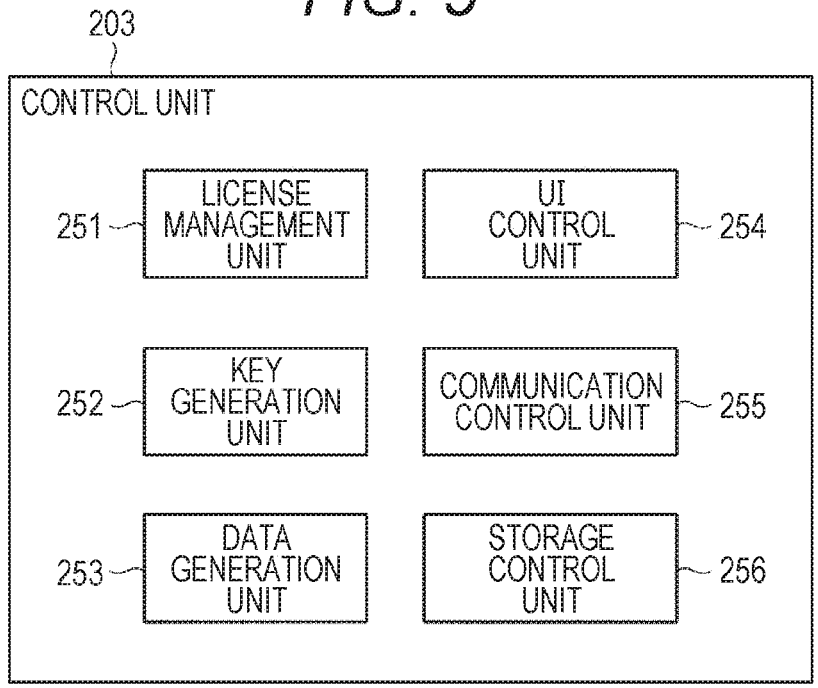
FIG. 5 is a block diagram illustrating a configuration example of a function of a control unit of the electronic device.

FIG. 5 illustrates a configuration example of a function of the control unit 203 of the electronic device 23. The control unit 203 realizes a function including a license management unit 251, a key generation unit 252, a data generation unit 253, a UI control unit 254, a communication control unit 255, and a storage control unit 256 by executing, for example, a control program.

The license management unit 251 manages the license of the function used in the electronic device 23.

The key generation unit 252 generates a device unique key, which is a unique secret key different for every electronic device 23.

The data generation unit 253 generates various data to be transmitted to the server 11 via the PC 21 or the medium 22.

The UI control unit 254 controls the output unit 205 to control a user interface in the electronic device 23.

The communication control unit 255 controls communication processing by the communication unit 204. Furthermore, the communication control unit 255 acquires data to be transmitted to the outside via the communication unit 204 from each unit of the electronic device 23 or supplies data received from the outside via the communication unit 204 to each unit of the electronic device 23.

The storage control unit 256 controls the storage unit 207 to store data and the like regarding the license of the function used in the electronic device 23.

<First Embodiment of Processing of Information Processing System 10>

Next, a first embodiment of processing of the information processing system 10 will be described with reference to FIGS. 6, 7, 8, 9, 10, 11, 12, 13, 14, 15, 16, 17, 18, 19, 20, 21, 22, 23, 24, 25, 26A, 26B, 27, 28A, 28B, 29, 30, 31, 32, 33, 34, 35, 36, and 37.

Note that in the first embodiment, a license of a function used in the electronic device 23 is provided from the server 11 in a subscription and floating manner.

<License Acquisition Processing>

First, license acquisition processing executed by the client 12 will be described with reference to a flowchart of FIG. 6.

In step S1, the PC 21 requests a device information acquisition file.

Figure 7:
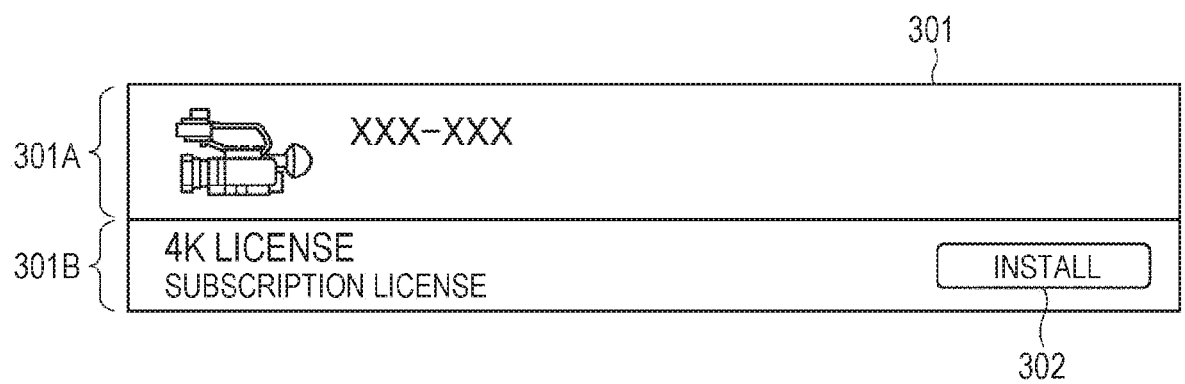
FIG. 7 is a diagram illustrating an example of a screen of a personal computer (PC).

For example, the PC 21 accesses the server 11 via the network 13 according to an operation of the user to display a screen for acquiring the license of the function used in the electronic device 23. For example, a window 301 of FIG. 7 is displayed on the screen of the PC 21.

The window 301 is divided into a device information field 301A and a license information field 301B.

At a left end of the device information field 301A, an image and a type name of the electronic device 23 are displayed laterally side by side.

At a left end of the license information field 301B, a function that becomes a target acquiring a license and a type of the license are shown. In this example, it is shown that a subscription license of an imaging function of a 4K image is an acquisition target.

Note that the user selects an effective term of the license at the time of acquiring the license. For example, a license with two types of effective terms of 30 days or 365 days is provided, and the user selects a license with a desired effective term of the two types of effective terms.

Figure 8:
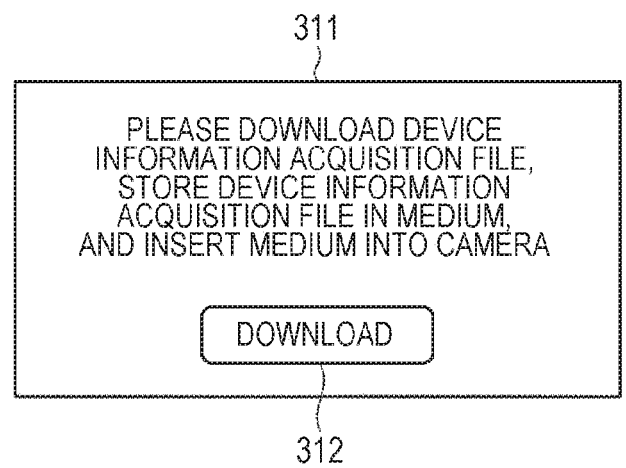
FIG. 8 is a diagram illustrating an example of a screen of the PC.

At a right end of the license information field 301B, an installation button 302 is displayed. When the installation button 302 is pressed, for example, a window 311 of FIG. 8 is displayed on the screen of the PC 21.

In the window 311, a message for prompting the user to download the device information acquisition file, store the device information acquisition file in the medium 22, and insert the medium 22 into the camera (electronic device 23) and a download button 312 are displayed. When the download button 312 is pressed, the PC 21 requests the server 11 to transmit the device information acquisition file, via the network 13.

In response to this request, the server 11 transmits the device information acquisition file to the PC 21 via the network 13 in step S31 of FIG. 13 as described later.

In step S2, the PC 21 receives the device information acquisition file transmitted from the server 11. Furthermore, the PC 21 stores the received device information acquisition file in the medium 22 according to, for example, an operation of the user.

In step S3, the electronic device 23 executes a command in the device information acquisition file.

Specifically, the user detaches the medium 22 in which the device information acquisition file is stored from the PC 21, and connects the medium 22 to the drive 208 of the electronic device 23.

The drive 208 reads the device information acquisition file stored in the medium 22 and supplies the read device information acquisition file to the control unit 203. The control unit 203 executes a device information acquisition command included in the device information acquisition file. Therefore, acquisition processing of device information is started.

Note that, for example, the processing of steps S1 to S3 may be omitted, and the acquisition processing of the device information may be started by operating the electronic device 23 by the user without using the device information acquisition command.

In step S4, the key generation unit 252 determines whether or not the device unique key has been generated. The key generation unit 252 determines that the device unique key has not been generated in a case where the device unique key is not stored in the storage unit 207, and the processing proceeds to step S5.

In step S5, the key generation unit 252 generates the device unique key. A generation method of the device unique key is not particularly limited. The storage control unit 256 causes the storage unit 207 to store the device unique key.

That is, the electronic device 23 generates the device unique key, which is a secret key unique to the electronic device 23, before generating a device information file for the first time after factory shipment. Therefore, it is not necessary to generate the device unique key at the time of the factory shipment and store the device unique key in the electronic device 23, such that a risk of leakage or the like of the device unique key is reduced. Furthermore, for example, by changing firmware of the electronic device 23 or the like, it is possible to change a generation method, a generation timing, or the like, of the device unique key, such that flexibility is improved.

Thereafter, the processing proceeds to step S6.

On the other hand, in step S4, the key generation unit 252 determines that the device unique key has been generated in a case where the device unique key is stored in the storage unit 207, the processing of step S5 is skipped, and the processing proceeds to step S6.

In step S6, the data generation unit 253 sets the current date and time of the RTC 206 as a device RTC. The device RTC is the date and time of the RTC 206 at the time of generating the device information file, and indicates the date and time of the RTC 206 of the electronic device 23 at the time of requesting the license. Furthermore, the device RTC is the reference date and time used for period management of a license to be acquired.

In step S7, the data generation unit 253 encrypts the device unique key with a server public key. Specifically, the data generation unit 253 reads the device unique key and the server public key from the storage unit 207. Note that the server public key is a public key corresponding to a server secret key possessed by the server 11, and is distributed to the electronic device 23 in advance. The data generation unit 253 encrypts the device unique key using the server public key. Therefore, security of the device unique key is ensured, such that tampering, eavesdropping, and the like, of the device unique key are prevented.

In step S8, the data generation unit 253 generates storage data including a device unique identification (ID), the device RTC, and the device unique key. Specifically, the data generation unit 253 reads the device unique ID from the storage unit 207. The device unique ID is an ID uniquely allocated to each electronic device 23, and includes, for example, a type name and a serial number of the electronic device 23. The data generation unit 253 generates storage data including the device unique ID, the device RTC, and the encrypted device unique key.

In step S9, the data generation unit 253 calculates a hash value of the storage data using the device unique key. Note that a hash function used to calculate the hash value is not particularly limited.

In step S10, the data generation unit 253 generates a device information file including the storage data and the hash value. Therefore, security of the storage data is ensured using the device unique key.

This device information file is used by the server 11 to issue a license as a license request file for requesting issuance of the license.

In step S11, the data generation unit 253 stores the device information file in the medium 22 via the drive 208.

At this time, for example, the output unit 205 displays a window 321 of FIG. 9 under the control of the UI control unit 254. In the window 321, a message for notifying the user that the device information file has been written out and an OK button 322 are displayed. When the OK button 322 is pressed, the window 321 is closed.

In step S12, the PC 21 transmits the device information file to the server 11.

For example, the user detaches the medium 22 from the electronic device 23, and connects the medium 22 to the PC 21. The PC 21 displays, for example, a window 331 of FIG. 10 on the screen.

In the window 331, a message for prompting the user to upload the device information file acquired from the camera (electronic device 23) and an upload button 332 are displayed. When the upload button 332 is pressed, the PC 21 reads the device information file from the medium 22 and transmits the read device information file to the server 11 via the network 13.

In response to this transmission, the server 11 receives the device information file in step S32 of FIG. 13 as described later.

In step S13, the PC 21 determines whether or not to acquire a license communication file.

The server 11 transmits a display control file for finally confirming execution of installation of the license via the network 13 in step S34 of FIG. 13 as described later, in a case where it is determined that the device information file received from the PC 21 is valid.

The PC 21 displays a window 341 of FIG. 11 on the screen on the basis of the display control file.

In the window 341, a device unique ID of the camera (electronic device 23), a message for confirming the execution of the installation of the license in the camera, and an installation button 342 are displayed. When the installation button 342 is pressed, for example, a window 351 of FIG. 12 is displayed on the screen of the PC 21.

In the window 351, a message for prompting the user to download the license communication file, store the license communication file in the medium 22, and insert the medium 22 into the camera (electronic device 23) and a download button 352 are displayed. Then, when the download button 352 is pressed, the PC 21 determines to acquire the license communication file and requests the server 11 to transmit the license communication file via the network 13. Thereafter, the processing proceeds to step S14.

In response to this request, the server 11 transmits the license communication file including an installation key and the like in step S40 of FIG. 13 as described later.

In step S14, the PC 21 receives the license communication file from the server 11 via the network 13.

In step S15, the PC 21 stores the license communication file in the medium 22 according to, for example, an operation of the user.

Thereafter, the license acquisition processing ends.

On the other hand, in step S13, the PC 21 determines not to acquire the license communication file in a case where the display control file for finally confirming the execution of the installation of the license has not been received or in a case where an instruction on the acquisition of the license communication file has not been given. Thereafter, the processing of steps S14 and S15 is skipped, such that the license acquisition processing ends without acquiring the license communication file.

<License Issuance Processing>

Next, license issuance processing executed by the server 11, corresponding to the license acquisition processing by the client 12 of FIG. 6 will be described with reference to a flowchart of FIG. 13.

Figure 6:
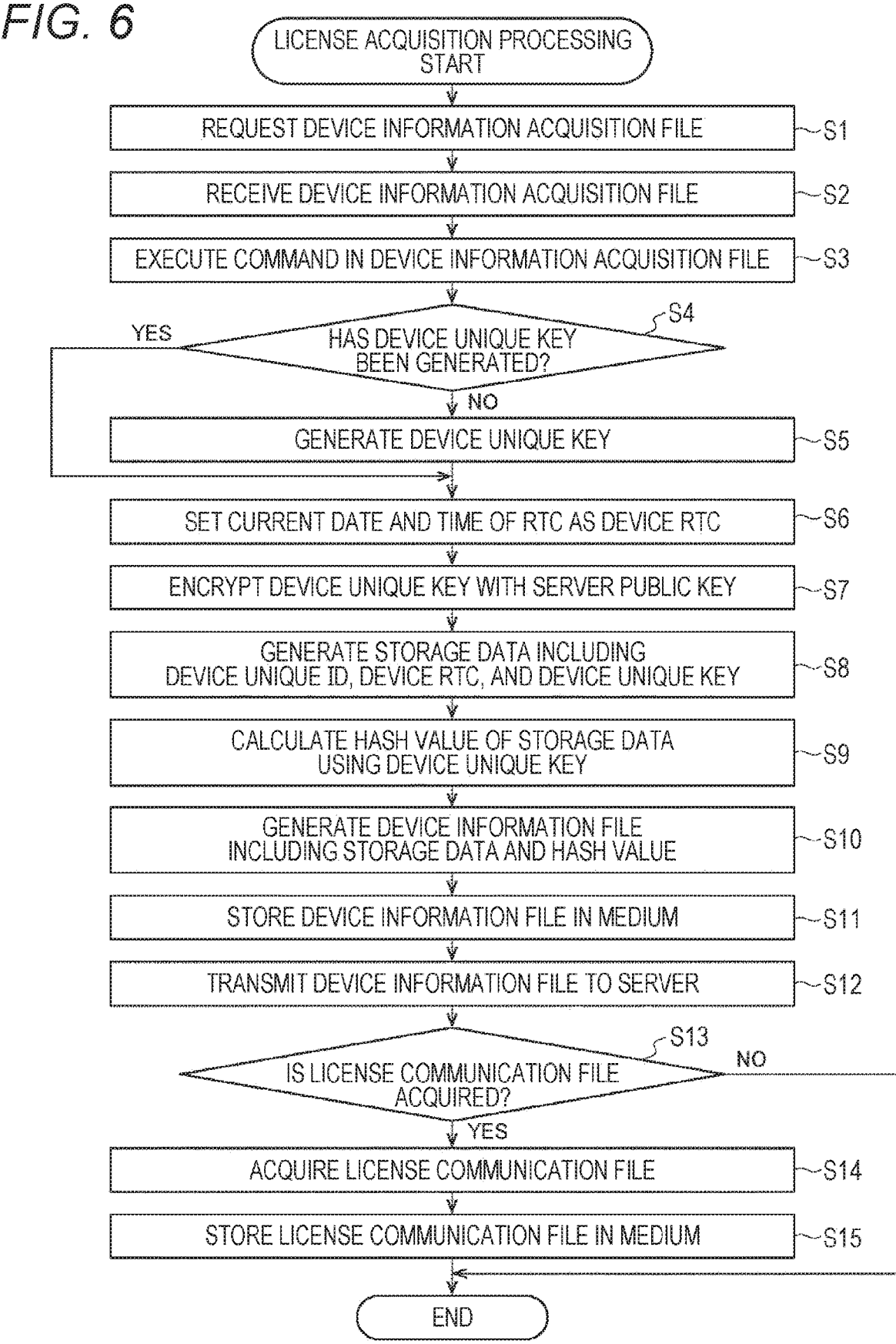
FIG. 6 is a flowchart for describing license acquisition processing executed by a client.

Note that this processing is started, for example, when the server 11 has received the request for the device information acquisition file from the PC 21 in step S1 of FIG. 6 described above.

In step S31, the server 11 transmits the device information acquisition file. Specifically, the data generation unit 152 generates the device information acquisition file including the device information acquisition command. The communication unit 103 transmits the device information acquisition file to the PC 21 via the network 13 under the control of the communication control unit 154.

Note that the processing of step S31 can be omitted by omitting the processing of steps S1 to S3 of FIG. 6 of the electronic device 23 as described above.

In step S32, the server 11 receives the device information file. Specifically, the communication control unit 154 receives the device information file transmitted from the PC 21 in the processing of step S12 of FIG. 6 described above, via the communication unit 103.

In step S33, the license management unit 151 determines whether or not the device information file is valid. Specifically, the license management unit 151 reads the server secret key corresponding to the server public key used to encrypt the device unique key included in the device information file, from the storage unit 106. The license management unit 151 decrypts the device unique key using the read server secret key.

Next, the license management unit 151 calculates a hash value of the storage data included in the device information file using the same hash function as that of the electronic device 23 and the decrypted device unique key. Then, the license management unit 151 determines that the device information file is valid in a case where the calculated hash value coincides with a hash value in the device information file, and the processing proceeds to step S34.

Therefore, tampering or the like of the device unique ID, the device RTC, and the device unique key in the storage data is prevented.

In step S34, the license management unit 151 determines whether or not to transmit the license communication file.

Specifically, the UI control unit 153 generates the display control file for finally confirming the execution of the installation of the license. The communication unit 103 transmits the display control file to the PC 21 via the network 13 under the control of the communication control unit 154.

Then, the license management unit 151 determines to transmit the license communication file in a case where the PC 21 requests the server to transmit the license communication file in step S13 of FIG. 6 described above, and the processing proceeds to step S35.

In step S35, the license management unit 151 generates an installation key.

FIG. 14 illustrates an example of a format of an installation key.

The installation key includes a function ID, system unique information, a device unique ID, an expiration time, and an effective term.

The function ID is an ID for identifying a function that becomes a target of a license.

The system unique information is a serial number including alphanumeric characters generated by the server 11, and is different for every installation key.

The device unique ID is a device unique ID of the electronic device 23 that becomes a target to which the license is to be provided, and the device unique ID of the electronic device 23 included in the device information file is used.

The expiration time indicates the date and time when the license expires, and is represented by, for example, year, month, day, hour, minute, and second. Furthermore, the expiration time is set on the basis of the device RTC included in the device information file, that is, the RTC 206 of the electronic device 23. For example, the expiration time is set to a value obtained by adding the effective term and a grace time to the device RTC in the device information file.

Here, the grace time is a time set on the assumption that a time is required to install the license in the electronic device 23. That is, the electronic device 23 exchanges data with the PC 21 via the medium 22, and the PC 21 communicates with the server 11. Therefore, as compared with a case where the electronic device 23 directly communicates with the server 11, it takes time to install the license. Therefore, a predetermined grace time is added, in addition to the actual effective term of the license.

The effective term indicates an effective term of the license. For example, the effective term is set to a value representing the effective term selected by the user in units of hours.

Note that it is also possible to install licenses of a plurality of functions at a time, and in this case, for example, a plurality of installation keys is generated for every function.

In step S36, the data generation unit 152 generates storage data including the device RTC, the installation key, and a user ID The user ID is a unique ID of the user who is a right holder of the license.

Note that in a case where the licenses of the plurality of functions are installed at a time, installation keys of each function are stored in the storage data.

In step S37, the data generation unit 152 calculates a hash value of the storage data using the device unique key. That is, the data generation unit 152 calculates a hash value of the storage data using the same hash function as that of the electronic device 23 and the device unique key included in the device information file.

In step S38, the data generation unit 152 generates a license communication file including the storage data and the hash value. Specifically, the data generation unit 152 generates a signature by encrypting the hash value using the server secret key. Then, the data generation unit 152 generates a license communication file including the storage data and the signature (encrypted hash value). Therefore, security of the storage data is ensured using the device unique key.

Note that the license communication file is also an installation file used to install the license in the electronic device 23.

In step S39, the server 11 stores license information. For example, the storage control unit 155 causes the storage unit 106 to store license information including a combination of the current date and time of the RTC 105, the user ID, the device unique ID, the device unique key, the installation key, the device RTC, and the expiration time, the effective term, and the number of times of update of the license.

Note that, for example, an expiration time based on the RTC 206 of the electronic device 23 (hereinafter, referred to as a client expiration time) and an expiration time based on the RTC 105 of the server 11 (hereinafter, referred to as a server expiration time) are included in the license information as the expiration time of the license. The client expiration time is equal to the expiration time included in the installation key. The server expiration time is set to, for example, a value obtained by adding the effective term and the grace time to the current date and time of the RTC 105.

Furthermore, the number of times of the update of the license is set to 0 as an initial value.

Moreover, an approximate deviation between the RTC 105 of the server 11 and the RTC 206 of the electronic device 23 is grasped on the basis of a difference between the current date and time of the RTC 105 and the device RTC.

Furthermore, in a case where the licenses of the plurality of functions are installed at a time, for example, different license information may be generated and stored for every license or license information including all licenses may be generated and stored.

In step S40, the communication unit 103 transmits the license communication file to the PC 21 under the control of the communication control unit 154.

Thereafter, the license issuance processing ends.

On the other hand, in step S34, the license management unit 151 determines not to transmit the license communication file in a case where the PC 21 does not request the server to transmit the license communication file in step S13 of FIG. 6 described above, the processing of steps S35 to S40 is skipped, and the license issuance processing ends. That is, the generation of the installation key and the transmission of the license communication file are not performed.

Furthermore, in step S33, the license management unit 151 determines that the device information file is not valid in a case where the calculated hash value does not coincide with the hash value in the device information file, the processing of steps S34 to S40 is skipped, and the license issuance processing ends. That is, the generation of the installation key and the transmission of the license communication file are not performed.

<License Start Processing>

Next, license start processing executed by the electronic device 23 will be described with reference to a flowchart of FIG. 15.

Figure 16:
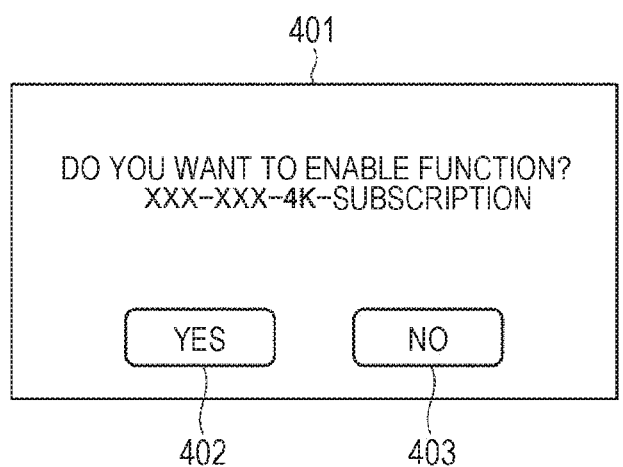
FIG. 16 is a diagram illustrating an example of a screen of the electronic device.

For example, when the medium 22 in which the license communication file is stored is connected to the drive 208 of the electronic device 23, the output unit 205 displays a window 401 of FIG. 16 under the control of the UI control unit 254, for example.

In the window 401, a type name of the electronic device 23, a type of function and a license type, and a message for confirming whether or not to enable the function are displayed. Furthermore, a YES button 402 and a NO button 403 are displayed in the window 401. Then, in a case where the YES button 402 is pressed, the license start processing is started. On the other hand, in a case where the NO button 403 is pressed, the license start processing is not started.

In step S61, the license management unit 251 determines whether or not the license communication file is valid. Specifically, the license management unit 251 reads the license communication file from the medium 22 via the drive 208. Furthermore, the license management unit 251 reads the device unique key and the server public key from the storage unit 207.

The license management unit 251 decrypts the signature included in the license communication file using the server public key. Therefore, the hash value of the storage data included in the license communication file is obtained. Furthermore, the license management unit 251 calculates the hash value of the storage data of the license communication file using the same hash function as that of the server 11 and the device unique key. Then, the license management unit 251 determines that the license communication file is valid in a case where the calculated hash value coincides with a hash value in the license communication file, and the processing proceeds to step S62.

Therefore, tampering or the like of the device RTC and the installation key in the storage data is prevented.

In step S62, the license management unit 251 determines whether or not the installation key is an installation key that has been installed in the past. The license management unit 251 determines that the installation key is not the installation key that has been installed in the past in a case where an installation key coinciding with the installation key included in the license communication file is not stored in the storage unit 207, and the processing proceeds to step S63.

Therefore, it is prevented that the license is installed doubly using the installation key that has been installed in the past.

In step S63, the license management unit 251 determines whether or not the device unique ID in the installation key coincides with that of an own device. The license management unit 251 determines that the device unique ID in the installation key coincides with that of the own device in a case where the device unique ID in the installation key coincides with the device unique ID of the electronic device 23 stored in the storage unit 207, and the processing proceeds to step S64.

Therefore, it is prevented that the license is installed using an installation key for another electronic device 23.

In step S64, the license management unit 251 determines whether or not the device RTC is on and after the current date and time. In a case where the license management unit 251 determines that the device RTC included in the license communication file is before the current date and time of the RTC 206, the processing proceeds to step S65.

In step S65, the license management unit 251 determines whether or not an expiration time of the license has expired. Specifically, the license management unit 251 compares the expiration time of the installation key (client expiration time) with the current date and time of the RTC 206. Then, the license management unit 251 determines that the expiration time of the license has not expired in a case where the expiration time of the license is after the current date and time of the RTC 206, and the processing proceeds to step S66.

In step S66, the license management unit 251 determines whether or not an interval between the device RTC and the current date and time is equal to or longer than the grace time. In a case where the license management unit 251 compares the device RTC with the current date and time of the RTC 206 to determine that the interval between the device RTC and the current date and time is less than the grace time, the processing proceeds to step S67.

This is, for example, a case where installation of the license in the electronic device 23 has been performed within the grace time (for example, one hour) since the device RTC was set in the processing of step S6 of FIG. 6 described above.

In step S67, the license management unit 251 activates the license. That is, the license management unit 251 makes a function whose license is given by the installation key usable.

Note that in a case where the installation keys of the plurality of functions are included in the license communication file, all of those functions are made usable.

Furthermore, software realizing the function may be installed in the electronic device 23 in advance or may be installed at this time.

In step S68, the electronic device 23 stores the license information. The storage control unit 256 controls the storage unit 207 to store the license information including a combination of the user ID, the current date and time of the RTC 206, the installation key, and the expiration time, the effective term, and the number of times of the update of the license. Note that the current date and time of the RTC 206 is the date and time when the license is started to be used. Furthermore, the number of times of the update of the license is set to 0 as an initial value.

Furthermore, in a case where the licenses of the plurality of functions have been installed at a time, for example, different license information may be generated and stored for every license or license information including all licenses may be generated and stored.

Thereafter, the license start processing ends.

On the other hand, in step S66, in a case where the license management unit 251 determines that the interval between the device RTC and the current date and time of the RTC 206 is equal to or longer than the grace time, the processing proceeds to step S69.

This is, for example, a case where installation of the license in the electronic device 23 has been performed after the grace time (for example, one hour) has elapsed since the device RTC was set in the processing of step S6 of FIG. 6 described above.

Furthermore, in step S65, the license management unit 251 determines that the expiration time of the license has expired in a case where the expiration time of the license is before the current date and time of the RTC 206, and the processing proceeds to step S69.

This is, for example, a case where the installation of the license in the electronic device 23 has been performed after the expiration time of the license has expired.

In step S69, license re-acquisition processing is executed, and thereafter, the license management processing ends.

Note that details of the license re-acquisition processing will be described later with reference to FIG. 17.

On the other hand, in a case where it is determined in step S64 that the device RTC is on and after the current date and time of the RTC 206, the license start processing ends.

This is, for example, a case where tampering of the device RTC, abnormality of the RTC 206, or the like, has occurred.

Furthermore, in a case where it is determined in step S63 that the device unique ID in the installation key does not coincide with that of the own device, the license start processing ends.

This is, for example, a case where it has been attempted to connect the medium 22 to a different electronic device 23 to install the license, a case where an erroneous license communication file has been received, a case where the installation key has been tampered with, or the like.

Moreover, in step S62, the license management unit 251 determines that the installation key is the installation key that has been installed in the past in a case where the installation key coinciding with the installation key included in the license communication file is stored in the storage unit 207, and the license start processing ends.

This is a case where it has been attempted to install the previously installed license again.

Furthermore, in step S61, the license management unit 251 determines that the license communication file is not valid in a case where the calculated hash value does not coincide with the hash value in the license communication file, and the license start processing ends.

This is a case where tampering or the like of the license communication file has been performed.

In such a manner, even though the server 11 and the electronic device 23 do not directly communicate with each other, the license can be installed in the electronic device 23 in a safe status to make the function of the electronic device 23 usable.

Furthermore, by adding the grace time to the effective term of the license, it is prevented that a term in which the license can be used is shortened even though it takes time to install the license because the server 11 and the electronic device 23 do not directly communicate with each other.

Moreover, even though the server 11 and the electronic device 23 do not communicate directly with each other, a deviation between an expiration time (server expiration time) of the license grasped by the server 11 and an actual expiration time (client expiration time) of the license is suppressed within the grace time. Therefore, for example, a promotion such as update of the license, or the like, can be performed at an appropriate timing.

<License Re-Acquisition Processing>

Next, details of the license re-acquisition processing of step S69 of FIG. 15 will be described with reference to a flowchart of FIG. 17.

In step S101, the PC 21 requests a license re-issuance file.

Figure 18:
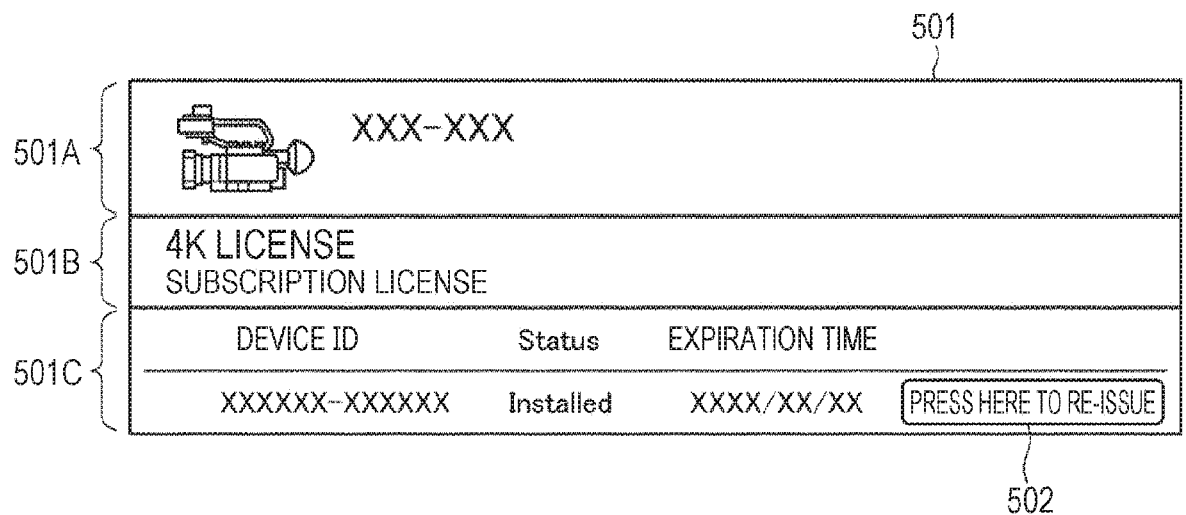
FIG. 18 is a diagram illustrating an example of a screen of the PC.

For example, the PC 21 accesses the server 11 via the network 13 according to an operation of the user to display a screen for requesting re-issuance of the license. For example, a window 501 of FIG. 18 is displayed on the screen of the PC 21.

The window 501 is divided into a device information field 501A, a license information field 501B, and a license detailed information field 501C.

At a left end of the device information field 501A, an image and a type name of the electronic device 23 are displayed laterally side by side.

At a left end of the license information field 501B, a function that becomes a target re-issuing the license and a type of the license are shown. In this example, it is shown that a subscription license of an imaging function of a 4K image is a re-issuance target.

In the license detailed information field 501C, a detailed status of the license of the function that becomes the target is shown. In this example, a device unique ID of the electronic device 23, a current status of the license, and an expiration time of the license are displayed. Note that the current status of the license is "Installed" regardless of whether or not the license has been actually installed in the electronic device 23, at a point in time of downloading the license communication file.

At a right end of the license detailed information field 501C, a re-issuance button 502 is displayed. When the re-issuance button 502 is pressed, license re-issuance processing is started. For example, when the re-issuance button 502 is pressed, the PC 21 requests the server 11 to transmit the license re-issuance file, via the network 13.

Figure 23:
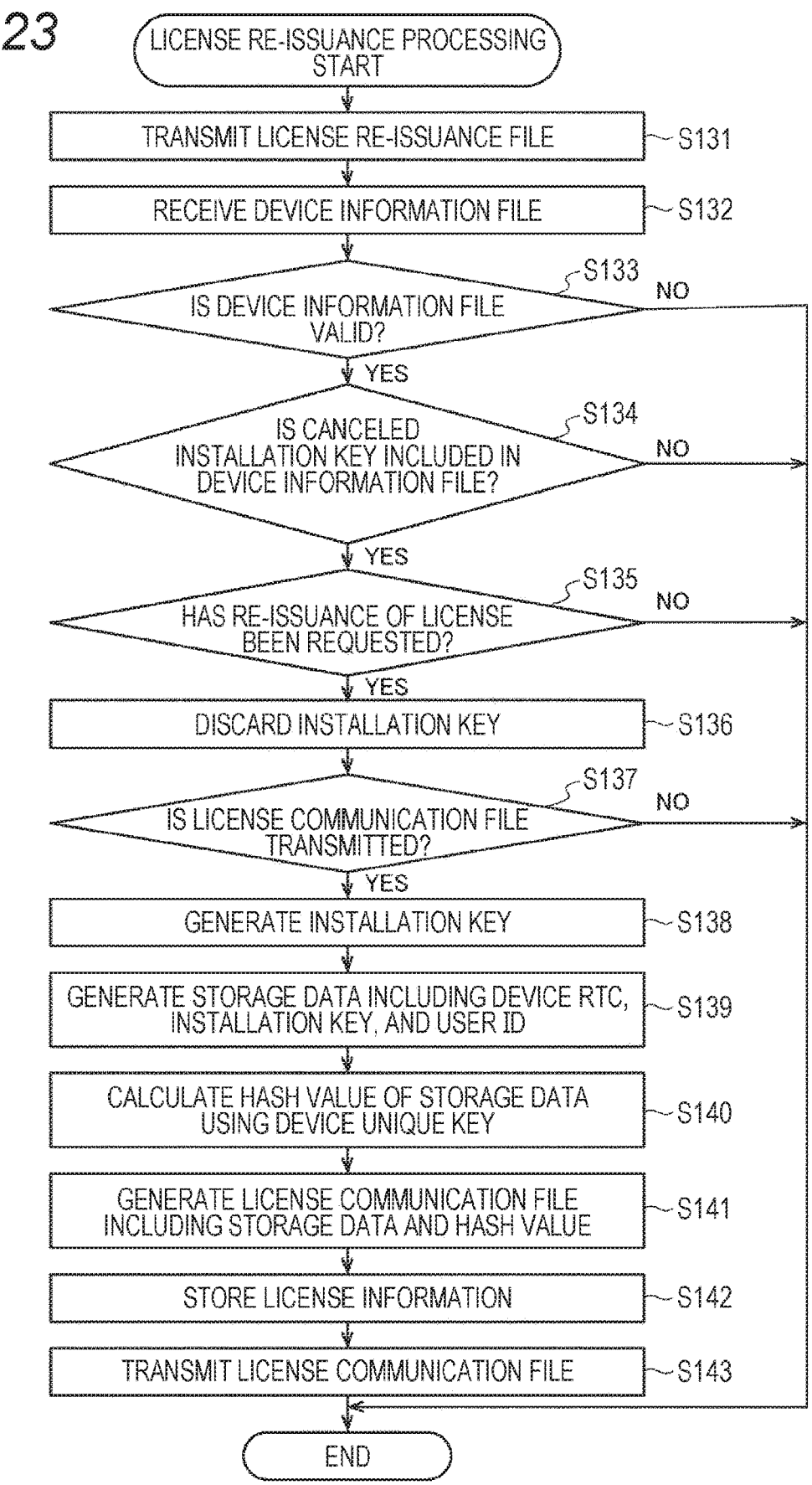
FIG. 23 is a flowchart for describing license re-issuance processing executed by the server.

In response to this request, the server 11 transmits the license re-issuance file to the PC 21 via the network 13 in step S131 of FIG. 23 as described later.

In step S102, the PC 21 receives the license re-issuance file transmitted from the server 11. Furthermore, the PC 21 stores the received license re-issuance file in the medium 22 according to, for example, an operation of the user.

Figure 19:
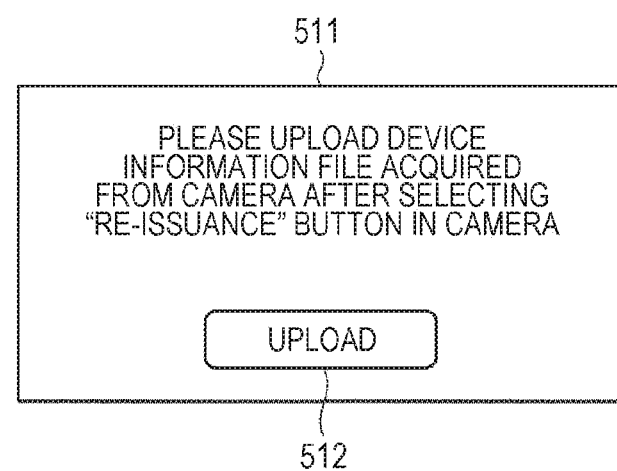
FIG. 19 is a diagram illustrating an example of a screen of the PC.
Figure 20:
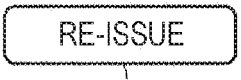
FIG. 20 is a diagram illustrating an example of a screen of the PC.

At this time, for example, a window 511 of FIG. 19 is displayed on the screen of the PC 21.

In the window 511, a message for prompting the user to upload the device information file acquired from the camera (electronic device 23) after selecting a "re-issuance" button in the camera (electronic device 23), and an upload button 512 are displayed.

In step S103, the electronic device 23 executes a command in the license re-issuance file.

Specifically, the user detaches the medium 22 in which the license re-issuance file is stored from the PC 21, and connects the medium 22 to the drive 208 of the electronic device 23.

The drive 208 reads the license re-issuance file stored in the medium 22 and supplies the read license re-issuance file to the control unit 203. The control unit 203 executes a license re-issuance command included in the license re-issuance file.

Therefore, for example, the output unit 205 displays a screen including a "re-issuance" button under the control of the UI control unit 254. Then, when the "re-issuance" button is pressed, acquisition processing of device information is started.

Note that, for example, the processing of steps S101 to S103 may be omitted, and the acquisition processing of the device information may be started by operating the electronic device 23 by the user without using the license re-issuance command.

In step S104, the current date and time of the RTC 206 is set as the device RTC, similarly to the processing of step S6 of FIG. 6.

In step S105, the device unique key is encrypted with the server public key, similarly to the processing of step S7 of FIG. 6.

In step S106, the data generation unit 253 generates storage data including a device unique ID, the device RTC, the device unique key, and a canceled installation key. Specifically, the data generation unit 253 reads the device unique ID and an installation key for a license whose installation has been canceled (canceled installation key) from the storage unit 207. The data generation unit 253 generates storage data including the device unique ID, the device RTC, the encrypted device unique key, and the canceled installation key.

In step S107, a hash value of the storage data is calculated using the device unique key, similarly to the processing of step S9 of FIG. 6.

In step S108, a device information file including the storage data and the hash value is generated, similarly to the processing of step S10 of FIG. 6. This device information file is used by the server 11 to re-issue a license as a license re-request file for requesting re-issuance of the license.

In step S109, the device information file is stored in the medium 22, similarly to the processing of step S11 of FIG. 6.

In step S110, the PC 21 transmits the device information file to the server 11.

For example, the user detaches the medium 22 from the electronic device 23, and connects the medium 22 to the PC 21. Then, for example, when the upload button 512 in the window 511 of FIG. 19 described above is pressed, the PC 21 reads the device information file from the medium 22 and transmits the read device information file to the server 11 via the network 13.

In response to this transmission, the server 11 receives the device information file in step S132 of FIG. 23 as described later. Then, the server 11 notifies the PC 21 that the license can be re-issued, via the network 13 in step S134, if the device information file includes the canceled installation key and is valid.

In step S111, the PC 21 determines whether or not to request re-issuance of the license. For example, in a case where the PC 21 has been notified from the server 11 that the license can be re-issued, the PC 21 displays a window 521 of FIG. 20 on the screen.

In the window 521, a message to cancel installation and perform re-issuance of the installation key and a re-issuance button 522 are displayed. Furthermore, information regarding the license whose installation is canceled is displayed in the message. The information regarding the license includes, for example, a type name of the electronic device 23, a function name, and a type of the license.

Then, when the re-issuance button 522 is pressed, the PC 21 determines to request the re-issuance of the license, and requests the server 11 to re-issue the license, via the network 13. Thereafter, the processing proceeds to step S112.

In step S112, the PC 21 determines whether or not to acquire a license communication file.

Specifically, when the re-issuance of the license is requested, the server 11 discards a current installation key of the license in step S136 of FIG. 23 as described later, and then, transmits a display control file for notifying the PC 21 that the installation key can be re-issued, to the PC 21.

Figure 21:
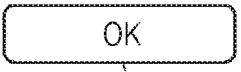
FIG. 21 is a diagram illustrating an example of a screen of the PC.
Figure 22:
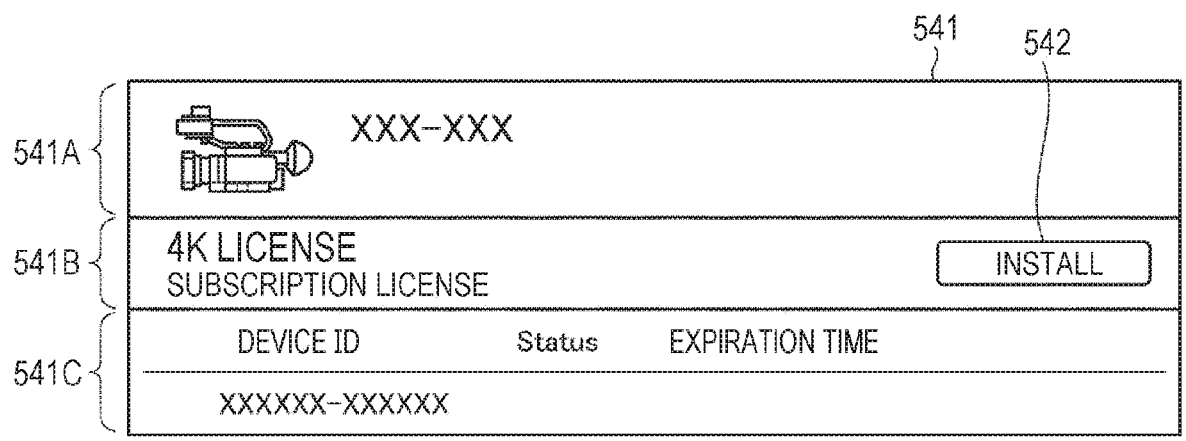
FIG. 22 is a diagram illustrating an example of a screen of the PC.

In response to this transmission, the PC 21 displays, for example, a window 531 of FIG. 21 on the screen. In the window 531, a message for prompting the user to cancel the installation of the license and installing the license again, and an OK button 532 are displayed. When the OK button 532 is pressed, a window 541 of FIG. 22 is displayed on the screen of the PC 21.

The window 541 is divided into a device information field 541A, a license information field 541B, and a license detailed information field 541C, similarly to the window 501 of FIG. 18, and has display contents substantially similar to those of the window 501. However, the window 541 is different from the window 501 in that the re-issuance button 502 disappears and an installation button 542 is displayed at a right end of the license information field 501B. Furthermore, the window 541 is different from the window 501 in that nothing is displayed with respect to a current status of the license and an expiration time.

Then, when the installation button 542 is pressed, the PC 21 determines to acquire the license communication file and requests the server 11 to transmit the license communication file via the network 13. Thereafter, the processing proceeds to step S113.

In response to this request, the server 11 transmits the license communication file including an installation key and the like in step S143 of FIG. 23 as described later.

In step S113, the license communication file is received, similarly to the processing of step S14 of FIG. 6.

In step S114, the license communication file is stored in the medium 22, similarly to the processing of step S15 of FIG. 6.

Thereafter, the license re-acquisition processing ends.

<License Re-Issuance Processing>

Next, license re-issuance processing executed by the server 11, corresponding to the license re-acquisition processing by the client 12 of FIG. 17 will be described with reference to a flowchart of FIG. 23.

Figure 17:
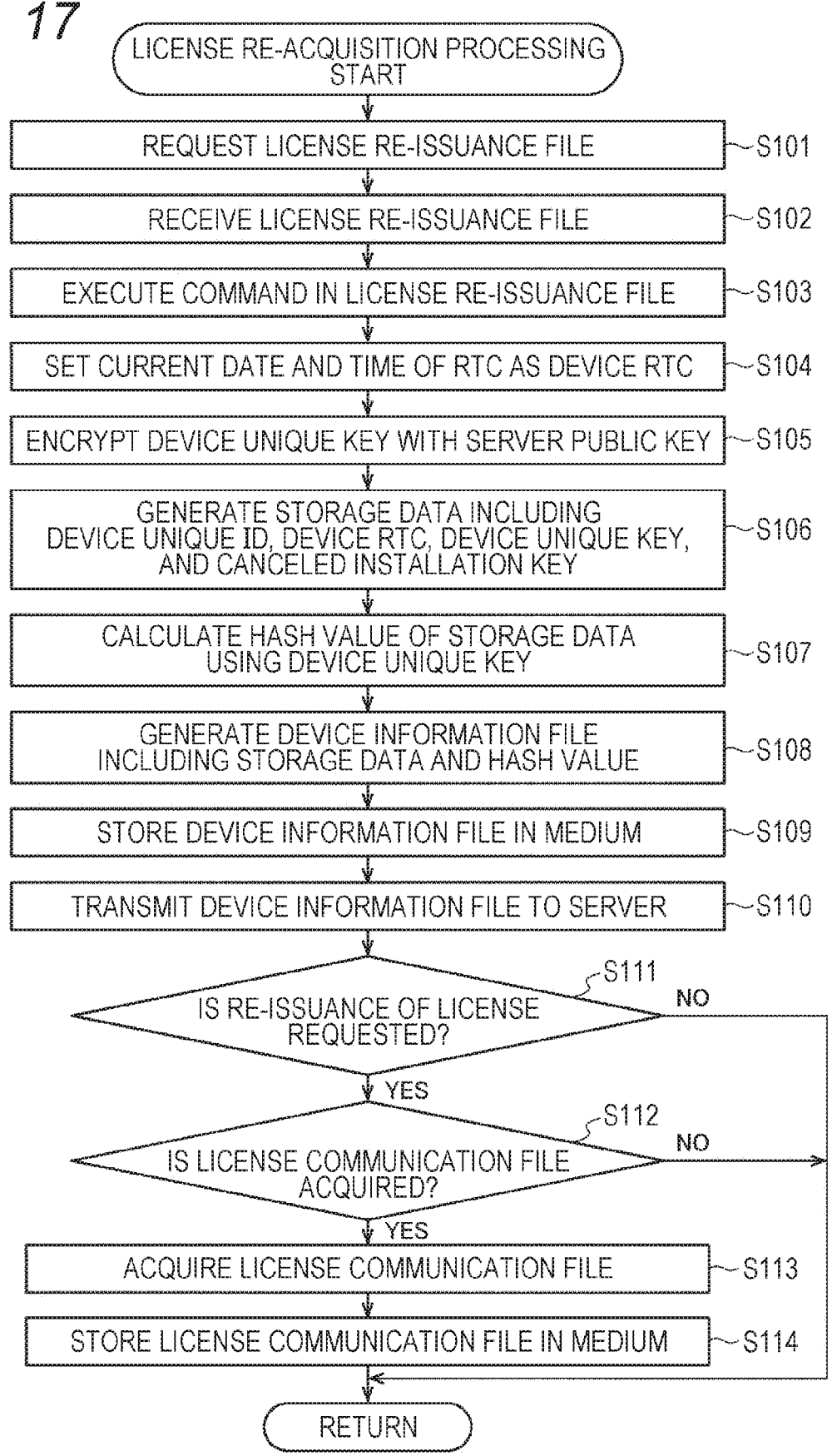
FIG. 17 is a flowchart for describing license re-acquisition processing executed by the client.

Note that this processing is started, for example, when the server 11 has received the request for the license re-issuance file from the PC 21 in step S101 of FIG. 17 described above.

In step S131, the server 11 transmits the license re-issuance file. Specifically, the data generation unit 152 generates the license re-issuance file including the license re-issuance command. The communication unit 103 transmits the license re-issuance file to the PC 21 via the network 13 under the control of the communication control unit 154.

Note that the processing of step S131 can be omitted by omitting the processing of steps S101 to S103 of FIG. 17 of the electronic device 23 as described above.

In step S132, the server 11 receives the device information file. Specifically, the communication control unit 154 receives the device information file transmitted from the PC 21 in the processing of step S110 of FIG. 17 described above, via the communication unit 103.

Figure 13:
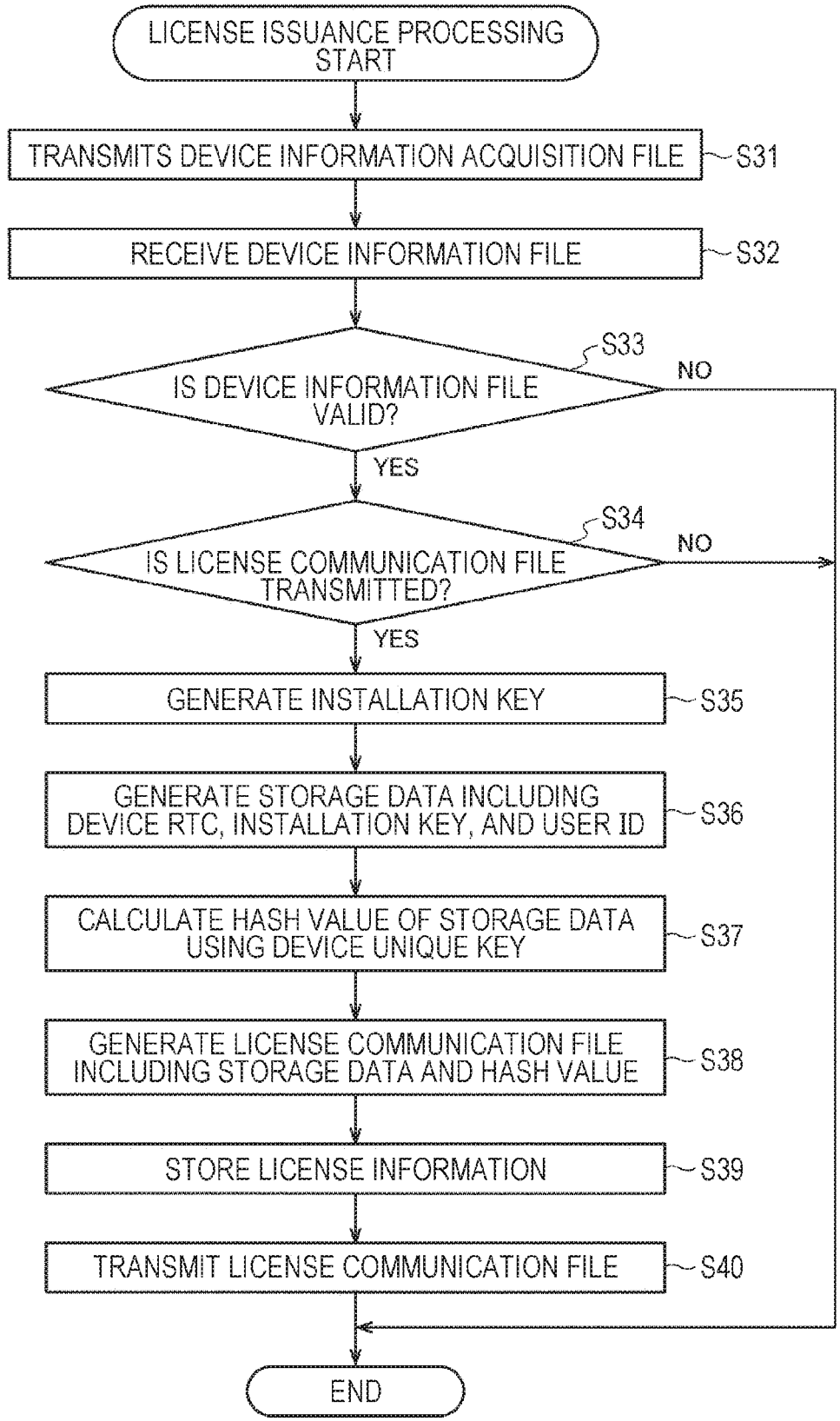
FIG. 13 is a flowchart for describing license issuance processing executed by the server.

In step S133, it is determined whether or not the device information file is valid, similarly to the processing of step S33 of FIG. 13. In a case where it is determined that the device information file is valid, the processing proceeds to step S134.

In step S134, the license management unit 151 determines whether or not the canceled installation key is included in the device information file. In a case where it is determined that the canceled installation key is included in the device information file, the processing proceeds to step S135. At this time, the communication unit 103 notifies the PC 21 that the license can be re-issued, via the network 13 under the control of the communication control unit 154.

In step S135, the license management unit 151 determines whether or not the re-issuance of the license has been requested. The license management unit 151 determines that the re-issuance of the license has been requested in a case where the re-issuance of the license has been requested from the PC 21 in step S111 of FIG. 17 described above, and the processing proceeds to step S136.

In step S136, the license management unit 151 discards the installation key. For example, the license management unit 151 updates the information with the installation key as the installation key for the license whose installation has been canceled, in the license information including the installation key included in the device information file among the license information stored in the storage unit 106.

Furthermore, the UI control unit 153 also generates a display control file for notifying the PC 21 that the installation key can be re-issued. The communication unit 103 transmits the display control file to the PC 21 via the network 13 under the control of the communication control unit 154.

In step S137, the license management unit 151 determines whether or not to transmit the license communication file. The license management unit 151 determines to transmit the license communication file in a case where the PC 21 requests the server to transmit the license communication file in step S112 of FIG. 17 described above, and the processing proceeds to step S138.

In step S138, the installation key is generated, similarly to the processing of step S35 of FIG. 13 described above. At this time, the expiration time (client expiration time) is set on the basis of the device RTC included in the device information file received in the processing of step S132. That is, the license expiration time is updated on the basis of the newly acquired device RTC.

Thereafter, in steps S139 to S143, processing similar to that of steps S36 to S40 of FIG. 13 described above is performed. Therefore, a license communication file including the device RTC in the device information file received in step S132 and the regenerated installation key is generated and transmitted to the PC 21.

Thereafter, the license re-issuance processing ends.

On the other hand, in step S137, the license management unit 151 determines not to transmit the license communication file in a case where the PC 21 does not request the server to transmit the license communication file in step S112 of FIG. 17 described above, the processing of steps S138 to S143 is skipped, and the license re-issuance processing ends.

That is, the regeneration of the installation key and the transmission of the license communication file are not performed. However, by again requesting the re-issuance of the license from the PC 21 later, it is possible to cause the server 11 to regenerate the installation key and transmit the license communication file including the regenerated installation key.

Furthermore, in step S135, the license management unit 151 determines that the re-issuance of the license has not been requested in a case where the re-issuance of the license has not been requested from the PC 21 in step S111 of FIG. 17 described above, the processing of steps S136 to S143 is skipped, and the license re-issuance processing ends. That is, the regeneration of the installation key and the transmission of the license communication file are not performed.

Moreover, in a case where it is determined in step S134 that the canceled installation key is not included in the device information file, the processing of steps S135 to S143 is skipped, and the license re-issuance processing ends. That is, the regeneration of the installation key and the transmission of the license communication file are not performed.

Furthermore, in a case where it is determined in step S133 that the device information file is not valid, the processing of steps S134 to S143 is skipped, and the license re-issuance processing ends. That is, the regeneration of the installation key and the transmission of the license communication file are not performed.

In such a manner, even though the server 11 and the electronic device 23 do not directly communicate with each other, the re-issuance of the license whose installation has been canceled can be performed and the re-issued license can be installed in the electronic device 23 in a safe status to make the function of the electronic device 23 usable.

Furthermore, since the expiration time of the license is updated on the basis of the new device RTC, it is prevented that the effective term of the license is shortened due to the re-issuance of the license. Moreover, even though a deviation is generated between the RTC 105 of the server 11 and the RTC 206 of the electronic device 23, period management of the re-issued license can be appropriately performed using the RTC 206 of the electronic device 23.

<License Management Processing>

Next, license management processing executed by the client 12 will be described with reference to a flowchart of FIG. 24.

In step S201, the license management unit 251 determines whether or not there is a license whose expiration time has passed.

The license management unit 251 checks a client expiration time of each license on the basis of the license information stored in the storage unit 207, for example, when the power supply of the electronic device 23 is turned on, when the use of the electronic device 23 is started, or periodically. Then, the license management unit 251 determines that there is a license whose expiration time has passed in a case where there is a license whose client expiration time is before the current date and time of the RTC 206, and the processing proceeds to step S202.

Alternatively, for example, the license management unit 251 checks a client expiration time of a license of a function to be executed on the basis of the license information stored in the storage unit 207 in a case where an operation for executing a function requiring a license is performed via the input unit 201. Then, the license management unit 251 determines that there is a license whose expiration time has passed in a case where the client expiration time of the license is before the current date and time of the RTC 206, and the processing proceeds to step S202.

In step S202, the license management unit 251 suspends the license whose expiration time has passed. That is, the license management unit 251 makes a function corresponding to the license whose expiration time has passed temporarily unusable.

Here, making the function temporarily unusable is to be able to return the function to be usable only by inputting an extension code as described later even though the license is not re-installed using the installation key.

Thereafter, the processing proceeds to step S203.

On the other hand, in step S201, the license management unit 251 determines that there is no license whose expiration time has passed in a case where there is no license whose expiration time is before the current date and time of the RTC 206, in the license information stored in the storage unit 207, the processing of step S202 is skipped, and the processing proceeds to step S203.

In step S203, the license management unit 251 determines whether or not to perform input of an extension code. For example, the license management unit 251 determines to perform the input of the extension code in a case where an operation for inputting the extension code is performed via the input unit 201, and the processing proceeds to step S204.

In step S204, the output unit 205 displays an input screen of the extension code under the control of the UI control unit 254.

For example, as described later, in a case where payment of the license is completed after predetermined days before the expiration time of the license, an email of a content illustrated in FIG. 25 arrives at the user. An extension code for extending a license of a function whose expiration time expires is described in the email.

Meanwhile, the output unit 205 displays a window 601 of FIG. 26A under the control of the UI control unit 254.

In the window 601, a list of functions requiring licenses among functions of the electronic device 23 is displayed. Then, when a function of updating a license is selected using a cursor 602, the output unit 205 displays a window 611 of FIG. 26B under the control of the UI control unit 254.

In the window 611, an input field 612 of an extension code and an OK button 613 are displayed.

In the input field 612, a 3-digit extension code is input. For example, when upper and lower triangular operation portions of each digit are pressed, numerals of each digit independently increase or decrease. Then, the input of the extension code is confirmed by pressing the OK button 613.

Note that in a case where there is a plurality of licenses whose right holders are the same as each other (are associated with the same user ID) and expiration times are the same as each other, all of those licenses may be updated only by inputting one type of extension code once.

For example, FIGS. 25, 26A, and 26B illustrate an example of a case in which right holders and expiration times of licenses of function A and function B are the same as each other. In this case, for example, either function A or function B is selected in the window 601, and only one type of extension code is input once in the window 611, such that the licenses of functions A and B are collectively updated.

Note that in a case where one electronic device 23 is shared by a plurality of users, right holders of licenses of functions used in the electronic device 23 can be different from each other. In this case, even though there is a plurality of licenses whose expiration times are the same as each other, in a case where the right holders of the licenses are different from each other, an extension code is input for every license of each right holder, such that update of the licenses is performed.

For example, in a case where the electronic device 23 is shared by two users, user AAA and user BBB, an email addressed to user BBB of FIG. 27 arrives separately from an email addressed to user AAA of FIG. 25. Then, as illustrated in FIGS. 28A and 28B, an extension code of a license of function C for which user BBB has a right is input separately from the extension code of the licenses of functions A and B for which user AAA has a right.

Note that, for example, in a case where it is determined in step S201 that there is a license whose expiration time has passed, after the processing of step S202, the determination processing of step S203 may be omitted and the processing of step S204 may be executed. Therefore, in a case where there is a license whose expiration time has passed, the input screen of the extension code is automatically displayed.

In step S205, the license management unit 251 determines whether or not a correct extension code has been input.

Specifically, the license management unit 251 generates a formal extension code by a predetermined method. For example, the license management unit 251 calculates a hash value of the device unique key of the electronic device 23, an installation key of a license that becomes an update target, and the number of times of update of the license using a predetermined hash function.

Note that in a case where there is a plurality of licenses that become update targets, a hash value of data including all installation keys of those licenses is calculated. Furthermore, the number of times of the update of the license is a value obtained by increasing the number of times of the update in license information of the license that becomes the update target by one.

Then, the license management unit 251 digitizes the calculated hash value by a predetermined algorithm, and uses lower a 3-digit numeral value of the digitized hash value as an extension code.

Therefore, the extension code is approximately uniquely determined by a combination of (the device unique key of) the electronic device 23, the installation key of the license, and the number of times of the update of the license. For example, even in the license of the same function and expiration time, if electronic devices 23 of installation destinations of the license are different from each other, the extension code changes. Furthermore, for example, even in the license of the same function installed in the same electronic device 23, the extension code changes every time the license is updated (depending on the number of times of the update).

Then, the license management unit 251 determines that the correct extension code has not been input in a case where the input extension code does not coincide with the generated extension code, and the processing proceeds to step S206.

In step S206, the license management unit 251 determines whether or not the extension code has been mistaken a predetermined number of times. Furthermore, in a case where it is determined that the extension code has not been mistaken a predetermined number of times, the processing returns to step S204.

Thereafter, the processing of steps S204 to S206 is repeatedly executed until it is determined in step S205 that the correct extension code has been input or it is determined in step S206 that the extension code has been mistaken a predetermined number of times.

On the other hand, in step S204, the license management unit 251 determines that the correct extension code has been input in a case where the input extension code coincides with the generated extension code, and the processing proceeds to step S207.

In step S207, the license management unit 251 updates the expiration time of the license for which the extension code has been input. Specifically, the license management unit 251 updates the expiration time by adding the effective term of the license to the expiration time (client expiration time) in the license information of the license for which the extension code has been input. Furthermore, the license management unit 251 increases a value of the number of times of the update in the license information by one.

In step S208, the license management unit 251 determines whether or not the license for which the extension code has been input is suspended. In a case where it is determined that the license for which the extension code has been input is suspended, the processing proceeds to step S209.

In step S209, the license management unit 251 activates the license. That is, the license management unit 251 makes the function corresponding to the license for which the extension code has been input usable.

Thereafter, the processing proceeds to step S211.

On the other hand, in a case where it is determined in step S208 that the license for which the extension code has been input has been activated, the processing of step S209 is skipped, and the processing proceeds to step S211.

Furthermore, in a case where it is determined in step S206 that the extension code has been mistaken a predetermined number of times, the processing proceeds to step S210.

In step S210, the license management unit 251 deactivates the license for which the extension code has been mistaken. That is, the license management unit 251 makes the function corresponding to the license for which the extension code has been mistaken unusable. Furthermore, the license management unit 251 makes the function unable to be returned to be usable only when the license is re-installed using the installation key.

Thereafter, the processing proceeds to step S211.

On the other hand, in a case where it is determined in step S203 that the input of the extension code is not performed, the processing of steps S204 to S210 is skipped, and the processing proceeds to step S211.

In step S211, the license management unit 251 determines whether or not to perform return of the license. For example, the license management unit 251 determines to perform the return of the license in a case where an operation for returning the license is performed via the input unit 201, and the processing proceeds to step S212.

In step S212, the client 12 executes license return processing, and the processing proceeds to step S213. Note that details of the license return processing will be described later with reference to FIG. 29.

On the other hand, in a case where it is determined in step S211 that the return of the license is not performed, the processing of step S212 is skipped, and the processing proceeds to step S213.

In step S213, the license management unit 251 determines whether or not the RTC 206 has been in an unset status. In a case where it is determined that the RTC 206 has been in the unset status, the processing proceeds to step S214.

In step S214, the license management unit 251 deactivates all licenses. That is, the license management unit 251 cannot perform period management of the license in a case where the RTC 206 has been in the unset status, and thus, makes functions corresponding to all the licenses unusable.

Thereafter, the processing returns to step S1, and the processing of step S1 and the subsequent steps is executed.

On the other hand, in a case where it is determined in step S213 that the RTC 206 has not been in the unset status, the processing returns to step S1, and the processing of step S1 and the subsequent steps is executed.

<License Return Processing>

Next, details of the license return processing of step S212 of FIG. 24 will be described with reference to a flowchart of FIG. 29.

In step S231, the PC 21 requests a DeActivate request file.

Figure 30:
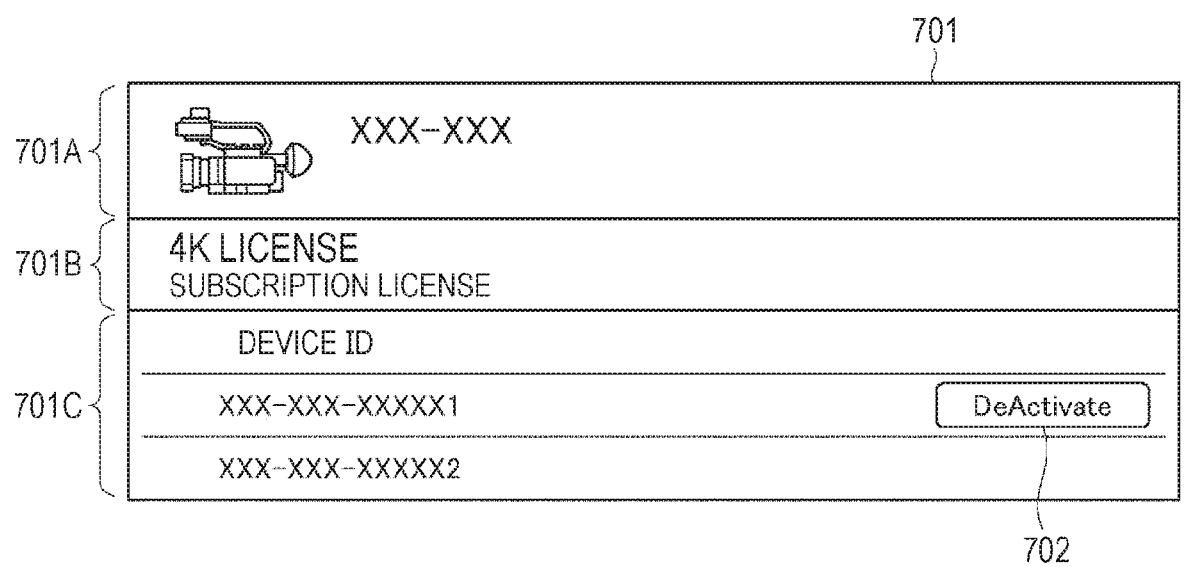
FIG. 30 is a diagram illustrating an example of a screen of the PC.

For example, the PC 21 accesses the server 11 via the network 13 according to an operation of the user to display a screen for returning a license of a function activated in the electronic device 23. For example, a window 701 of FIG. 30 is displayed on the screen of the PC 21.

The window 701 is divided into a device information field 701A, a license information field 701B, and a license detailed information field 701C.

At a left end of the device information field 701A, an image and a type name of the electronic device 23 are displayed laterally side by side.

At a left end of the license information field 701B, a function that becomes a target returning a license and a type of the license are shown. In this example, it is shown that a subscription license of an imaging function of a 4K image is a re-issuance target.

At a left end of the license detailed information field 701C, a device unique ID of an electronic device 23 that can use a function corresponding to a license to be returned among electronic devices 23 owned by the user is displayed.

Figure 31:
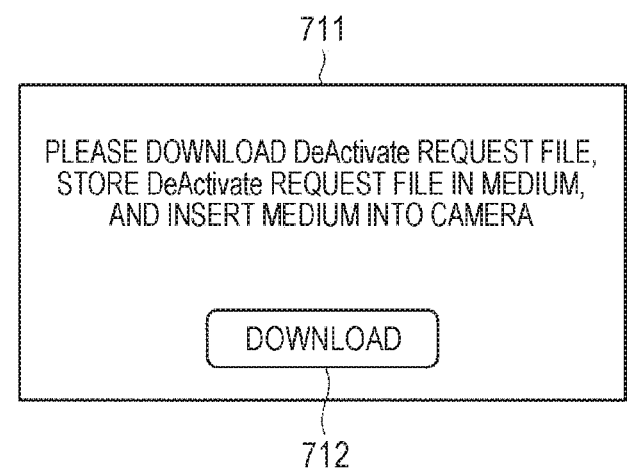
FIG. 31 is a diagram illustrating an example of a screen of the PC.

At a right end of the license detailed information field 701C, a DeActivate button 702 is displayed for the electronic device 23 in which the license is currently activated. When the DeActivate button 702 is pressed, for example, a window 711 of FIG. 31 is displayed on the screen of the PC 21.

In the window 711, a message for prompting the user to download the DeActivate request file, store the DeActivate request file in the medium 22, and insert the medium 22 into the camera (electronic device 23) and a download button 712 are displayed. When the download button 712 is pressed, the PC 21 requests the server 11 to transmit the DeActivate request file, via the network 13.

In response to this request, the server 11 transmits the DeActivate request file to the PC 21 via the network 13 in step S261 of FIG. 36 as described later.

In step S232, the PC 21 receives the DeActivate request file transmitted from the server 11. Furthermore, the PC 21 stores the received DeActivate request file in the medium 22 according to, for example, an operation of the user.

In step S233, the electronic device 23 executes a command in the DeActivate request file.

Specifically, the user detaches the medium 22 in which the DeActivate request file is stored from the PC 21, and connects the medium 22 to the drive 208 of the electronic device 23.

The drive 208 reads the DeActivate request file stored in the medium 22 and supplies the read DeActivate request file to the control unit 203. The control unit 203 executes a DeActivate request command included in the DeActivate request file. Therefore, the output unit 205 displays, for example, a window 721 of FIG. 32 under the control of the UI control unit 254.

In the window 721, a menu of functions that can be used in the electronic device 23 is displayed. In this example, three functions of 4K, MPEG-HD, and High Frame Rate are displayed. Among them, with respect to 4K and MPEG-HD, it is shown that a license is activated at a current point in time, such that 4K and MPEG-HD can be DeActivated. On the other hand, it is shown that High Frame Rate is grayed out, such that a license is deactivated.

Figure 32:
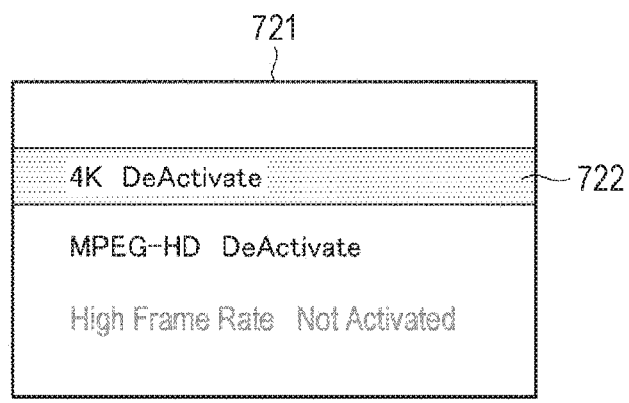
FIG. 32 is a diagram illustrating an example of a screen of the electronic device.
Figure 33:
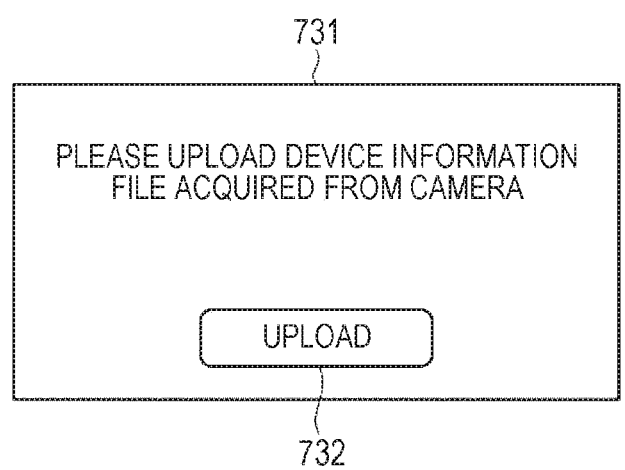
FIG. 33 is a diagram illustrating an example of a screen of the PC.
Figure 34:
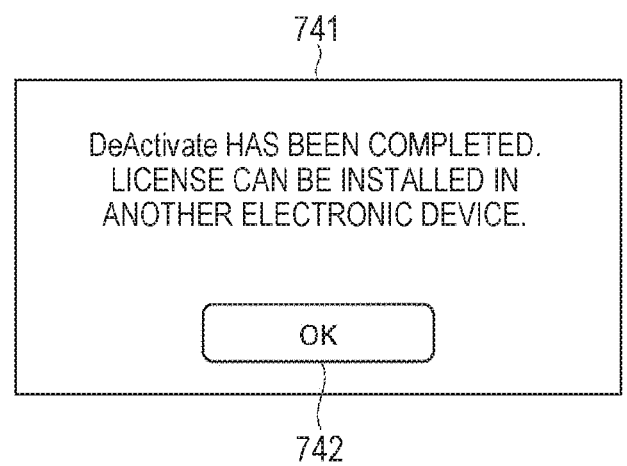
FIG. 34 is a diagram illustrating an example of a screen of the PC.

Note that, for example, the processing of steps S231 to S233 may be omitted, and the license return processing may be started by displaying the window 721 of FIG. 32 on the electronic device 23 by operating the electronic device 23 by the user without using the DeActivate request command.

In step S234, the license management unit 251 deactivates the license.

For example, the user selects a function of returning a license (a function of deactivating a license) using a cursor 722 in the window 721 of FIG. 32. Then, when the selection of the function of returning the license is confirmed, the license management unit 251 makes the function unusable.

In step S235, the data generation unit 253 generates storage data including the device unique ID and an installation key of the deactivated license. Specifically, the data generation unit 253 reads the device unique ID and the installation key of the deactivated license from the storage unit 207. The data generation unit 253 generates storage data including the read device unique ID and installation key.

In step S236, a hash value of the storage data is calculated using the device unique key, similarly to the processing of step S9 of FIG. 6.

In step S237, the data generation unit 253 generates a license return file including the storage data and the hash value.

In step S238, the data generation unit 253 stores the license return file in the medium 22 via the drive 208.

In step S239, the PC 21 transmits the license return file to the server 11.

For example, the user detaches the medium 22 from the electronic device 23, and connects the medium 22 to the PC 21. For example, the PC 21 displays a window 731 of FIG. 33 on the screen.

In the window 731, a message for prompting the user to upload the license return file acquired from the camera (electronic device 23) and an upload button 732 are displayed. When the upload button 732 is pressed, the PC 21 reads the license return file from the medium 22 and transmits the read license return file to the server 11 via the network 13.

In step S240, the PC 21 determines whether or not DeActivate has been completed. The PC 21 determines that DeActivate has been completed in a case where a display control file transmitted from the server 11 and notifying the user that DeActivate of the license has been completed has been received in step S265 of FIG. 36 as described later, and the processing proceeds to step S241.

In step S241, the PC 21 notifies the user of return completion of the license. For example, the PC 21 displays a window 741 of FIG. 34 on the screen.

Figure 35:
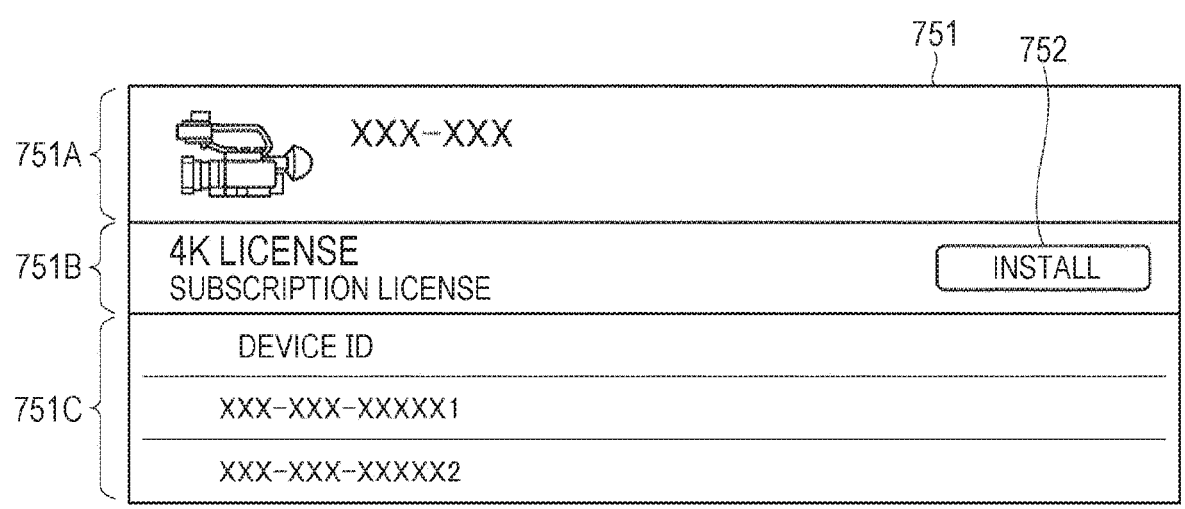
FIG. 35 is a diagram illustrating an example of a screen of the PC.

In the window 741, a message for notifying the user that DeActivate has been completed and the returned license can be installed in another electronic device 23 and an OK button 742 are displayed. When the OK button 742 is pressed, for example, a window 751 of FIG. 35 is displayed on the screen of the PC 21.

The window 751 is divided into a device information field 751A, a license information field 751B, and a license detailed information field 751C, similarly to the window 701 of FIG. 30, and has display contents substantially similar to those of the window 701. However, the window 751 is different from the window 701 in that the DeActivate button 702 disappears and an installation button 752 is displayed at a right end of the license information field 701B.

When the installation button 752 is pressed, the license acquisition processing described above with reference to FIG. 6 is started. Therefore, for example, the returned license can be installed in another electronic device 23.

Thereafter, the license return processing ends.

On the other hand, in step S240, the PC 21 determines that DeActivate has not been completed in a case where the display control file notifying the user that DeActivate of the license has been completed has not been received from the server 11, the processing of step S241 is skipped, and the license return processing ends.

<License Return Acceptance Processing>

Next, license return acceptance processing executed by the server 11, corresponding to the license return processing by the client 12 of FIG. 29 will be described with reference to a flowchart of FIG. 36.

Figure 29:
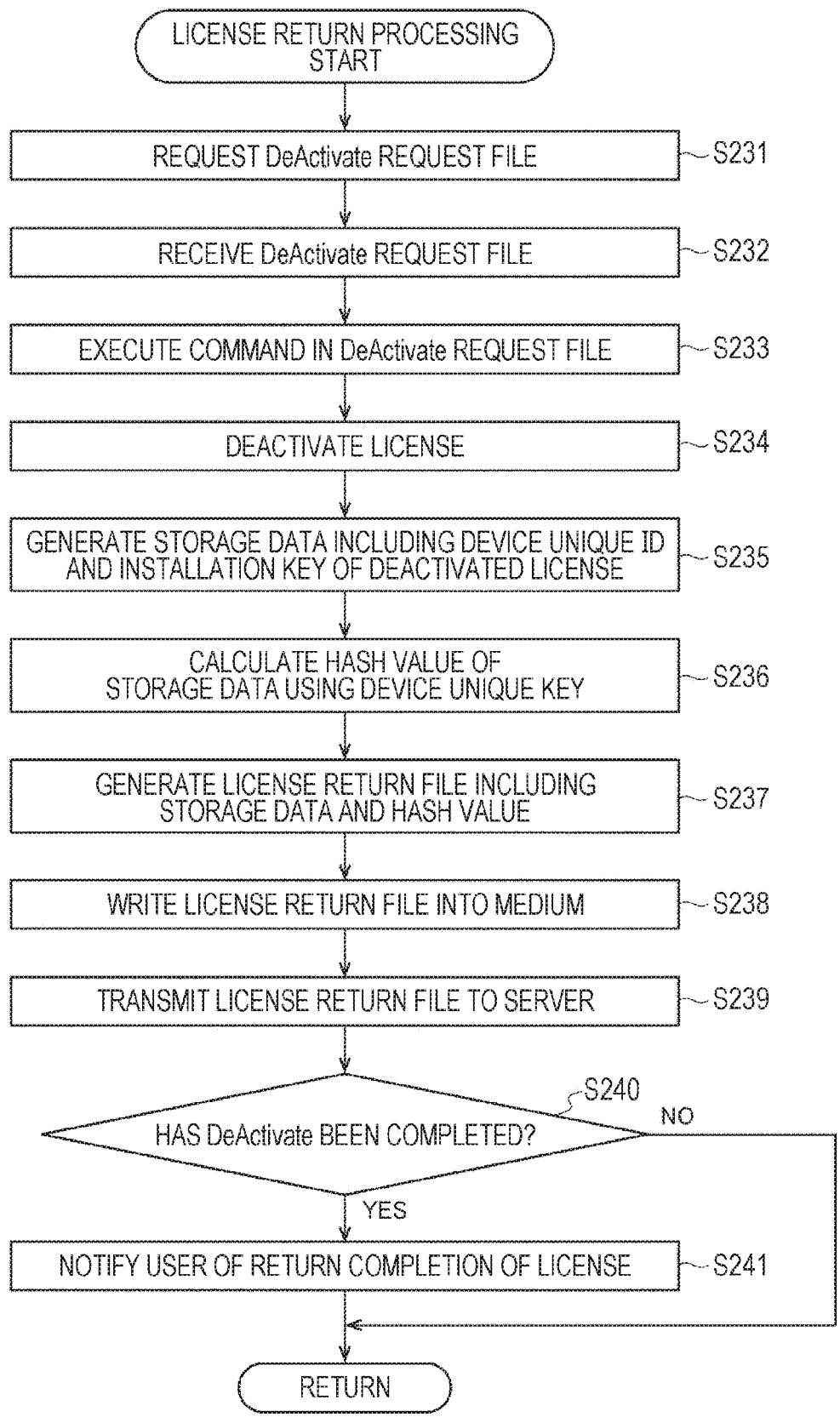
FIG. 29 is a flowchart for describing license return processing executed by the client.

Note that this processing is started, for example, when the server 11 has received the request for the DeActivate request file from the PC 21 in step S231 of FIG. 29 described above.

In step S261, the server 11 transmits the DeActivate request file. Specifically, the data generation unit 152 generates the DeActivate request file including the DeActivate request file command. The communication unit 103 transmits the DeActivate request file to the PC 21 via the network 13 under the control of the communication control unit 154.

Note that the processing of step S261 can be omitted by omitting the processing of steps S231 to S233 of FIG. 29 of the electronic device 23 as described above.

In step S262, the server 11 receives the license return file. Specifically, the communication control unit 154 receives the license return file transmitted from the PC 21 in the processing of step S239 of FIG. 29 described above, via the communication unit 103.

In step S263, the license management unit 151 determines whether or not a combination of a device unique ID and an installation key in the license return file coincides with a stored combination. Specifically, the license management unit 151 retrieves license information in which a combination of a device unique ID and an installation key coincides with the combination of the device unique ID and the installation key in the license return file, among the license information stored in the storage unit 106. Then, the license management unit 151 determines that the combination of the device unique ID and the installation key in the license return file coincides with the stored combination in a case where the license information in which the combination of the device unique ID and the installation key coincides with the combination of the device unique ID and the installation key in the license return file has been detected, and the processing proceeds to step S264.

In step S264, the license management unit 151 determines whether or not the license return file is valid. Specifically, the license management unit 151 reads the device unique key included in the license information detected in the processing of step S263 from the storage unit 106.

The license management unit 151 calculates a hash value of the storage data included in the license return file using the same hash function as that of the electronic device 23 and the read device unique key. Then, the license management unit 151 determines that the license return file is valid in a case where the calculated hash value coincides with a hash value in the license return file, and the processing proceeds to step S265.

Therefore, tampering or the like of the device unique ID and the installation key in the storage data is prevented.

Furthermore, therefore, it is guaranteed that a combination of the device unique key used to calculate the hash value in the license return file and the installation key and the device unique ID in the license return file coincides with that of the device unique key, the installation key, and the device unique ID stored in the storage unit 106.

In step S265, the license management unit 151 makes the returned license usable. For example, the license management unit 151 updates the license information detected in the processing of step S263 as license information regarding the license that has been returned. Furthermore, the license management unit 151 makes a new installation key of the returned license able to be newly issued. In such a manner, the return of the license is accepted.

Furthermore, the UI control unit 153 also generates a display control file for notifying the user that DeActivate of the license has been completed. The communication unit 103 transmits the display control file to the PC 21 via the network 13 under the control of the communication control unit 154.

Thereafter, the license return acceptance processing ends.

On the other hand, in step S264, the license management unit 151 determines that the license return file is not valid in a case where the calculated hash value does not coincide with the hash value in the license return file, the return of the license is not accepted, and the license return processing ends.

Furthermore, in step S263, the license management unit 151 determines that the combination of the device unique ID and the installation key in the license return file does not coincide with the stored combination in a case where the license information in which the combination of the device unique ID and the installation key coincides with the combination of the device unique ID and the installation key in the license return file has not been detected, the return of the license is not accepted, and the license return processing ends.

In such a manner, even though the server 11 and the electronic device 23 do not directly communicate with each other, the license can be returned from the electronic device 23 to the server 11 in a safe status, such that it is possible to make the license usable in another electronic device 23.

Furthermore, the license can be returned by one-way processing of only transmitting the license return file from the electronic device 23 to the server 11 via the medium 22 and the PC 21, such that processing required for returning the license can be reduced. That is, convenience in a case where the license is shared by a plurality of electronic devices 23 is improved.

Moreover, a different device unique key is generated in each electronic device 23, and security of a communication path between each electronic device 23 and the server 11 is secured by each different device unique key. Therefore, even though a device unique key of one electronic device 23 is hacked, the other electronic devices 23 are not affected by such hacking, and the license can be safely shared by the other electronic devices 23.

<License Period Management Processing>

Next, license period management processing executed by the server 11 will be described with reference to a flowchart of FIG. 37.

In step S301, the license management unit 151 determines whether or not there is a license that has been predetermined days before an expiration time. The license management unit 151 determines that there is a license that has been predetermined days before the expiration time in a case where there is a license whose server expiration time is in a range from the current date and time of the RTC 105 to predetermined days before (for example, 5 days before) the expiration time in the license information stored in the storage unit 106, and the processing proceeds to step S302.

In step S302, the license management unit 151 determines whether or not payment has been made. In a case where the license management unit 151 determines that the license that has been predetermined days before the expiration time has already been paid, the processing proceeds to step S303.

In step S303, the license management unit 151 generates an extension code. Specifically, the license management unit 151 generates an extension code of the license that has been predetermined days before the expiration time by a method similar to that of the electronic device 23 of step S205 of FIG. 24. Therefore, even though the server 11 and the electronic device 23 do not directly communicate with each other, an extension code common to the server 11 and the electronic device 23 is generated differently for every electronic device 23 and for every number of times of update.

In step S304, the server 11 transmits the extension code by an email. Specifically, the communication unit 103 transmits an email including the extension code as illustrated in FIG. 25 or FIG. 27 described above to the user, who is a right holder of the license updating the expiration time, under the control of the communication control unit 154.

Note that a term in which the extension code can be input in the electronic device 23 is, for example, from predetermined days before an expiration time of the license before being extended to an expiration time of the license after being extended. For example, in a case where a term in which the extension code can be input in advance is five days, the expiration time of the license before being extended is March 31, and the expiration time of the license after being extended is April 30, the term in which the extension code can be input is a term from March 27 to April 30. Note that during a term from March 27 to March 31, it is possible to input both of the extension code of the expiration time up to March 31 and the extension code of the expiration time up to April 30.

In step S305, the license management unit 151 updates the expiration time of the license. Specifically, the license management unit 151 updates the expiration time by adding an effective term of the license to a server expiration time and a client expiration time in license information of the license that becomes an update target. Furthermore, the license management unit 151 increases a value of the number of times of the update in the license information by one.

Thereafter, the processing proceeds to step S306.

On the other hand, in a case where it is determined in step S302 that the payment has not been made, the processing of steps S303 to S305 is skipped, the transmission of the extension code by the email is not performed, and the processing proceeds to step S306.

Furthermore, in a case where it is determined in step S301 that there is no license that has been predetermined days before the expiration time, the processing of steps S302 to S305 is skipped, and the processing proceeds to step S306.

In step S306, the license management unit 151 determines whether or not there is a license whose expiration time has passed. The license management unit 151 determines that there is a license whose expiration time has passed in a case where there is a license whose server expiration time is before the current date and time of the RTC 105 in the license information stored in the storage unit 106, and the processing proceeds to step S307.

In step S307, the license management unit 151 stops the license. For example, the license management unit 151 sets a server expiration time and a client expiration time in license information of the license whose expiration time has passed to period expiration.

Thereafter, the processing returns to step S301, and the processing of step S301 and the subsequent steps is executed.

On the other hand, in a case where it is determined in step S306 that there is no license whose expiration time has passed, the processing returns to step S301, and the processing of the step S301 and the subsequent steps is executed.

In such a manner, it is possible to appropriately perform the period management of the license provided by the server 11 and used in the electronic device 23. For example, the electronic device 23 can update the license (extend the expiration time of the license) by generating the common extension code by a method similar to that of the server 11 and performing authentication by the generated extension code, even though the electronic device 23 does not directly communicate with the server 11. Furthermore, even though the server 11 and the electronic device 23 do not directly communicate with each other, the license whose expiration time has passed can be deactivated in the electronic device 23. As such, the period management of the license can be completed within the electronic device 23.

<With Respect to Change in Effective Term of License>

As described above, the user can select a desired effective term of a plurality of types of effective terms at the time of acquiring the license. Therefore, for example, the user may be able to change the effective term of the license on the way. In this case, the effective term may be able to be changed not only at the time of updating the license, but also during the effective term of the license.

Hereinafter, an example of a case of changing a license (hereinafter, 365-day license) whose effective term is 365 days at a point in time where 20 days of a license (hereinafter referred to as a 30-day license) whose effective term is 30 days have elapsed in a case where there are two types of licenses whose effective terms are 30 days and 365 days will be described.

In this case, for example, it is conceivable to set a start date of the 365-day license after the end of the 30-day license. In this case, since both of the 30-day license and the 365-day license are fully used, a fee for the 365-day license is charged to the user as it is. Furthermore, in this case, an expiration time of the 365-day license is set 365 days after the last day of the 30-day license.

Furthermore, for example, it is conceivable to set a start date of the 365-day license to the day after an application date of a change to the 365-day license. In this case, for example, a fee obtained by subtracting a fee for the remaining 10 days of the 30-day license from a fee of the 365-day license is charged to the user. Furthermore, in this case, an expiration time of the 365-day license is set 365 days after the application date.

Moreover, for example, it is conceivable to set a start date of the 365-day license to a start date of the 30-day license. That is, in this case, the 30-day license is absorbed into the 365-day license. In this case, for example, a fee obtained by subtracting a fee of the 30-day license from a fee of the 365-day license is charged to the user. Furthermore, in this case, an expiration time of the 365-day license is set 364 days after the start date of the 30-day license.

Note that a change in a direction of shortening the effective term such as, for example, a change from the 365-day license to the 30-day license is basically prohibited.

Furthermore, as described above, the licenses whose expiration times are the same as each other among licenses associated with the same user ID can be updated only by inputting one extension code. Therefore, in a case where the same user applies for licenses on different days or changes an effective term on the way, it is desirable to match expiration times of the licenses to each other as much as possible. Furthermore, in a case where the effective term of the license is shortened in order to match the expiration times of the licenses to each other, for example, a fee is discounted by the shortened effective term.

<Second Embodiment of Processing of Information Processing System 10>

Next, a second embodiment of processing of the information processing system will be described with reference to FIGS. 38 to 48. This second embodiment is different mainly in a method of updating an expiration time of a license from the first embodiment. More specifically, in the first embodiment, update processing (the input of the extension code) has been performed in a case where the user wants to update the license, but in the second embodiment, a license is basically automatically updated and cancellation processing is performed in a case where the user wants to cancel the license.

Note that in this second embodiment, a case where the electronic device 23 is connected to the PC 21 by a cable or the like and directly communicates with the server 11 via the PC 21 and the network 13 will be described.

<License Acquisition Processing>

Figure 38:
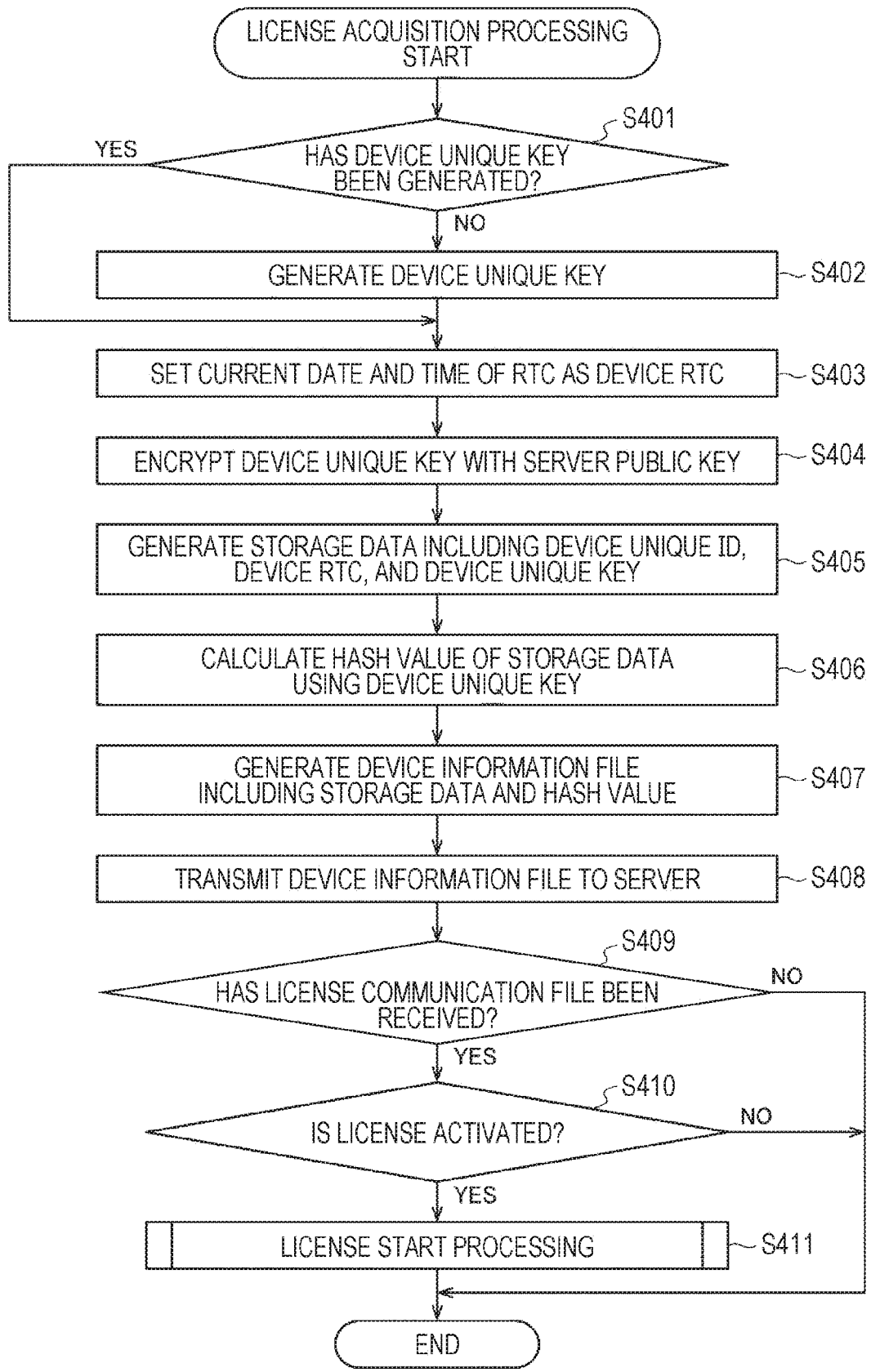
FIG. 38 is a flowchart for describing license acquisition processing executed by the client.

First, license acquisition processing executed by the client 12 will be described with reference to a flowchart of FIG. 38.

Note that this processing is started, for example, when the input unit 201 of the electronic device 23 or the PC 21 is operated, such that an instruction to acquire a license of a predetermined function of the electronic device 23 is input.

In steps S401 to S407, processing similar to that of steps S4 to S10 of FIG. 6 is executed.

In step S408, the communication unit 204 transmits the device information file to the server 11 via the PC 21 and the network 13 under the control of the communication control unit 255.

In step S409, the communication control unit 255 determines whether or not the license communication file has been received.

Figure 41:
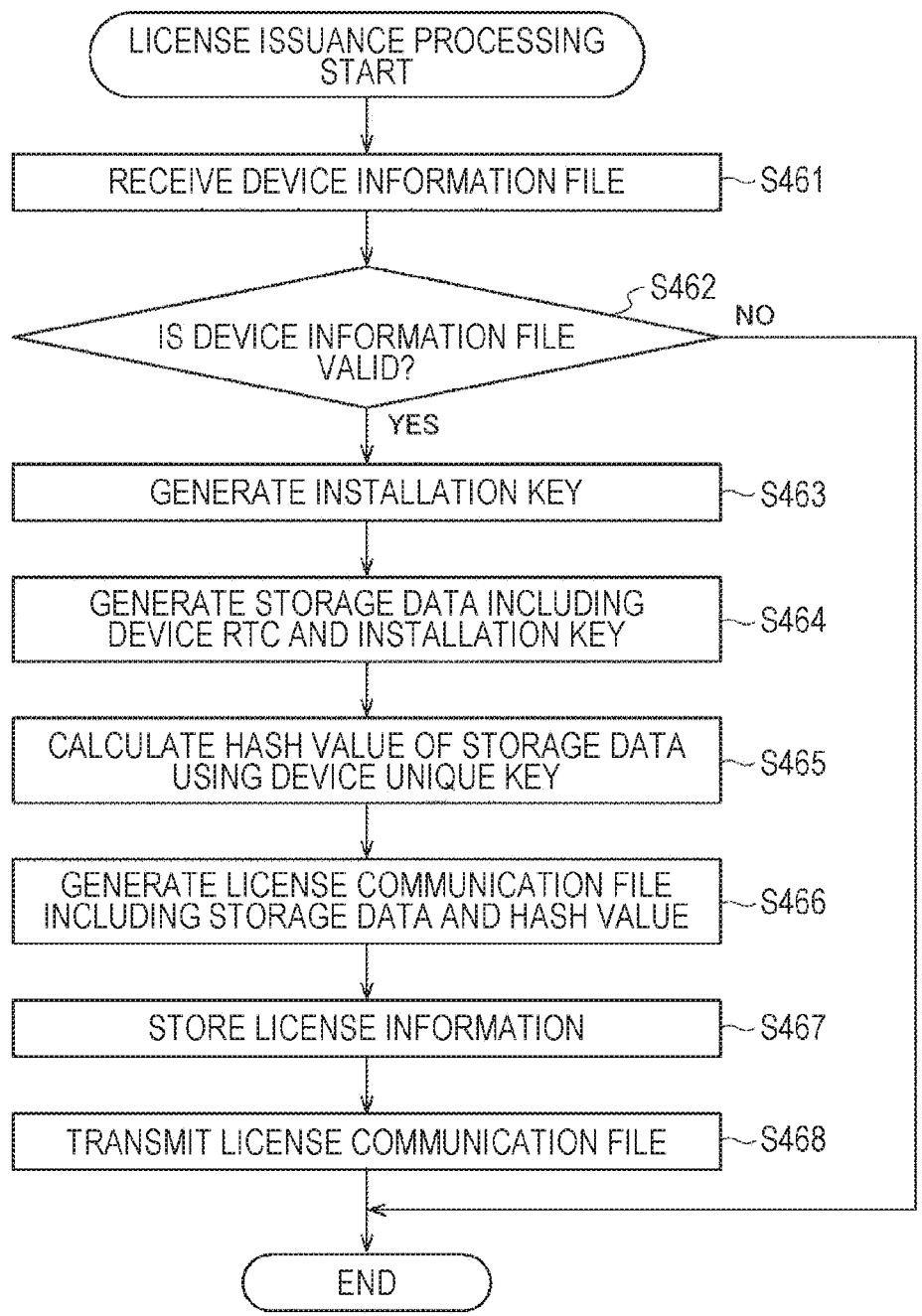
FIG. 41 is a flowchart for describing license issuance processing executed by the server.

Specifically, the server 11 receives the device information file in step S461 of FIG. 41 as described later, and transmits the license communication file via the network 13 in step S468 in a case where it is determined that the device information is valid.

Then, in a case where the communication control unit 255 determines that the license communication file has been received via the PC 21 and the communication unit 204, the processing proceeds to step S410.

In step S410, the electronic device 23 determines whether or not to activate the license.

Figure 39:
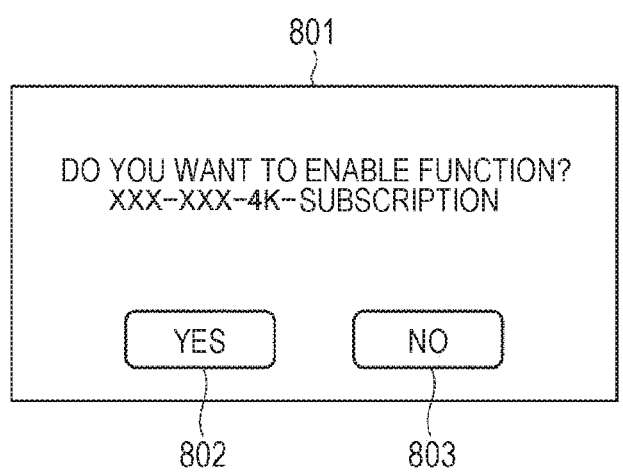
FIG. 39 is a diagram illustrating an example of a screen of the electronic device.
Figure 40:
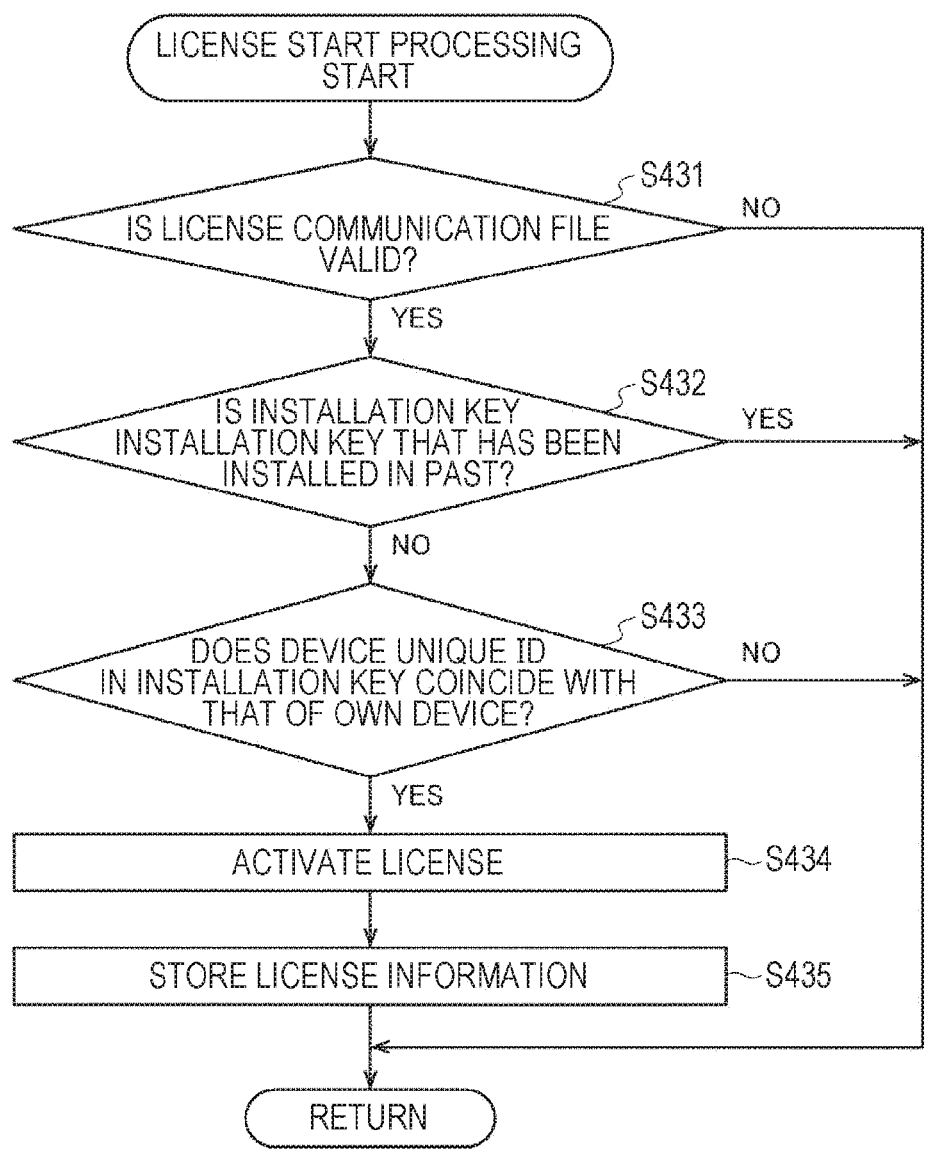
FIG. 40 is a flowchart for describing license start processing executed by the client.

For example, the output unit 205 displays a window 801 of FIG. 39 under the control of the UI control unit 254.

In the window 801, a type name of the electronic device 23, a type of function and a license type, and a message for confirming whether or not to enable the function are displayed. Furthermore, a YES button 402 and a NO button 403 are displayed in the window 401. Then, the license management unit 251 determines to activate the license in a case where the YES button 402 is pressed, and determines not to activate the license in a case where the NO button 403 is pressed. In a case where it is determined to activate the license, the processing proceeds to step S411.

In step S411, the electronic device 23 executes license start processing, and the license acquisition processing ends. Here, details of the license start processing will be described with reference to a flowchart of FIG. 40.

Figure 15:
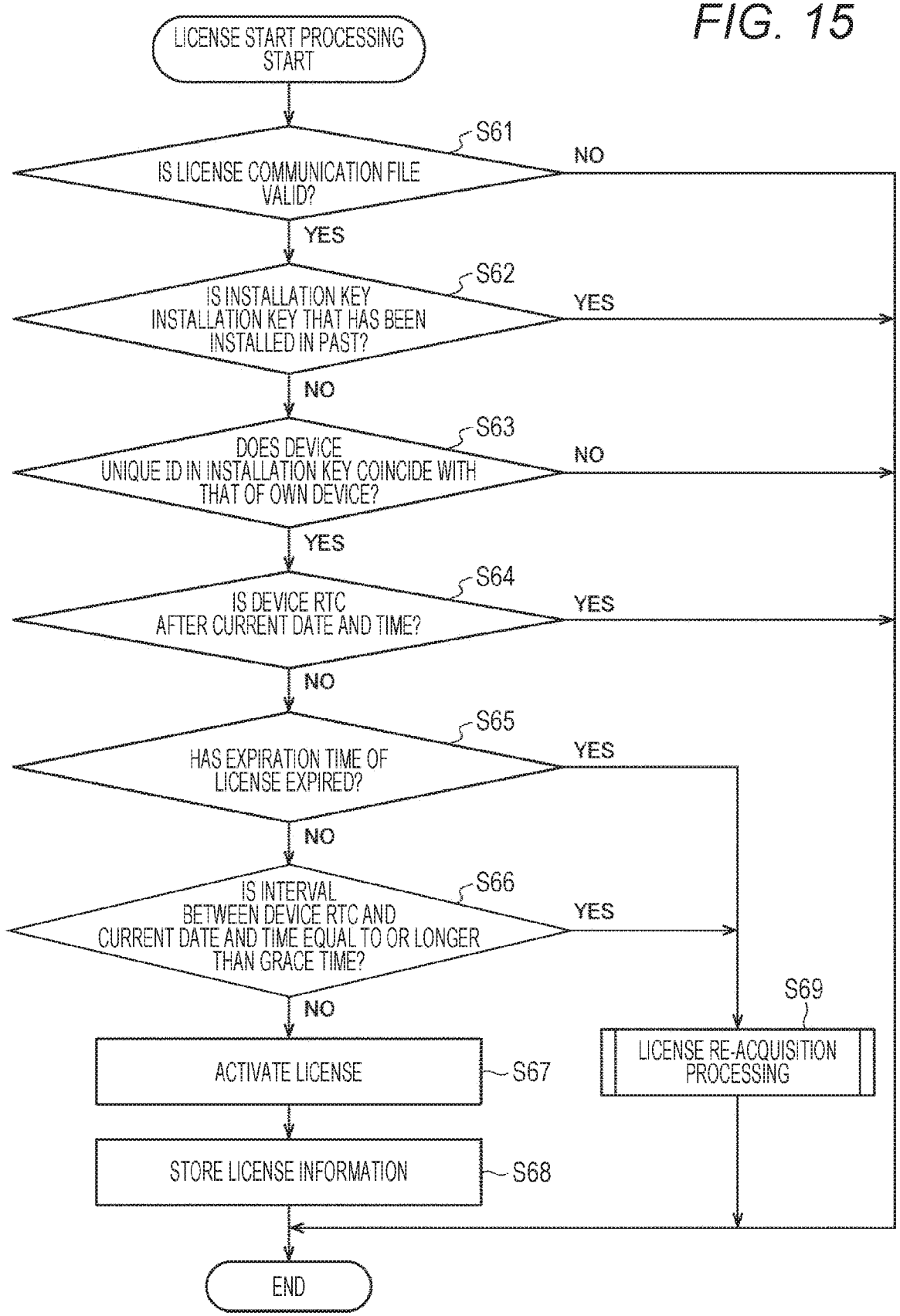
FIG. 15 is a flowchart for describing license start processing executed by the client.

In step S431, it is determined whether or not the license communication file is valid, similarly to the processing of step S61 of FIG. 15. In a case where it is determined that the license communication file is valid, the processing proceeds to step S432.

In step S432, it is determined whether or not the installation key is an installation key that has been installed in the past, similarly to the processing of step S62 of FIG. 15. In a case where it is determined that the installation key is not the installation key that has been installed in the past, the processing proceeds to step S433.

In step S433, it is determined whether or not the device unique ID in the installation key coincides with that of an own device, similarly to the processing of step S63 of FIG. 15. In a case where it is determined that the device unique ID in the installation key coincides with that of the own device, the processing proceeds to step S434.

In step S434, the license is activated, similarly to the processing of step S67 of FIG. 15.

In step S435, the electronic device 23 stores license information. Specifically, the license management unit 251 calculates an expiration time (client expiration time) of the license by adding an effective term of the license to a device RTC.

Note that the effective term of the license is selected from a plurality of types (for example, 30 days or 365 days) at the time of acquiring the license, similarly to the first embodiment.

The storage control unit 256 causes the storage unit 207 to store the license information including the current date and time of the RTC 206, the installation key, and the client expiration time, the effective term, and a confirmation date and time of the license.

Note that the current date and time of the RTC 206 is the date and time when the license is started to be used. Furthermore, the confirmation date and time of the license refers to the date and time when continuation of the license has been last confirmed (the date and time when it has been confirmed to continuously use the license), and the device RTC is set as an initial value.

Thereafter, the license start processing ends.

On the other hand, in a case where it is determined in step S431 that the license communication file is not valid, in a case where it is determined in step S432 that the installation key is the installation key that has been installed in the past, or in a case where it is determined in step S433 that the device unique ID in the installation key does not coincide with that of the own device, the license is not activated, and the license start processing ends.

Returning to FIG. 38, on the other hand, in a case where it is determined in step S409 that the license communication file has not been received or in a case where it is determined in step S410 not to activate the license, the license start processing is not performed, and the license acquisition processing ends.

<License Issuance Processing>

Next, license issuance processing executed by the server 11, corresponding to the license acquisition processing by the client 12 of FIG. 38 will be described with reference to a flowchart of FIG. 41.

In step S461, the device information file is received, similarly to the processing of step S32 of FIG. 13 described above.

In step S462, it is determined whether or not the device information file is valid, similarly to the processing of step S33 of FIG. 13. In a case where it is determined that the device information file is valid, the processing proceeds to step S463.

In step S463, the license management unit 151 generates an installation key.

FIG. 42 illustrates an example of a format of an installation key. This installation key includes a function ID, system unique information, and a device unique ID. That is, this installation key is different from the installation key of FIG. 14 in that it does not include the expiration time and the effective term of the license.

In step S464, the data generation unit 152 generates storage data including the device RTC and the installation key.

In steps S465 and S466, processing similar to that of steps S37 and S38 of FIG. 13 is executed.

In step S467, the server 11 stores license information. For example, the storage control unit 155 causes the storage unit 106 to store license information including a combination of the current date and time of the RTC 105, the device unique ID, the device unique key, the installation key, and the server expiration time, the effective term, and the confirmation date and time of the license.

Note that the server expiration time of the license is set to a date and time obtained by adding the effective term of the license to the current date and time of the RTC 105. Furthermore, as the confirmation date and time of the license, two types, a date and time based on the RTC 105 of the server 11 (hereinafter, also referred to as a server confirmation date and time) and a date and time based on the RTC 206 of the electronic device 23 (hereinafter, also referred to as a client confirmation date and time) are set. For example, the current date and time of the RTC 105 is set as the server confirmation date and time, and the device RTC is set as the client confirmation date and time. Note that the confirmation date and time of the license information of the electronic device 23 is based on the RTC 206 of the electronic device 23, and thus, becomes the client confirmation date and time.

In step S468, the license communication file is transmitted, similarly to the processing of step S40 of FIG. 13, and the license issuance processing ends.

On the other hand, in a case where it is determined in step S462 that the device information file is not valid, the processing of steps S463 to S468 is skipped, and the license issuance processing ends.

<License Management Processing>

Next, license management processing executed by the client 12 will be described with reference to a flowchart of FIG. 43.

In step S501, the license management unit 251 determines whether or not to perform confirmation of the license. For example, the license management unit 251 determines to perform the confirmation of the license when the input unit 201 of the electronic device 23 or the PC 21 is operated, such that an instruction to confirm a license of a predetermined function of the electronic device 23 is input, and the processing proceeds to step S502. Alternatively, for example, the license management unit 251 determines to perform the confirmation of the license in a case where the electronic device 23 is connected to the PC 21 by a cable or the like and starts communication with the server 11 via the PC 21 and the network 13, and the processing proceeds to step S502.

In step S502, the client 12 executes license confirmation processing. Here, details of the license confirmation processing will be described with reference to a flowchart of FIG. 44.

In step S531, the current date and time of the RTC 206 is set as the device RTC, similarly to the processing of step S6 of FIG. 6.

In step S532, the data generation unit 253 generates storage data including the device unique ID, the device RTC, and an installation key of the license to be confirmed. Specifically, the data generation unit 253 reads the device unique ID and the installation key of the license to be confirmed from the storage unit 207. The data generation unit 253 generates storage data including the read device unique ID, the device RTC, and the installation key.

In step S533, a hash value of the storage data is calculated using the device unique key, similarly to the processing of step S9 of FIG. 6.

In step S534, the data generation unit 253 generates a license confirmation file including the storage data and the hash value. This license confirmation file is mainly used to notify the user of the confirmation date and time (device RTC) of the license in the electronic device 23.

In step S535, the communication unit 204 transmits the license confirmation file to the server 11 via the PC 21 and the network 13 under the control of the communication control unit 255.

Figure 45:
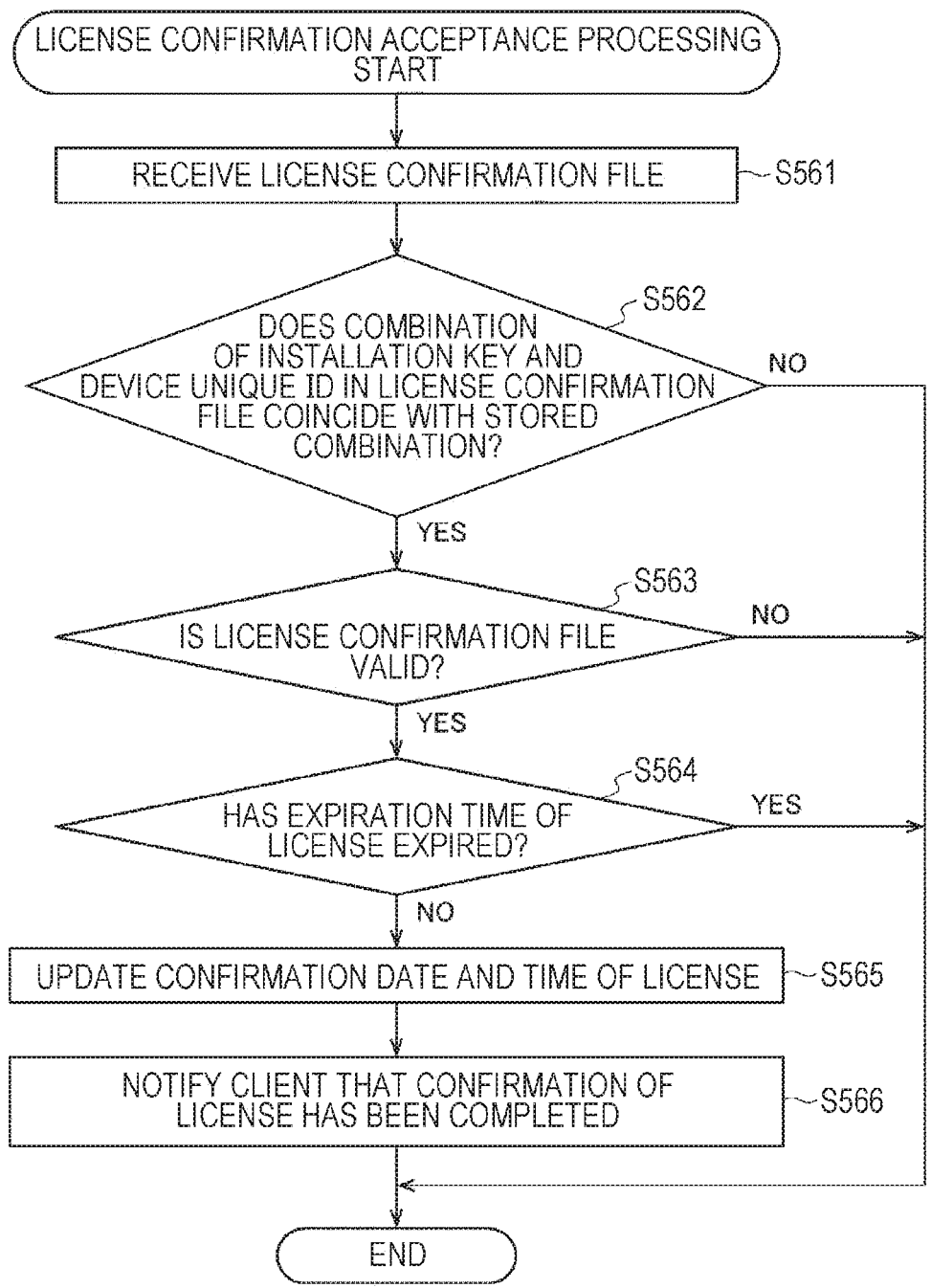
FIG. 45 is a flowchart for describing license confirmation acceptance processing executed by the server.

In response to this transmission, the server 11 receives the license confirmation file in step S561 of FIG. 45 as described later.

In step S536, the license management unit 251 determines whether or not the confirmation of the license has been completed. The license management unit 251 determines that the confirmation of the license has been completed in a case where notification that the confirmation of the license has been completed is provided from the server 11, through the network 13, the PC 21, and the communication unit 204 in step S566 of FIG. 45 as described later, and the processing proceeds to step S537.

In step S537, the license management unit 251 updates the confirmation date and time of the license. Specifically, the license management unit 251 updates the confirmation date and time (client confirmation date and time) of the license information, of the license on which the confirmation has been performed, stored in the storage unit 207 to the device RTC set in the processing of step S531.

Thereafter, the license confirmation processing ends.

On the other hand, in step S536, the license management unit 251 determines that the confirmation of the license has not been completed in a case where notification that the confirmation of the license has been completed is not provided from the server 11, the processing of step S537 is skipped, and the license confirmation processing ends.

<License Confirmation Acceptance Processing>

Next, license confirmation acceptance processing executed by the server 11, corresponding to the license confirmation processing by the client 12 of FIG. 44 will be described with reference to a flowchart of FIG. 45.

In step S561, the server 11 receives the license confirmation file. Specifically, the communication control unit 154 receives the license confirmation file transmitted from the electronic device 23 in the processing of step S535 of FIG. 44 described above, via the communication unit 103.

Figure 36:
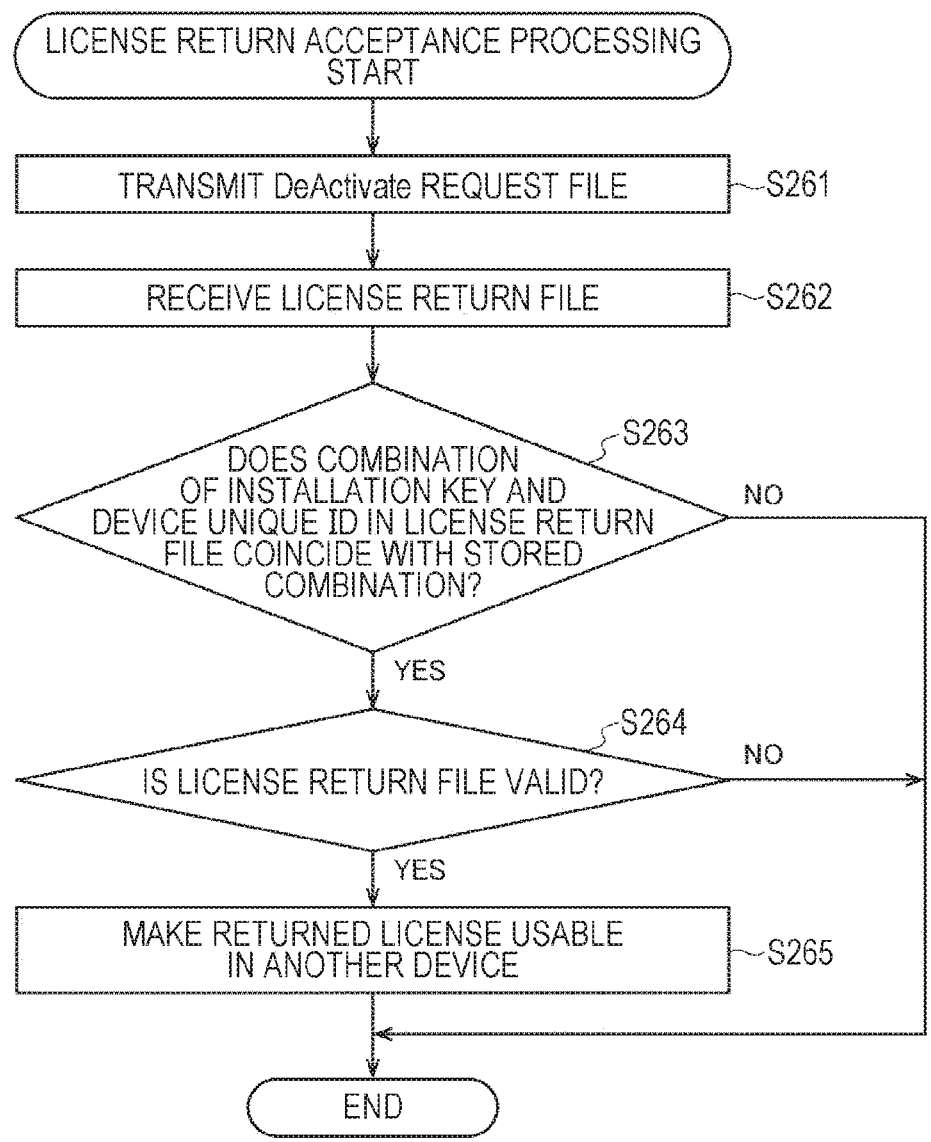
FIG. 36 is a flowchart for describing license return acceptance processing executed by the server.

In step S562, it is determined whether or not a combination of a device unique ID and an installation key in the license confirmation file coincides with a stored combination by processing similar to that of step S263 of FIG. 36. In a case where it is determined that the combination of the device unique ID and the installation key in the license confirmation file coincides with the stored combination, the processing proceeds to step S563.

In step S563, it is determined whether or not the license confirmation file is valid by processing similar to that of step S264 of FIG. 36. In a case where it is determined that the license confirmation file is valid, the processing proceeds to step S564.

In step S564, the license management unit 151 determines whether or not an expiration time of the license has expired. Specifically, the license management unit 151 determines that the expiration time of the license has not expired in a case where a server expiration time of license information of a license that becomes a confirmation target is on and after the current date and time of the RTC 105, and the processing proceeds to step S565.

In step S565, the license management unit 151 updates the confirmation date and time of the license. Specifically, the license management unit 151 updates the client confirmation date and time of the license information of the license that becomes the confirmation target, to the device RTC in the license confirmation file. Furthermore, the license management unit 151 updates the server confirmation date and time of the license information of the license that becomes the confirmation target, to the current date and time of the RTC 105.

That is, the confirmation date and time of the license in the electronic device 23 is provided in notification to the server 11 by the device RTC of the license confirmation file and is recognized by the server 11. Then, the server 11 sets the device RTC to the confirmation date and time (client confirmation date and time) of the license in the electronic device 23. Furthermore, the server 11 sets a date and time (server confirmation date and time), in the server 11, of the confirmation date and time of the license in the electronic device 23, on the basis of the RTC 105.

In step S566, the communication unit 103 notifies the client 12 that the confirmation of the license has been completed, via the network 13 and the PC 21 under the control of the communication control unit 154.

Thereafter, the license confirmation acceptance processing ends.

On the other hand, in step S564, the license management unit 151 determines that the expiration time of the license has expired in a case where the server expiration time of the license information of the license that becomes the confirmation target is before the current date and time of the RTC 105, the confirmation date and time of the license is not updated, and the license confirmation processing ends.

Furthermore, in a case where it is determined in step S562 that the combination of the installation key and the device unique ID in the license confirmation file does not coincide with the stored combination or in a case where it is determined in step S563 that the license confirmation file is not valid, the confirmation date and time of the license is not updated, and the license confirmation acceptance processing ends.

In such a manner, the server 11 confirms the continuation of the license of the electronic device 23.

Returning to FIG. 43, on the other hand, in a case where it is determined in step S501 that the confirmation of the license is not performed, the processing of step S502 is skipped, and the processing proceeds to step S503.

In step S503, the license management unit 251 determines whether or not there is a license on which confirmation is not performed for a predetermined term or longer.

For example, the license management unit 251 checks a confirmation date and time (client confirmation date and time) of each license on the basis of the license information stored in the storage unit 106 when the power supply of the electronic device 23 is turned on, when the use of the electronic device 23 is started, or periodically. Then, the license management unit 251 determines that there is a license on which the confirmation is not performed for the predetermined term or longer in a case where there is a license whose confirmation date and time is a predetermined longest unconfirmed term (for example, 30 days) or longer before the current date and time of the RTC 206, in other words, in a case where there is a license for which the longest unconfirmed term has elapsed since notification of the confirmation date and time (device RTC) has been provided to the server 11, and the processing proceeds to step S504.

Alternatively, for example, the license management unit 251 checks a confirmation date and time (client confirmation date and time) of a license of a function to be executed on the basis of the license information stored in the storage unit 106 in a case where an operation for executing a function requiring a license is performed via the input unit 201. Then, the license management unit 251 determines that there is a license on which the confirmation is not performed for the predetermined term or longer in a case where the confirmation date and time of the license is a predetermined longest unconfirmed term (for example, 30 days) or longer before the current date and time of the RTC 206, and the processing proceeds to step S504.

In step S504, the output unit 205 displays an input screen of a confirmation code under the control of the UI control unit 254. For example, when a function corresponding to a license on which the confirmation is not performed for the predetermined term or longer is started up, an input screen of a confirmation code is displayed. Note that the confirmation code is used in order to confirm the continuation of the license rather than in order to extend the expiration time of the license, unlike the extension code described above.

In step S505, the license management unit 251 determines whether or not a correct confirmation code has been input.

Specifically, the license management unit 251 generates a formal confirmation code on the basis of the confirmation date and time in the license information of the license that becomes the confirmation target, by a predetermined method. For example, the license management unit 251 generates a confirmation code by a predetermined algorithm on the basis of a date and time obtained by adding the longest unconfirmed term to the confirmation date and time of the license that becomes the confirmation target. This algorithm generates the same confirmation code if an input date and time is the same, and generates a different confirmation code if an input date and time is different.

Then, the license management unit 251 determines that the correct confirmation code has not been input in a case where the input confirmation code does not coincide with the generated confirmation code, and the processing proceeds to step S506.

In step S506, the license management unit 251 determines whether or not the confirmation code has been mistaken a predetermined number of times. Furthermore, in a case where it is determined that the confirmation code has not been mistaken a predetermined number of times, the processing returns to step S504.

Thereafter, the processing of steps S504 to S506 is repeatedly executed until it is determined in step S505 that the correct confirmation code has been input or it is determined in step S506 that the confirmation code has been mistaken a predetermined number of times. Therefore, until the correct confirmation code is input, the use of the license is stopped and the function corresponding to the license cannot be used.

On the other hand, in step S505, the license management unit 251 determines that the correct confirmation code has been input in a case where the input confirmation code coincides with the generated confirmation code, and the processing proceeds to step S507.

In step S507, the license management unit 251 updates the confirmation date and time of the license for which the confirmation code has been input. Specifically, the license management unit 251 updates the confirmation date and time by adding the longest unconfirmed term to the confirmation date and time (client confirmation date and time) in the license information of the license for which the confirmation code has been input.

Thereafter, the processing proceeds to step S509.

On the other hand, in a case where it is determined in step S506 that the confirmation code has been mistaken a predetermined number of times, the processing proceeds to step S508.

In step S508, the license management unit 251 deactivates the license. That is, the license management unit 251 makes the function corresponding to the license for which the confirmation code has been mistaken unusable.

Thereafter, the processing proceeds to step S509.

On the other hand, in step S503, the license management unit 251 determines that there is no license on which the confirmation is not performed for the predetermined term or longer in a case where there is no license whose confirmation date and time is the longest unconfirmed term or longer before the current date and time of the RTC 206, in the license information stored in the storage unit 106, the processing of steps S504 to S508 is skipped, and the processing proceeds to step S509.

In step S509, the license management unit 251 determines whether or not to perform cancellation of the license. For example, the license management unit 251 determines to perform the cancellation of the license when the input unit 201 of the electronic device 23 or the PC 21 is operated, such that an instruction to cancel a license of a predetermined function of the electronic device 23 is input, and the processing proceeds to step S510.

In step S510, the client 12 executes license cancellation processing. Here, details of the license cancellation processing will be described with reference to a flowchart of FIG. 46.

In steps S601 to S603, processing similar to that of steps S234 to S236 of FIG. 29 described above is executed.

In step S604, the data generation unit 253 generates a license cancellation file including the storage data and the hash value.

Figure 44:
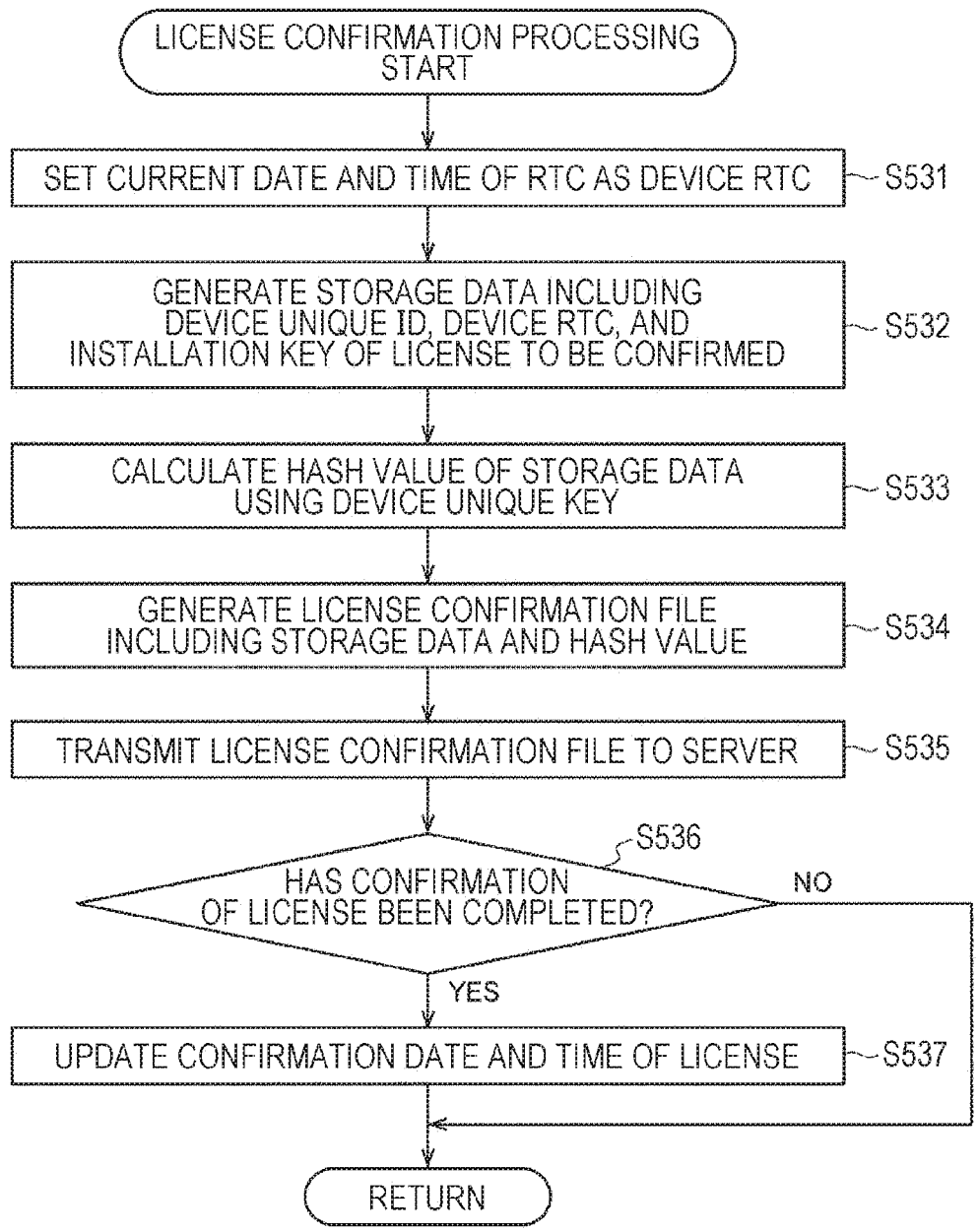
FIG. 44 is a flowchart for describing license confirmation processing executed by the client.

In step S605, the license cancellation file is transmitted to the server 11 by processing similar to that of step S535 of FIG. 44.

In step S606, the license management unit 251 determines whether or not the cancellation of the license has been completed. The license management unit 251 determines that the cancellation of the license has been completed in a case where notification that the cancellation of the license has been completed is provided from the server 11 in step S634 of FIG. 48 as described later, and the processing proceeds to step S607.

In step S607, the output unit 205 notifies the user that the cancellation of the license has been completed, under the control of the UI control unit 254.

Thereafter, the license cancellation processing ends.

On the other hand, in step S606, the license management unit 251 determines that the cancellation of the license has not been completed in a case where notification that the cancellation of the license has been completed is not provided from the server 11, the processing of step S607 is skipped, and the license cancellation processing ends.

<License Cancellation Acceptance Processing>

Figure 46:
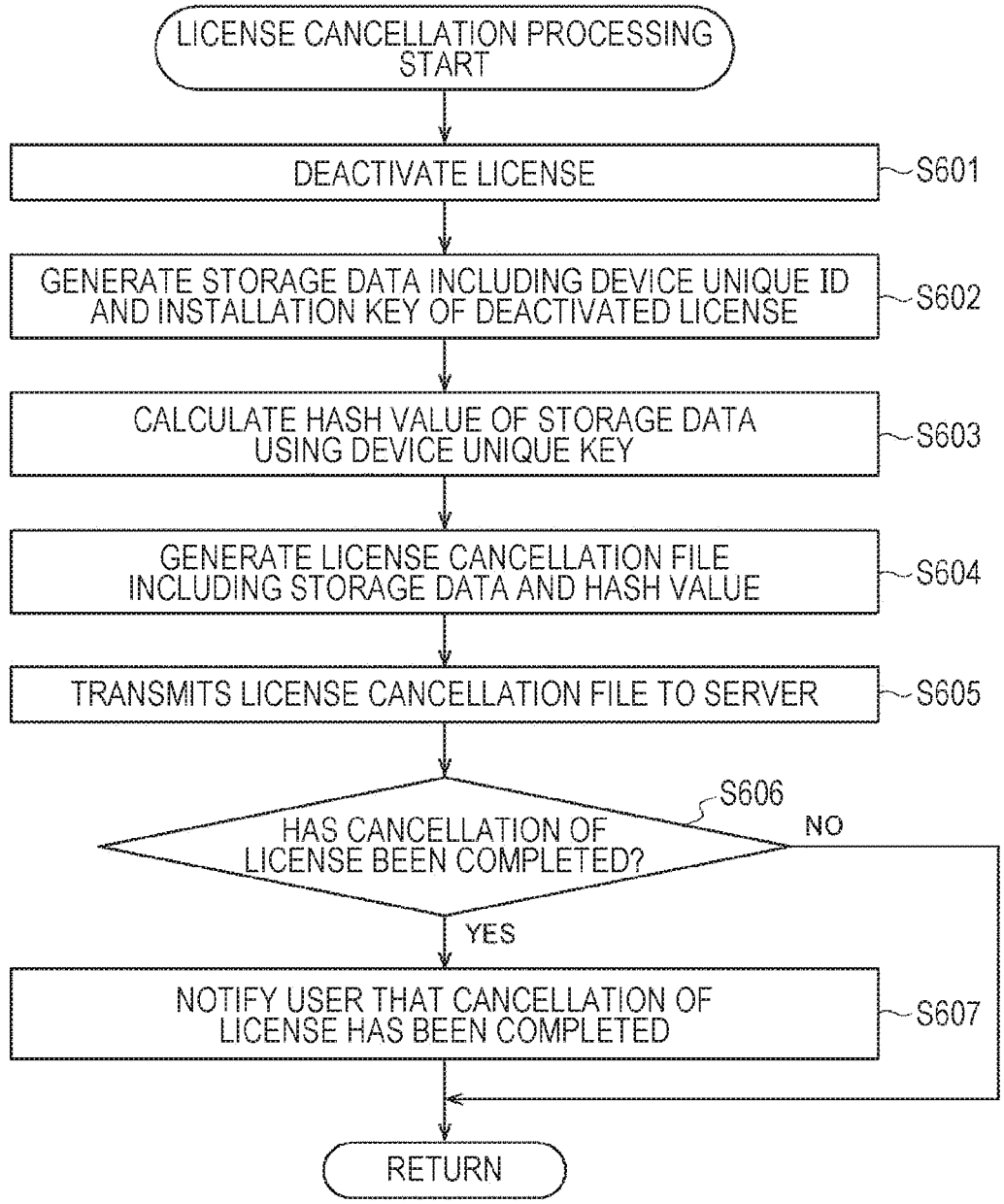
FIG. 46 is a flowchart for describing license cancellation processing executed by the client.

Next, license cancellation acceptance processing executed by the server 11, corresponding to the license cancellation processing by the client 12 of FIG. 46 will be described with reference to a flowchart of FIG. 47.

In step S631, the server 11 receives the license cancellation file. Specifically, the communication control unit 154 receives the license cancellation file transmitted from the electronic device 23 in the processing of step S605 of FIG. 43 described above, via the communication unit 103.

In step S632, it is determined whether or not a combination of a device unique ID and an installation key in the license cancellation file coincides with a stored combination by processing similar to that of step S263 of FIG. 36. In a case where it is determined that the combination of the device unique ID and the installation key in the license cancellation file coincides with the stored combination, the processing proceeds to step S633.

In step S633, it is determined whether or not the license cancellation file is valid by processing similar to that of step S264 of FIG. 36. In a case where it is determined that the license cancellation file is valid, the processing proceeds to step S634.

In step S634, the server 11 accepts the cancellation of the license. For example, the license management unit 151 stores data indicating that cancellation has been performed in license information of a license that becomes a cancellation target, stored in the storage unit 106. Furthermore, the communication unit 103 also notifies the client 12 that the cancellation of the license has been completed, via the network 13, under the control of the communication control unit 154.

Thereafter, the license cancellation acceptance processing ends.

On the other hand, in a case where it is determined in step S632 that the combination of the installation key and the device unique ID in the license cancellation file does not coincide with the stored combination or in a case where it is determined in step S633 that the license cancellation file is not valid, the cancellation of the license is not accepted, and the license cancellation processing ends.

Returning to FIG. 43, on the other hand, in a case where it is determined in step S509 that the cancellation of the license is not performed, the processing of step S510 is skipped, and the processing proceeds to step S511.

Figure 24:
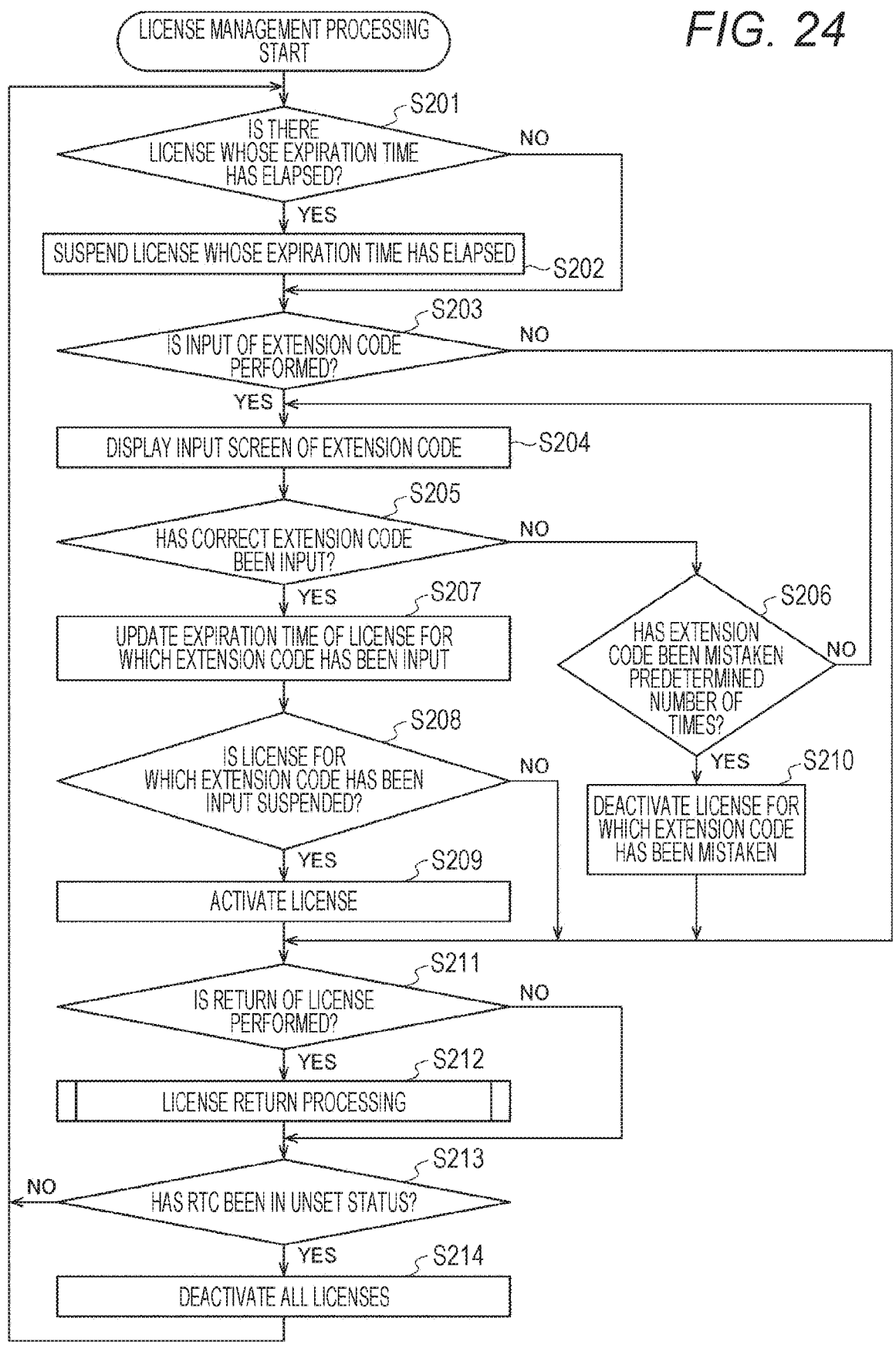
FIG. 24 is a flowchart for describing license management processing executed by the client.

In step S511, it is determined whether or not the RTC 206 has been in an unset status, similarly to the processing of step S213 of FIG. 24 described above. In a case where it is determined that the RTC 206 has not been in the unset status, the processing returns to step S512.

In step S512, all licenses are deactivated, similarly to the processing of step S214 of FIG. 24 described above.

Thereafter, the processing returns to step S501, and the processing of step S501 and the subsequent steps is executed.

On the other hand, in a case where it is determined in step S511 that the RTC 206 has not been in the unset status, the processing returns to step S501, and the processing of step S501 and the subsequent steps is executed.

<License Period Management Processing>

Figure 48:
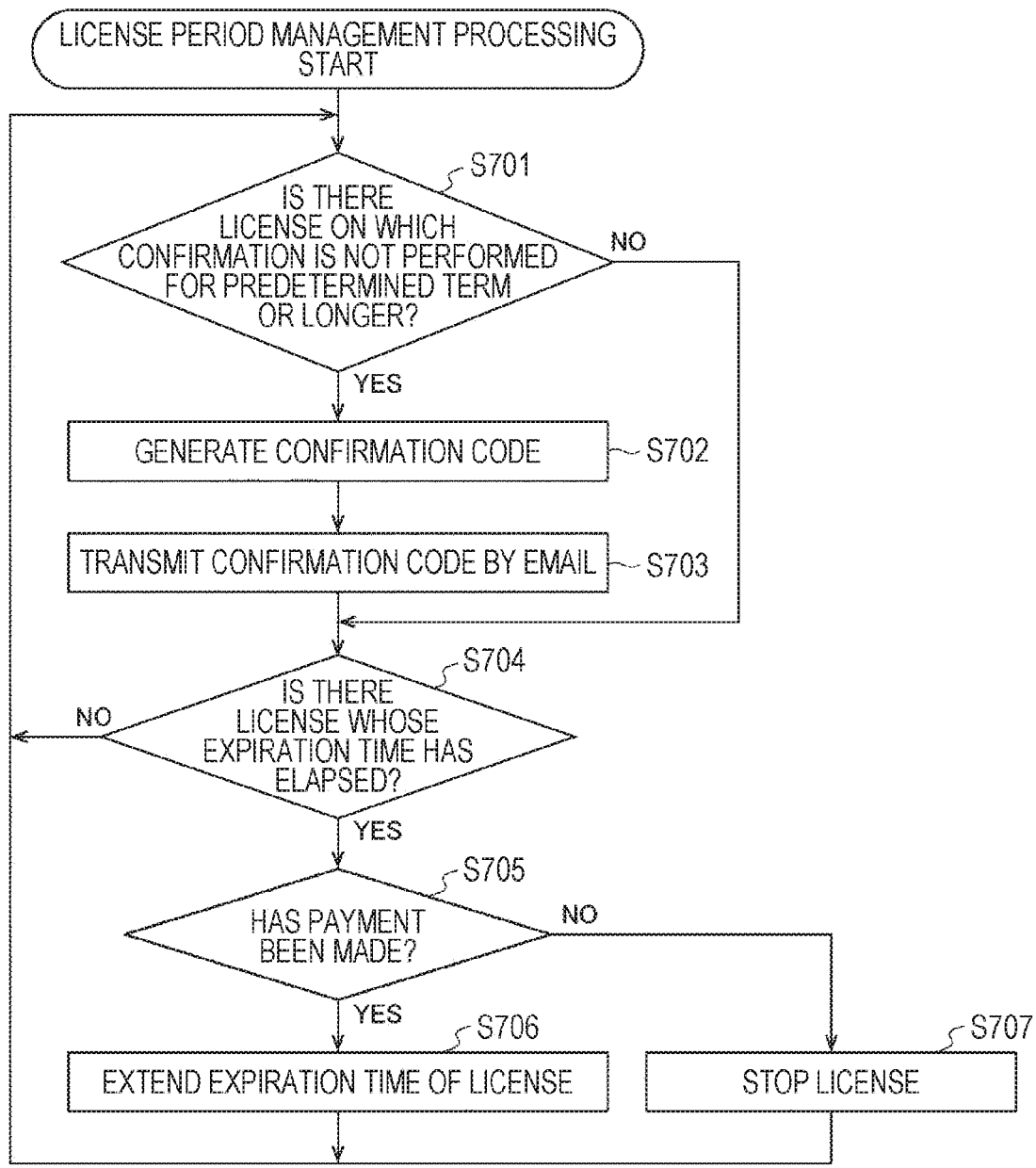
FIG. 48 is a flowchart for describing license period management processing executed by the server.

Next, license period management processing executed by the server 11 will be described with reference to a flowchart of FIG. 48.

In step S701, the license management unit 151 determines whether or not there is a license on which confirmation is not performed for a predetermined term or longer. The license management unit 151 determines that there is a license on which the confirmation is not performed for the predetermined term or longer in a case where there is a license whose server confirmation date and time is a predetermined term or longer before the current date and time of the RTC 105, in the license information stored in the storage unit 106, in other words, in a case where there is a license for which a predetermined term has elapsed since notification of the confirmation date and time (device RTC) has been provided from the electronic device 23, and the processing proceeds to step S702.

Figure 43:
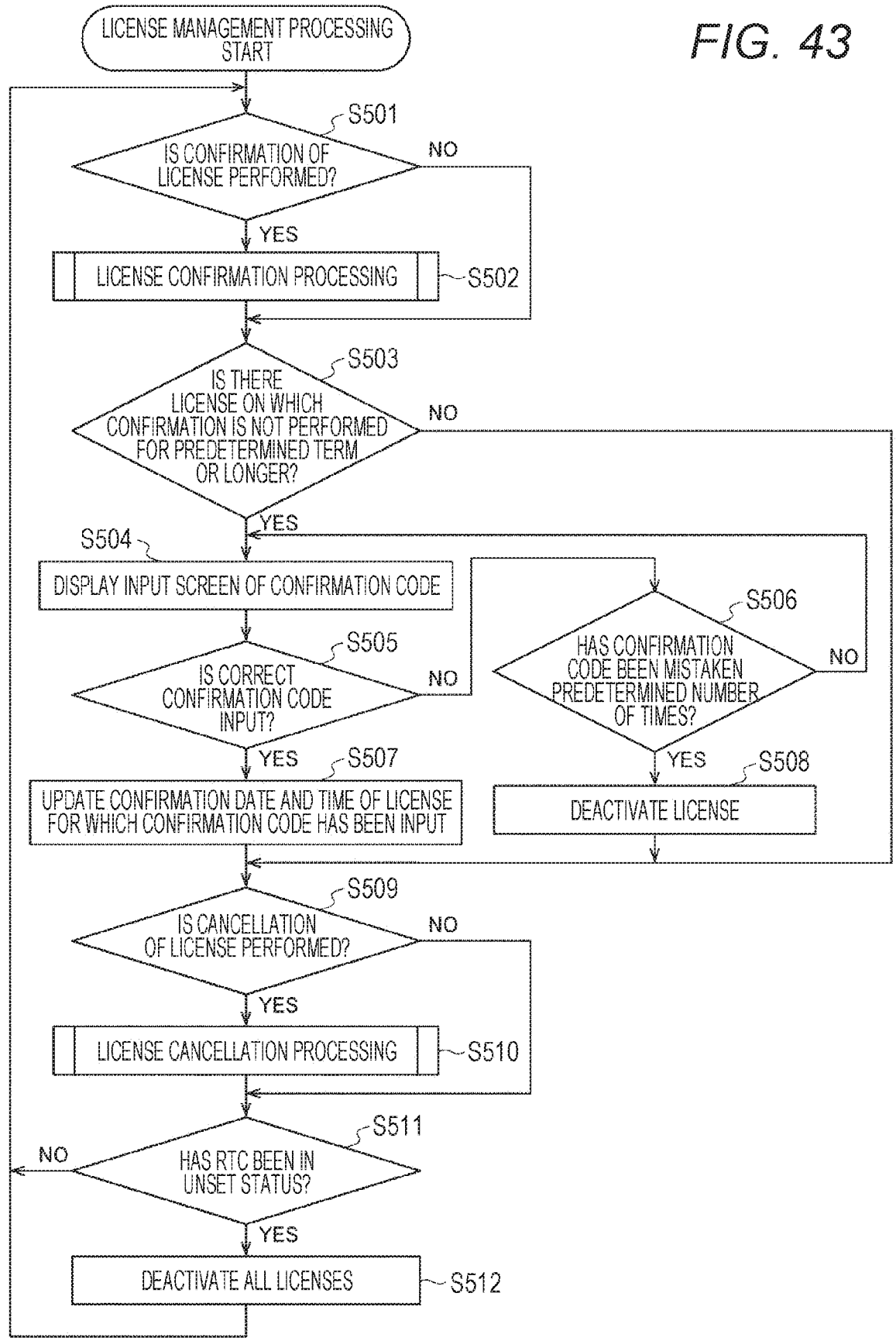
FIG. 43 is a flowchart for describing license management processing executed by the client.

Note that this predetermined term is set to a term (for example, 25 days) shorter than the longest unconfirmed term (for example, 30 days) in the processing of step S503 in FIG. 43. Therefore, the server 11 notifies the client 12 of a confirmation code before the longest unconfirmed term elapses without performing confirmation of the license in the electronic device 23.

In step S702, the license management unit 151 generates a confirmation code.

Specifically, the license management unit 151 generates a formal confirmation code on the basis of a client confirmation date and time in license information of a license that becomes a confirmation code generation target, by a method similar to that of the electronic device 23. For example, the license management unit 151 generates a confirmation code by the same algorithm as that of the electronic device 23 on the basis of a date and time obtained by adding the longest unconfirmed term to a client confirmation date and time of the license that becomes the confirmation code generation target. At this time, the client confirmation date and time in the license information of the server 11 is set to the same date and time as the confirmation date and time in the license information of the corresponding electronic device 23, and the same confirmation code is thus generated in the server 11 and the electronic device 23.

Figure 37:
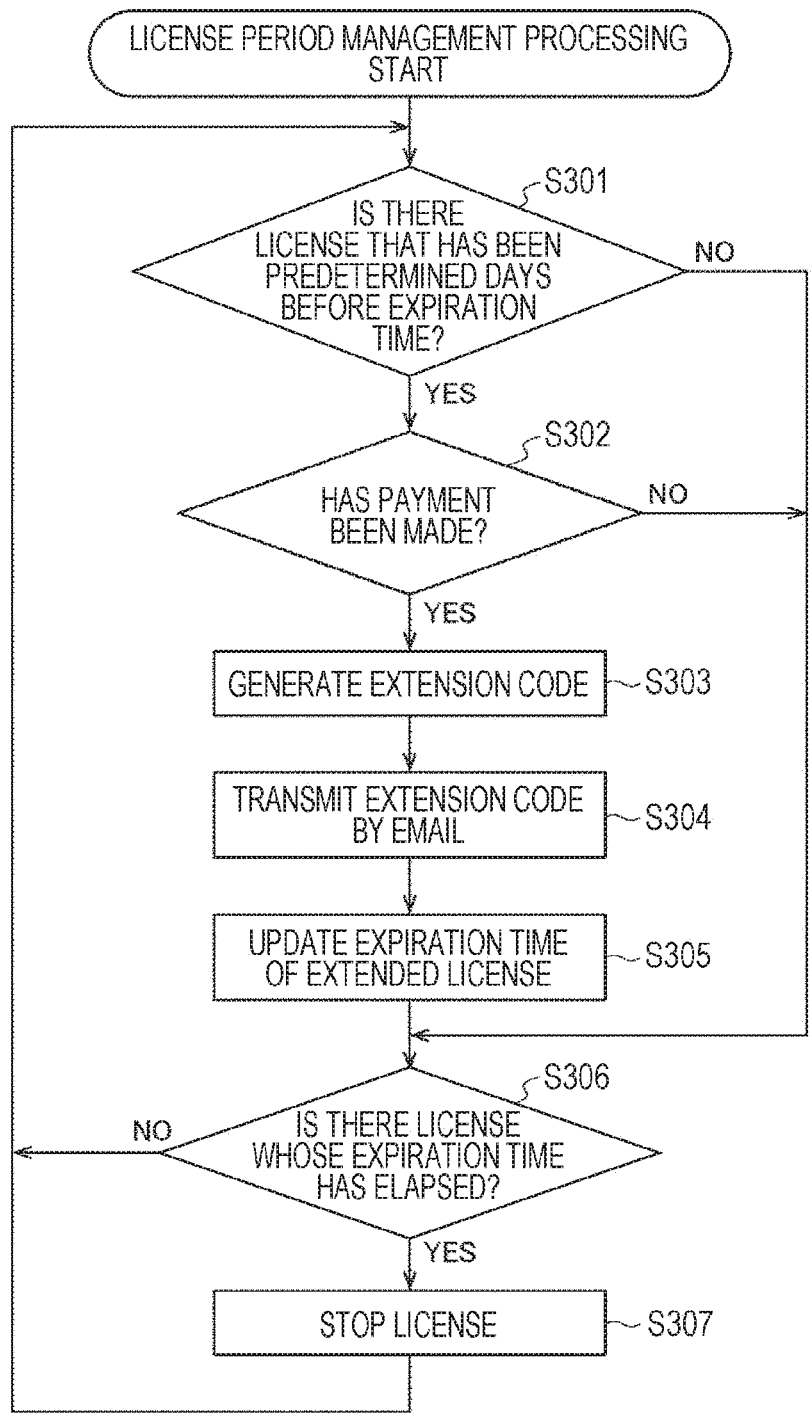
FIG. 37 is a flowchart for describing license period management processing executed by the server.

In step S703, the confirmation code is transmitted by an email by processing similar to that of step S304 of FIG. 37.

Thereafter, the processing proceeds to step S704.

On the other hand, in step S701, the license management unit 151 determines that there is no license on which the confirmation is not performed for the predetermined term or longer in a case where there is no license whose server confirmation date and time is the predetermined term or longer before the current date and time of the RTC 105, in the license information stored in the storage unit 106, the processing of steps S702 and S703 is skipped, and the processing proceeds to step S704.

In step S704, it is determined whether or not there is a license whose expiration time has passed, similarly to the processing of step S306 of FIG. 37. In a case where it is determined that there is a license whose expiration time has passed, the processing proceeds to step S705.

In step S705, the license management unit 151 determines whether or not payment has been made. In a case where the license management unit 151 determines that the license whose expiration time has passed has already been paid, the processing proceeds to step S706.

In step S706, the license management unit 151 updates the expiration time of the license. Specifically, the license management unit 151 updates the expiration time by adding an effective term of the license to a server expiration time in license information of the license whose expiration time is updated.

Thereafter, the processing returns to step S701, and the processing of step S701 and the subsequent steps is executed.

On the other hand, in step S705, in a case where the license management unit 151 determines that the license whose expiration time has passed has not been paid, the processing proceeds to step S707.

In step S707, the license is stopped, similarly to the processing of step S307 of FIG. 37.

Thereafter, the processing returns to step S701, and the processing of step S701 and the subsequent steps is executed.

On the other hand, in a case where it is determined in step S704 that there is no license whose expiration time has passed, the processing returns to step S701, and the processing of the step S701 and the subsequent steps is executed.

In such a manner, it is possible to appropriately perform the update of the license provided by the server 11 and used by the electronic device 23. For example, if the payment has been made for the license, the license is automatically updated until the user performs the cancellation processing. Then, the user can continuously use the license only by periodically connecting the electronic device 23 to the server 11 to confirm the continuation of the license. Furthermore, even though the confirmation of the continuation of the license has not been performed for a long term, if the payment has been made for the license, the user can confirm the continuation of the license and continuously use the license, only by inputting the confirmation code provided in notification from the server 11. Moreover, when the payment for the license is stopped, even though the electronic device 23 does not communicate with the server 11, the use of the license in the electronic device 23 is automatically stopped.

2. Modification

Hereinafter, a modification of the embodiment of the present technology described above will be described For example, another information processing apparatus (for example, a smartphone, a tablet, and the like) that can communicate with the server 11 and can read and write data from and to the medium 22 may be used, instead of the PC 21.

Furthermore, in the first embodiment of the processing of the information processing system 10, for example, the server 11 and the electronic device 23 may exchange data with each other via the network 13 and the PC 21 by connecting the electronic device 23 to the PC 21. Furthermore, for example, the electronic device 23 may directly communicate with the server 11 via the network 13 to exchange data with the server 11.

Moreover, in the first embodiment of the processing of the information processing system 10, the installation of the license may be permitted even after the predetermined grace time has passed. In this case, for example, the effective term of the license is shortened by a lapse time of the grace time.

Furthermore, in the first embodiment of the processing of the information processing system 10, for example, an extension code may be generated using data corresponding to the installation key, instead of the installation key. The data corresponding to the installation key is, for example, data having a different value for every installation of the license, such as the installation key. For example, the server 11 can count up a counter for every installation and use a counter value (for example, the number of times of the installation) instead of the installation key. Moreover, for example, an extension code may be generated using data corresponding to the number of times of the update, instead of the number of times of the update. The data corresponding to the number of times of the update is, for example, data different depending on the number of times of the update, data obtained by multiplying the number of times of the update by a predetermined coefficient, or the like.

Furthermore, in the second embodiment of the processing of the information processing system 10, the server 11 and the electronic device 23 may exchange data with each other via the network 13, the PC 21, and the medium 22. Furthermore, for example, the electronic device 23 may directly communicate with the server 11 via the network 13 to exchange data with the server 11.

Figure 47:
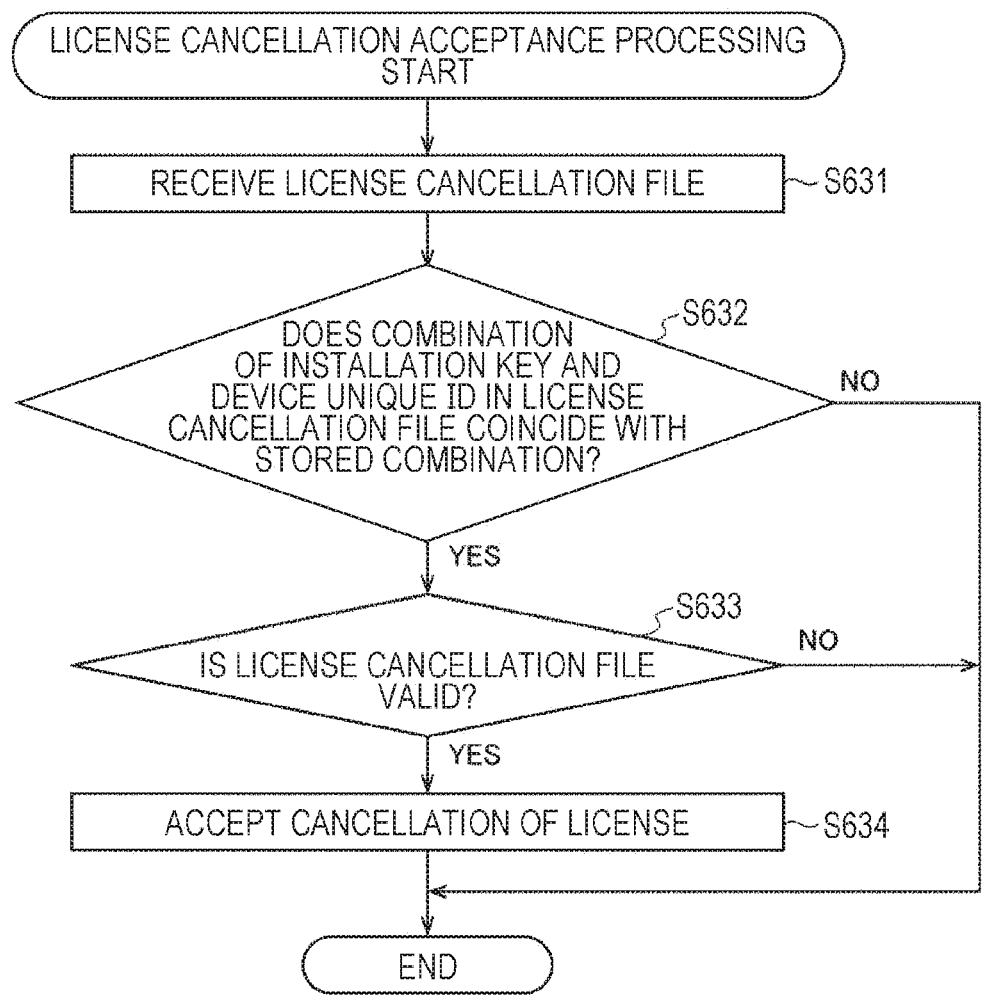
FIG. 47 is a flowchart for describing license cancellation acceptance processing executed by the server.

Moreover, for example, in the second embodiment of the processing of the information processing system 10, in a case where the cancellation of the license is accepted in the processing of step S634 of FIG. 47, when the effective term of the license still remains, the license of the remaining term may be made usable in another electronic device 23. That is, in this case, the license for which the cancellation has been accepted is treated as a floating license until the effective term expires.

Furthermore, an example in which the extension code or the confirmation code is directly input to the electronic device 23 by a user operation has been described in the above description, but the extension code or the confirmation code may be input using, for example, an application program or the like of a smartphone. For example, when the smartphone approaches the electronic device 23, the smartphone and the electronic device 23 may perform short range wireless communication, such that the extension code or the confirmation code may be transferred from the smartphone to the electronic device 23.

Moreover, the formats of the installation keys of FIGS. 14 and 42 are examples, and can be appropriately changed. For example, some of the data included in the installation key are not stored in the installation key, and may be stored in a file such as the license communication file or the like for transmitting the installation key.

Furthermore, for example, in step S205 of FIG. 24, the electronic device 23 may transmit the extension code to the server 11 via the PC 21 and the network 13 and the server 11 may perform authentication by the extension code to update the expiration time of the license.

Moreover, an example in which the information is transmitted and received mainly in a file format between the server 11 and the client 21 has been described in the above description, but any other format can also be used as a format of information to be transmitted and received.

3. Others

<Configuration Example of Computer>

The series of processing described above can be executed by hardware or can be executed by software. In a case where the series of processing is executed by the software, programs configuring the software are installed in a computer. Here, the computer includes a computer incorporated in dedicated hardware, or, for example, a general-purpose personal computer that can execute various functions by installing various programs, or the like.

Figure 49:
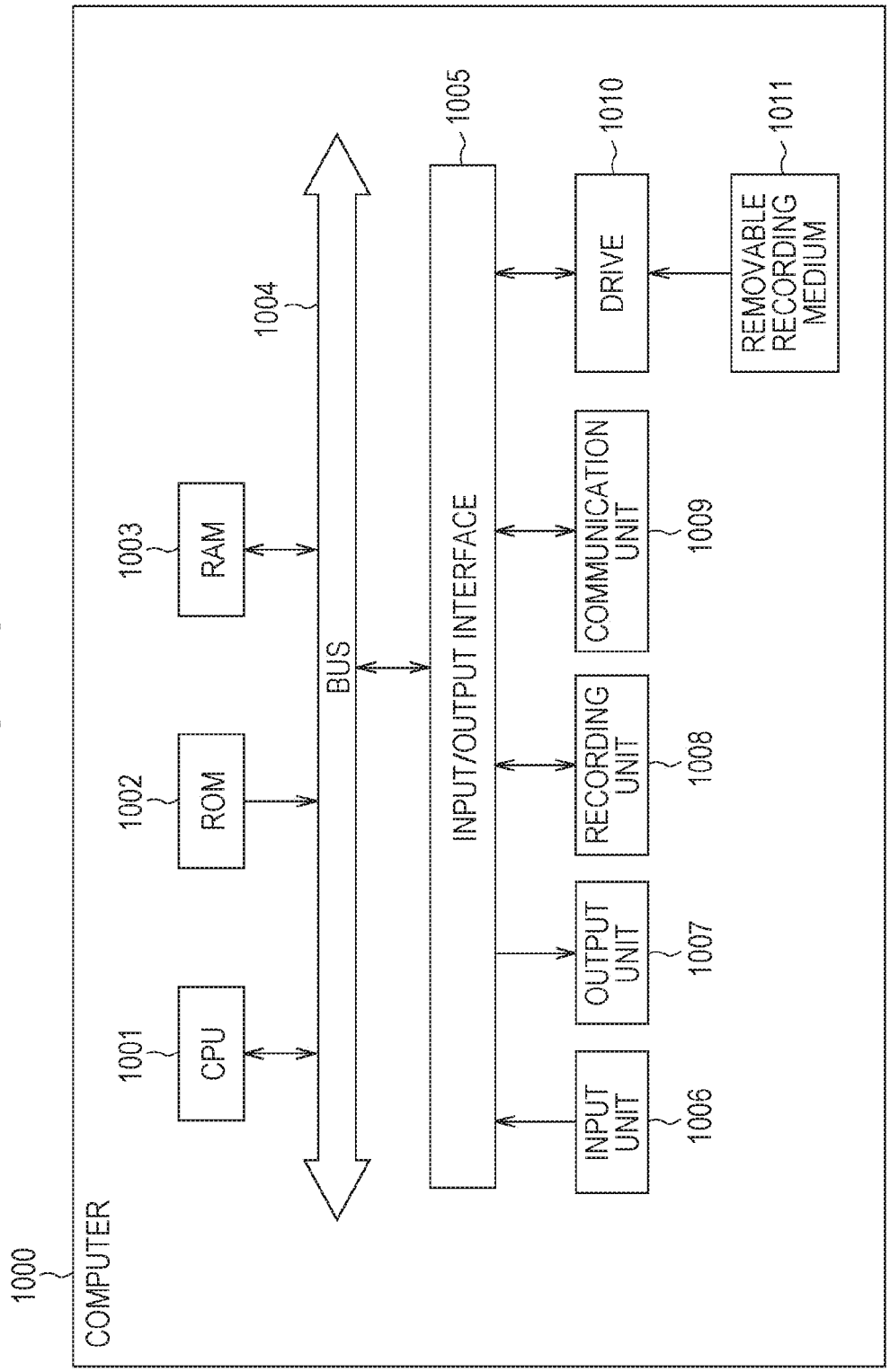
FIG. 49 is a diagram illustrating a configuration example of a computer.

FIG. 49 is a block diagram illustrating a configuration example of hardware of a computer that executes the series of processing described above by a program.

In the computer 1000, a CPU 1001, a read only memory (ROM) 1002, and a random access memory (RAM) 1003 are connected to each other by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, or the like. The communication unit 1009 includes a network interface and the like. The drive 1010 drives a removable recording medium 1011 such as a magnetic disk, an optical disk, a magneto-optical disk, a semiconductor memory, or the like.

In the computer 1000 configured as described above, the CPU 1001 performs the series of processing described above by loading, for example, a program recorded in the recording unit 1008 into the RAM 1003 via the input/output interface 1005 and the bus 1004 and executing the program.

The program executed by the computer 1000 (CPU 1001) can be provided by being recorded on the removable recording medium 1011 as, for example, a package medium and the like. Furthermore, the program can be provided via a wired or wireless transmission medium such as a local area network, the Internet, or digital satellite broadcasting.

In the computer 1000, the program can be installed in the recording unit 1008 via the input/output interface 1005 by mounting the removable recording medium 1011 on the drive 1010. Furthermore, the program can be received by the communication unit 1009 via the wired or wireless transmission medium and be installed in the recording unit 1008. In addition, the program can be installed in the ROM 1002 or the recording unit 1008 in advance.

Note that the program executed by the computer may be a program by which processing is performed in time series according to the order described in the present specification or may be a program by which processing is performed in parallel or at a necessary timing such as a timing when a call is made, or the like.

Furthermore, in the present specification, the system means a set of a plurality of components (apparatuses, modules (parts), or the like), and it does not matter whether or not all the components are in the same housing. Therefore, both of a plurality of apparatuses housed in separate housings and connected to each other via a network and one apparatus in which a plurality of modules is housed in one housing are systems.

Moreover, the embodiment of the present technology is not limited to the embodiment described above, and various modifications can be made without departing from the scope of the present technology.

For example, the present technology can have a configuration of cloud computing in which one function is shared and jointly processed by a plurality of apparatuses via a network.

Furthermore, the respective steps described in the above-mentioned flowcharts can be executed by one apparatus or can be executed in a shared manner by a plurality of apparatuses.

Moreover, in a case where a plurality of processing is included in one step, the plurality of processing included in one step can be executed by one apparatus or can be executed in a shared manner by a plurality of apparatuses.

<Combination Example of Configuration>

The present technology can also adopt the following configuration.

(1)

An electronic device including:

a key generation unit that generates a device unique key that is a key unique to every device; and a license management unit that updates a license in a case where an extension code generated by a predetermined method on the basis of the device unique key, first data different for every installation of the license provided by an information processing apparatus, and second data different depending on the number of times of update of the license coincides with an input extension code.

(2)

The electronic device according to the above (1), in which the first data is an installation key for installing the license, and the license management unit installs the license using the installation key.

(3)

The electronic device according to the above (2), further including a data generation unit that generates device information that is information including the device unique key, in which the installation key is included in license communication information that is information generated by the information processing apparatus using the device information.

(4)

The electronic device according to the above (3), in which the license communication information includes a user ID unique to a right holder of the license, and the license management unit updates a plurality of the licenses associated with one user ID in a case where the generated extension code coincides with the input extension code.

(5)

The electronic device according to the above (3) or (4), in which the key generation unit generates the device unique key before the device information is generated for the first time.

(6)

The electronic device according to any one of the above (1) to (5), in which the second data indicates the number of times of the update of the license.

(7)

The electronic device according to any one of the above (1) to (6), in which the license management unit generates an extension code of a predetermined number of digits on the basis of the device unique key, the first data, and the second data using the same hash function as that of the information processing apparatus.

(8)

An information processing method including:

generating, by an electronic device, a device unique key that is a key unique to the electronic device; and updating, by the electronic device, a license in a case where an extension code generated by a predetermined method on the basis of the device unique key, first data different for every installation of the license provided by an information processing apparatus, and second data different depending on the number of times of update of the license coincides with an input extension code.

(9)

A program for causing a computer of an electronic device to execute processing for:

generating a device unique key that is a key unique to the electronic device; and updating a license in a case where an extension code generated by a predetermined method on the basis of the device unique key, first data different for every installation of the license provided by an information processing apparatus, and second data different depending on the number of times of update of the license coincides with an input extension code.

(10)

An information processing apparatus including:

a license management unit that generates an extension code for updating a license by the same method as that of an electronic device, on the basis of a device unique key that is a key unique to the electronic device, first data different for every installation of the license in the electronic device, and second data different depending on the number of times of update of the license in the electronic device; and a communication control unit that controls transmission of the extension code.

(11)

The information processing apparatus according to the above (10), in which the license management unit generates an installation key for installing the license, and the first data is the installation key.

(12)

The information processing apparatus according to the above (11), further including a data generation unit that generates license communication information using device information, the device information being information including the device unique key and generated by the electronic device, and the license communication information being information including the installation key and used for installing the license in the electronic device.

(13)

The information processing apparatus according to the above (12), in which the license communication information includes a user ID unique to a right holder of the license.

(14)

The information processing apparatus according to the above (12) or (13), in which the device unique key is generated before the device information is generated for the first time by the electronic device.

(15)

The information processing apparatus according to any one of the above (10) to (14), in which the second data indicates the number of times of the update of the license.

(16)

The information processing apparatus according to any one of the above (10) to (15), in which the license management unit generates an extension code of a predetermined number of digits on the basis of the device unique key, the first data, and the second data using the same hash function as that of the electronic device.

(17)

An information processing method including:

generating, by an information processing apparatus, an extension code for updating a license by the same method as that of an electronic device, on the basis of a device unique key that is a key unique to the electronic device, first data different for every installation of the license in the electronic device, and second data different depending on the number of times of update of the license in the electronic device; and controlling, by the information processing apparatus, transmission of the extension code.

(18)

A program for causing a computer to execute processing for:

generating an extension code for updating a license by the same method as that of an electronic device, on the basis of a device unique key that is a key unique to the electronic device, first data different for every installation of the license in the electronic device, and second data different depending on the number of times of update of the license in the electronic device; and controlling transmission of the extension code.

(19)

An electronic device including:

a hardware clock; and a license management unit that stops use of a license until a confirmation code generated by the same method as that of an information processing apparatus on the basis of a confirmation date and time and used for confirming continuation of the license is input in a case where a predetermined term has elapsed since notification of the confirmation date and time has been provided to the information processing apparatus, the confirmation date and time being a date and time based on the hardware clock, and the information processing apparatus managing a period of the license.

(20)

The electronic device according to the above (19), further including a data generation unit that generates license confirmation information that is information for notifying the information processing apparatus of the confirmation date and time.

(21)

The electronic device according to the above (20), further including a key generation unit that generates a device unique key that is a key unique to every device, in which the data generation unit further generates license cancellation information, the license cancellation information being information which includes an installation key supplied from the information processing apparatus in order to install the license and whose security is secured using the device unique key and being information which is used for canceling the license in the information processing apparatus.

(22)

The electronic device according to the above (21), in which the data generation unit further generates device information that is information including the device unique key and used for issuing the license in the information processing apparatus.

(23)

The electronic device according to the above (22), in which the key generation unit generates the device unique key before the device information is generated for the first time.

(24)

The electronic device according to the above (22) or (23), in which the license management unit installs the license using the installation key included in license communication information, the license communication information being information generated by the information processing apparatus using the device information.

(25)

An information processing method including:

stopping, by an electronic device including a hardware clock, use of a license until a confirmation code generated by the same method as that of an information processing apparatus on the basis of a confirmation date and time and used for confirming continuation of the license is input in a case where a predetermined term has elapsed since notification of the confirmation date and time has been provided to the information processing apparatus, the confirmation date and time being a date and time based on the hardware clock, and the information processing apparatus managing a period of the license.

(26)

A program for causing a computer of an electronic device having a hardware clock to execute processing for:

stopping use of a license until a confirmation code generated by the same method as that of an information processing apparatus on the basis of a confirmation date and time and used for confirming continuation of the license is input in a case where a predetermined term has elapsed since notification of the confirmation date and time has been provided to the information processing apparatus, the confirmation date and time being a date and time based on the hardware clock, and the information processing apparatus managing a period of the license.

(27)

An information processing apparatus including:

a license management unit that generates a confirmation code by the same method as that of an electronic device on the basis of a confirmation date and time in a case where a predetermined term has elapsed since notification of the confirmation date and time has been provided, the confirmation date and time being a date and time based on a hardware clock of the electronic device, and the confirmation code being a code for confirming continuation of a license used by the electronic device in the electronic device; and a communication control unit that controls transmission of the confirmation code.

(28)

The information processing apparatus according to the above (27), in which the license management unit recognizes the confirmation date and time using license confirmation information that is information including the confirmation date and time and generated by the electronic device.

(29)

The information processing apparatus according to the above (27) or (28), in which the license management unit performs cancellation of the license using license cancellation information, the license cancellation information being information which includes an installation key for installing the license and whose security is secured using a device unique key and being information which is generated by the electronic device, and the device unique key being a key unique to the electronic device.

(30)

The information processing apparatus according to the above (29), further including a data generation unit that generates license communication information using device information, the device information being information including the device unique key and generated by the electronic device, and the license communication information being information including the installation key and used for installing the license in the electronic device.

(31)

The information processing apparatus according to the above (30), in which the device unique key is generated before the device information is generated for the first time by the electronic device.

(32)

An information processing method including:

generating, by an information processing apparatus, a confirmation code by the same method as that of an electronic device on the basis of a confirmation date and time in a case where a predetermined term has elapsed since notification of the confirmation date and time has been provided, the confirmation date and time being a date and time based on a hardware clock of the electronic device, and the confirmation code being a code for confirming continuation of a license used by the electronic device in the electronic device; and controlling, by the information processing apparatus, transmission of the confirmation code.

(33)

A program for causing a computer to execute processing for:

generating a confirmation code by the same method as that of an electronic device on the basis of a confirmation date and time in a case where a predetermined term has elapsed since notification of the confirmation date and time has been provided, the confirmation date and time being a date and time based on a hardware clock of the electronic device, and the confirmation code being a code for confirming continuation of a license used by the electronic device in the electronic device; and controlling transmission of the confirmation code.

Note that effects described in the present specification are merely examples and are not limited, and other effects may be provided.

REFERENCE SIGNS LIST

10 Information processing system
11 Server
12 Client
13 Network
21 PC
22 Removable medium
23 Electronic device
102 Control unit
105 RTC
151 License management unit
152 Data generation unit
153 UI control unit
154 Communication control unit
155 Storage control unit
202 Function execution unit 203 Control unit
206 RTC
208 Drive
251 License management unit
252 Key generation unit
253 Data generation unit
254 UI control unit
255 Communication control unit
256 Storage control unit

The invention claimed is:

1. An electronic device, comprising:
a central processing unit (CPU) configured to:
generate a device unique key that is a key unique to the electronic device;
generate an extension code, based on the device unique key, first data different for every installation of a license provided by an information processing apparatus, and second data that changes based on a change in a number of times of update of the license; and
update the license in a case where the generated extension code coincides with an input extension code.

2. The electronic device according to claim 1, wherein
the first data is an installation key to install the license, and
the CPU is further configured to install the license using the installation key.

3. The electronic device according to claim 2, wherein
the CPU is further configured to generate device information that includes the device unique key, and
the installation key is included in license communication information generated by the information processing apparatus using the device information.

4. The electronic device according to claim 3, wherein
the license communication information includes a user identification (ID) unique to a right holder of the license,
the CPU is further configured to update a plurality of licenses associated with one user ID in a case where the generated extension code coincides with the input extension code, and
the plurality of licenses includes the license.

5. The electronic device according to claim 3, wherein the CPU is further configured to generate the device unique key before the device information is generated for a first time.

6. The electronic device according to claim 1, wherein the second data indicates the number of times of the update of the license.

7. The electronic device according to claim 1, wherein the CPU is further configured to generate the extension code of a specific number of digits using a same hash function as that of the information processing apparatus.

8. An information processing method, comprising:
generating, by an electronic device, a device unique key that is a key unique to the electronic device;
generating, by the electronic device, an extension code, based on the device unique key, first data different for every installation of a license provided by an information processing apparatus, and second data that changes based on a change in a number of times of update of the license; and
updating, by the electronic device, the license in a case where the generated extension code coincides with an input extension code.

9. A non-transitory computer-readable medium having stored thereon, computer-executable instructions which, when executed by a computer of an electronic device, cause the computer to execute operations, the operations comprising:
generating a device unique key that is a key unique to the electronic device;
generating an extension code, based on the device unique key, first data different for every installation of a license provided by an information processing apparatus, and second data that changes based on a change in a number of times of update of the license; and
updating the license in a case where the generated extension code coincides with an input extension code.

10. An information processing apparatus, comprising:
a central processing unit (CPU) configured to:
generate an extension code by a same method as that of an electronic device, based on a device unique key that is a key unique to the electronic device, first data different for every installation of a license in the electronic device, and second data that changes based on a change in a number of times of update of the license in the electronic device; and
control transmission of the extension code to update the license.

11. The information processing apparatus according to claim 10, wherein
the CPU is further configured to generate an installation key to install the license, and
the first data is the installation key.

12. The information processing apparatus according to claim 11, wherein
the CPU is further configured to generate license communication information using device information,
the device information includes the device unique key and is generated by the electronic device, and
the license communication information includes the installation key and is used to install the license in the electronic device.

13. The information processing apparatus according to claim 12, wherein the license communication information further includes a user ID unique to a right holder of the license.

14. The information processing apparatus according to claim 12, wherein the device unique key is generated before the device information is generated for a first time by the electronic device.

15. The information processing apparatus according to claim 10, wherein the second data indicates the number of times of the update of the license.

16. The information processing apparatus according to claim 10, wherein the CPU is further configured to generate the extension code of a specific number of digits using a same hash function as that of the electronic device.

17. An information processing method, comprising:
generating, by an information processing apparatus, an extension code by a same method as that of an electronic device, based on a device unique key that is a key unique to the electronic device, first data different for every installation of a license in the electronic device, and second data that changes based on a change in a number of times of update of the license in the electronic device; and
controlling, by the information processing apparatus, transmission of the extension code to update the license.

18. A non-transitory computer-readable medium having stored thereon, computer-executable instructions which, when executed by a computer, cause the computer to execute operations, the operations comprising:
  generating an extension code by a same method as that of an electronic device, based on a device unique key that is a key unique to the electronic device, first data different for every installation of a license in the electronic device, and second data that changes based on a change in a number of times of update of the license in the electronic device; and
  controlling transmission of the extension code to update the license.

19. An electronic device, comprising:
  a hardware clock; and
  a central processing unit (CPU) configured to:
    stop use of a license until a confirmation code generated by a same method as that of an information processing apparatus is input, wherein
      the confirmation code is generated based on a confirmation date and time,
      the confirmation code is for confirmation of continuation of the license,
      the use of the license is stopped in a case where a specific term has elapsed since notification of the confirmation date and time has been provided to the information processing apparatus,
      the confirmation date and time is based on the hardware clock, and
      the information processing apparatus manages a period of the license.

20. The electronic device according to claim 19, wherein the CPU is further configured to generate license confirmation information to notify the information processing apparatus of the confirmation date and time.

21. The electronic device according to claim 20, wherein the CPU is further configured to:
  generate a device unique key that is a key unique to the electronic device, and
  generate license cancellation information,
  the license cancellation information includes an installation key supplied from the information processing apparatus to install the license,
  security of the license cancellation information is secured using the device unique key, and
  the license cancellation information is used for cancellation of the license in the information processing apparatus.

22. The electronic device according to claim 21, wherein the CPU is further configured to generate device information that includes the device unique key, and
  the device information is for issuance of the license in the information processing apparatus.

23. The electronic device according to claim 22, wherein the CPU is further configured to generate the device unique key before the device information is generated for a first time.

24. The electronic device according to claim 22, wherein the CPU is further configured to install the license using the installation key included in license communication information, and
  the license communication information is generated by the information processing apparatus using the device information.

25. An information processing method, comprising:
  stopping, by an electronic device including a hardware clock, use of a license until a confirmation code generated by a same method as that of an information processing apparatus is input, wherein
    the confirmation code is generated based on a confirmation date and time,
    the confirmation code is for confirming continuation of the license,
    the use of the license is stopped in a case where a specific term has elapsed since notification of the confirmation date and time has been provided to the information processing apparatus,
    the confirmation date and time is based on the hardware clock, and
    the information processing apparatus manages a period of the license.

26. A non-transitory computer-readable medium having stored thereon, computer-executable instructions which, when executed by a computer of an electronic device having a hardware clock, cause the computer to execute operations, the operations comprising:
  stopping use of a license until a confirmation code generated by a same method as that of an information processing apparatus is input, wherein
    the confirmation code is generated based on a confirmation date and time,
    the confirmation code is for confirming continuation of the license,
    the use of the license is stopped in a case where a specific term has elapsed since notification of the confirmation date and time has been provided to the information processing apparatus,
    the confirmation date and time is based on the hardware clock, and
    the information processing apparatus manages a period of the license.

27. An information processing apparatus, comprising:
  a central processing unit (CPU) configured to:
    generate a confirmation code by a same method as that of an electronic device based on a confirmation date and time, wherein
      the confirmation code is generated in a case where a specific term has elapsed since notification of the confirmation date and time has been provided,
      the confirmation date and time is based on a hardware clock of the electronic device, and
      the confirmation code is for confirmation of continuation of a license used by the electronic device; and
    control transmission of the confirmation code.

28. The information processing apparatus according to claim 27, wherein
  the CPU is further configured to recognize the confirmation date and time using license confirmation information that includes the confirmation date and time, and
  the license confirmation information is generated by the electronic device.

29. The information processing apparatus according to claim 27, wherein
  the CPU is further configured to perform cancellation of the license using license cancellation information,
  the license cancellation information includes an installation key to install the license,
  security of the license cancellation information is secured using a device unique key that is a key unique to the electronic device, and
  the license cancellation information is generated by the electronic device.

30. The information processing apparatus according to claim 29, wherein
the CPU is further configured to generate license communication information using device information,
the device information includes the device unique key and is generated by the electronic device, and
the license communication information includes the installation key and is used to install the license in the electronic device.

31. The information processing apparatus according to claim 30, wherein the device unique key is generated before the device information is generated for a first time by the electronic device.

32. An information processing method, comprising:
generating, by an information processing apparatus, a confirmation code by a same method as that of an electronic device based on a confirmation date and time, wherein
the confirmation code is generated in a case where a specific term has elapsed since notification of the confirmation date and time has been provided,
the confirmation date and time is based on a hardware clock of the electronic device, and
the confirmation code is for confirming continuation of a license used by the electronic device; and
controlling, by the information processing apparatus, transmission of the confirmation code.

33. A non-transitory computer-readable medium having stored thereon, computer-executable instructions which, when executed by a computer, cause the computer to execute operations, the operations comprising:
generating a confirmation code by a same method as that of an electronic device based on a confirmation date and time, wherein
the confirmation code is generated in a case where a specific term has elapsed since notification of the confirmation date and time has been provided,
the confirmation date and time is based on a hardware clock of the electronic device, and
the confirmation code is for confirming continuation of a license used by the electronic device; and
controlling transmission of the confirmation code.

* * * * *